United States Patent
Gaspar Marques et al.

(10) Patent No.: US 11,999,651 B2
(45) Date of Patent: Jun. 4, 2024

(54) SILICOBORATE AND BOROSILICATE GLASSES HAVING HIGH REFRACTIVE INDEX AND LOW DENSITY

(71) Applicant: CORNING INCORPORATED, Corning, NY (US)

(72) Inventors: Paulo Jorge Gaspar Marques, Herblay sur Seine (FR); Antoine Marie Joseph Lepicard, Melun (FR); Jian Luo, Painted Post, NY (US); Lina Ma, Corning, NY (US); Alexander I. Priven, Chungchongnam-do (KR)

(73) Assignee: Corning Incorporated, Corning, NY (US)

( * ) Notice: Subject to any disclaimer, the term of this patent is extended or adjusted under 35 U.S.C. 154(b) by 256 days.

(21) Appl. No.: 17/398,580

(22) Filed: Aug. 10, 2021

(65) Prior Publication Data
US 2022/0073409 A1 Mar. 10, 2022

Related U.S. Application Data

(60) Provisional application No. 63/076,540, filed on Sep. 10, 2020.

(51) Int. Cl.
*C03C 3/068* (2006.01)
(52) U.S. Cl.
CPC .................... *C03C 3/068* (2013.01)
(58) Field of Classification Search
CPC .......... C03C 3/068; C03C 3/066; C03C 3/064
See application file for complete search history.

(56) References Cited

U.S. PATENT DOCUMENTS

| | | |
|---|---|---|
| 3,460,954 A | 8/1969 | Young |
| 3,563,773 A | 2/1971 | Heinz et al. |
| 3,999,997 A | 12/1976 | Faulstich et al. |
| 4,390,638 A | 6/1983 | Mennemann et al. |
| 4,584,279 A | 4/1986 | Glaswerke |
| 4,732,876 A | 3/1988 | Nagamine et al. |
| 4,742,028 A | 5/1988 | Boudot et al. |
| 4,996,173 A | 2/1991 | Tachiwana |
| 5,288,669 A | 2/1994 | Grateau et al. |
| 5,693,580 A | 12/1997 | Brow et al. |
| 5,747,397 A | 5/1998 | Mcpherson et al. |
| 6,121,176 A | 9/2000 | Comte |
| 6,187,702 B1 | 2/2001 | Morishita |
| 6,333,288 B1 | 12/2001 | Clement et al. |
| 6,413,894 B1 | 7/2002 | Sato |
| 7,091,145 B2 | 8/2006 | Wolff et al. |
| 7,232,779 B2 | 6/2007 | Kasuga et al. |
| 7,490,485 B2 | 2/2009 | Endo |
| 7,538,051 B2 | 5/2009 | Fujiwara et al. |
| 7,563,738 B2 | 7/2009 | Uehara |
| 7,598,193 B2 | 10/2009 | Endo |
| 7,605,099 B2 | 10/2009 | Wolff et al. |
| 7,615,507 B2 | 11/2009 | Endo |
| 7,655,585 B2 | 2/2010 | Hayashi |
| 7,737,064 B2 | 6/2010 | Fu |
| 7,827,823 B2 | 11/2010 | Kasuga et al. |
| 7,897,532 B2 | 3/2011 | Onoda et al. |
| 8,012,896 B2 | 9/2011 | Fujiwara |
| 8,034,733 B2 | 10/2011 | Kobayashi et al. |
| 8,077,406 B2 | 12/2011 | Hachitani et al. |
| 8,399,371 B2 | 3/2013 | Saito |
| 8,404,606 B2 | 3/2013 | Wolff et al. |
| 8,486,850 B2 | 7/2013 | Li et al. |
| 8,507,394 B2 | 8/2013 | Shimizu |
| 8,575,048 B2 | 11/2013 | Negishi et al. |
| 8,647,996 B2 | 2/2014 | Takazawa |
| 8,661,853 B2 | 3/2014 | Negishi et al. |
| 8,728,963 B2 | 5/2014 | Negishi et al. |
| 8,741,795 B2 | 6/2014 | Zou et al. |
| 8,741,796 B2 | 6/2014 | Negishi et al. |
| 8,835,336 B2 | 9/2014 | Taguchi |
| 8,835,337 B2 | 9/2014 | Negishi |
| 8,846,555 B2 | 9/2014 | George et al. |
| 8,852,745 B2 | 10/2014 | Yamaguchi et al. |
| 8,859,444 B2 | 10/2014 | Yamaguchi et al. |
| 8,883,664 B2 | 11/2014 | Negishi |
| 9,018,116 B2 | 4/2015 | Schreder et al. |

(Continued)

FOREIGN PATENT DOCUMENTS

| | | |
|---|---|---|
| CN | 101215082 A | 7/2008 |
| CN | 102219374 A | 10/2011 |

(Continued)

OTHER PUBLICATIONS

International Search Report and Written Opinion of the International Searching Authority; PCT/US2021/046897; dated Apr. 7, 2022, 20 pages; European Patent Office.
International Search Report and Written Opinion of the International Searching Authority; PCT/US2021/047544; dated Dec. 10, 2021; 12 pages; European Patent Office.
Bengisu et al., Glasses and glass-ceramics in the SrO-TiO2-Al2O3-SiO2-B2O3 system and the effect of P2O5 additions, J.Mater.Sci., 2008, vol. 43, No. 10, p. 3531-3538.
Burger et al., "Phase equilibrium, glass-forming, properties and structure of glasses in the TeO2-B2O3 system", Journal of Materials Science, 1984, vol. 19, No. 2, pp. 403-412.

(Continued)

*Primary Examiner* — Elizabeth A. Bolden

(74) *Attorney, Agent, or Firm* — Kevin L. Bray

(57) ABSTRACT

Glasses containing silicon dioxide ($SiO_2$) and/or boron oxide ($B_2O_3$) as glass formers and having a refractive index $n_d$ of greater than or equal to 1.7, as measured at 587.56 nm, and a density of less than or equal to 4.5 g/cm$^3$, as measured at 25° C., are provided. Optionally, the glasses may be characterized by a low optical dispersion, a high transmittance in the visible and near-ultraviolet (near-UV) range of the electromagnetic spectrum, and/or good glass forming ability.

19 Claims, 14 Drawing Sheets

(56) References Cited

U.S. PATENT DOCUMENTS

| | | | |
|---|---|---|---|
| 9,169,152 | B2 | 10/2015 | Kuang |
| 9,302,930 | B2 | 4/2016 | Negishi et al. |
| 9,394,194 | B2 | 7/2016 | Negishi |
| 9,416,047 | B2 | 8/2016 | Yamaguchi |
| 9,487,432 | B2 | 11/2016 | Kuang |
| 9,643,880 | B2 | 5/2017 | Negishi |
| 10,259,738 | B2 | 4/2019 | Sun |
| 10,287,205 | B2 | 5/2019 | Sun |
| 2006/0105900 | A1 | 5/2006 | Kasuga et al. |
| 2006/0189473 | A1 | 8/2006 | Endo |
| 2009/0288450 | A1 | 11/2009 | Kasuga et al. |
| 2015/0225282 | A1 | 8/2015 | Kuang |
| 2016/0090320 | A1 | 3/2016 | Negishi |
| 2018/0016182 | A1 | 1/2018 | Sun |
| 2018/0057394 | A1 | 3/2018 | Kikkawa et al. |
| 2018/0244559 | A1 | 8/2018 | Akiba et al. |
| 2018/0251395 | A1 | 9/2018 | Akiba et al. |

FOREIGN PATENT DOCUMENTS

| | | |
|---|---|---|
| CN | 102372430 A | 3/2012 |
| CN | 102910816 A | 2/2013 |
| CN | 103626394 A | 3/2014 |
| CN | 103708724 A | 4/2014 |
| CN | 108290771 A | 7/2018 |
| CN | 110510869 A | 11/2019 |
| CN | 110950531 A | 4/2020 |
| DE | 2653581 A1 | 6/1977 |
| DE | 3201344 A1 | 7/1983 |
| DE | 3201346 A1 | 7/1983 |
| DE | 4242859 A1 | 2/1994 |
| DE | 102006024805 A1 | 11/2007 |
| EP | 0570687 A1 | 11/1993 |
| EP | 0992461 A1 | 4/2000 |
| FR | 1214486 A | 4/1960 |
| GB | 2342918 B | 4/2001 |
| JP | 50-018509 A | 2/1975 |
| JP | 59-050048 A | 3/1984 |
| JP | 61-168551 A | 7/1986 |
| JP | 61-232243 A | 10/1986 |
| JP | 07-041334 A | 2/1995 |
| JP | 2000-128570 A | 5/2000 |
| JP | 2000-159537 A | 6/2000 |
| JP | 3060914 B2 | 7/2000 |
| JP | 2001-072432 A | 3/2001 |
| JP | 2001-342035 A | 12/2001 |
| JP | 2002-173334 A | 6/2002 |
| JP | 2002-362939 A | 12/2002 |
| JP | 2003-252646 A | 9/2003 |
| JP | 2004-175632 A | 6/2004 |
| JP | 2005-008518 A | 1/2005 |
| JP | 2005-047732 A | 2/2005 |
| JP | 2005-239506 A | 9/2005 |
| JP | 2006-111499 A | 4/2006 |
| JP | 2006-248897 A | 9/2006 |
| JP | 2007-112697 A | 5/2007 |
| JP | 2007-153734 A | 6/2007 |
| JP | 2008-105863 A | 5/2008 |
| JP | 2008-214135 A | 9/2008 |
| JP | 2009-263141 A | 11/2009 |
| JP | 2012-236754 A | 12/2012 |
| KR | 10-2009-0026249 A | 3/2009 |
| SU | 986886 A1 | 1/1983 |
| TW | 201711973 A | 4/2017 |
| TW | 201713602 A | 4/2017 |
| TW | 201900572 A | 1/2019 |
| WO | 98/32706 A1 | 7/1998 |
| WO | 2006/106781 A1 | 10/2006 |
| WO | 2011/086855 A1 | 7/2011 |
| WO | 2012/099168 A1 | 7/2012 |
| WO | 2012/133420 A1 | 10/2012 |
| WO | 2013/049988 A1 | 4/2013 |
| WO | 2014/048362 A1 | 4/2014 |
| WO | 2014/187132 A1 | 11/2014 |
| WO | 2017/110304 A1 | 6/2017 |
| WO | 2019/017205 A1 | 1/2019 |
| WO | 2019/021689 A1 | 1/2019 |
| WO | 2019/031095 A1 | 2/2019 |
| WO | 2019/131123 A1 | 7/2019 |
| WO | 2020/045417 A1 | 3/2020 |
| WO | 2020/063208 A1 | 4/2020 |

OTHER PUBLICATIONS

Burger et al., R transmission and properties of glasses in the $TeO_2$-$RnOm$, $RnXm$, $Rn(SO_4)m$, $Rn(PO_3)m$ and $B_2O_3$] systems, Infrared Physics, 1985, vol. 25, No. 1-2, pp. 395-409.

Fargin et al., "Optical non-linearity in oxide glasses", Journal of Non-Crystalline Solids, 1996, vol. 203, p. 96-101.

Gupta et al., "Mid-IR transparent $TeO_2$-$TiO_2$-$La_2O_3$ glass and its crystallization behaviour for photonic applications", J.Am.Ceram. Soc., 2018, vol. 101, No. 9, p. 3900-3916.

Hakamatsuka et al., "Electrical properties of vanadium borophosphate glasses", J.Ceram.Soc. Jpn, 1981, vol. 89, No. 9, p. 461-470.

Madheshiya et al., "Synthesis, structural and X-ray absorption spectroscopy of ($Pb_xBi_{1-x}$). $TiO_3$ borosilicate glass and glass ceramics" Journal of Asian Ceramic Societies', 2017, vol. 5, No. 3, p. 276-283.

Saddeek et al., "Optical study of lead borosilicate glasses", Physica B: Condensed Matter, 2010, vol. 405, No. 10, p. 2407-2412.

Singh et al., "Effect of $La_2O_3$ concentration on structural, optical and cytotoxicity behaviours of strontium titanate borosilicate glasses", In Journal of Non-Crystalline Solids, vol. 481, 2018, pp. 176-183.

Strimple J.H.,Giess E.A., Glass formation and properties of glasses in the system $Na_2O$-$B_2O_3$-$SiO_2$-$TiO_2$., J.American Ceramic Society, 1958, vol. 41, No. 7, p. 231-237.

SILICOBORATE AND BOROSILICATE GLASSES HAVING HIGH REFRACTIVE INDEX AND LOW DENSITY

This Application claims priority under 35 USC § 119(e) from U.S. Provisional Patent Application Ser. No. 63/076,540 filed on Sep. 10, 2020 which is incorporated by reference herein in its entirety.

FIELD

The present disclosure generally relates to silicoborate and borosilicate glasses having a high refractive index and low density.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glassforming ability of the material. For example, crystallization and/or liquid-liquid phase separation can occur during cooling of the glass melt at cooling rates that are generally acceptable in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density, however, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic. Furthermore, phosphate glasses exhibiting a high refractive index also tend to have an increase in optical dispersion.

Silicoborate and borosilicate glasses are typically easier to produce and can exhibit a high transmittance without a bleaching step. However, silicoborate and borosilicate glasses typically exhibit an increase in density at increasing refractive indices, compared to phosphate glasses.

In view of these considerations, there is a need for silicoborate and borosilicate glasses having a high refractive index and low density, optionally in combination with a high transmittance in the visible and near UV-range, a low optical dispersion, and/or which are made from compositions that provide good glass-forming ability.

SUMMARY

According to an embodiment of the present disclosure, a glass includes $SiO_2$ from 0.3 wt % to 30.0 wt %, $B_2O_3$ from 0.3 wt % to 30.0 wt %, $Nb_2O_5$ from 0.3 wt % to 50.0 wt %, and at least one oxide selected from $ZrO_2$, SrO, CaO, $Li_2O$, MgO, ZnO, $Y_2O_3$, $Ta_2O_5$, BaO, PbO, $TiO_2$, $Gd_2O_3$, $GeO_2$, $K_2O$, $La_2O_3$, and $Na_2O$, subject to the proviso that: $ZrO_2$ from 2.5 wt % to 15.0 wt %, CaO from 0.5 wt % to 25.0 wt %, $Gd_2O_3$ from 0.0 wt % to 20.0 wt %, $Y_2O_3$ from 0.0 wt % to 10.0 wt %, $TiO_2$ from 0.0 wt % to 7.05 wt %, ZnO from 0.0 wt % to 2.0 wt %, $Li_2O$ from 0.0 wt % to 2.0 wt %, $GeO_2$ from 0.0 wt % to 2.0 wt %, and $Ta_2O_5$ from 0.0 wt % to 1.0 wt %. The glass is further defined by, in percent by weight of oxides: a sum of ($Nb_2O_5+TiO_2$) of from 18.0 wt % to 50.0 wt %, a sum of ($SiO_2+B_2O_3$) of from 1.0 wt % to 30.0 wt %, a sum ($La_2O_3+Gd_2O_3$) of from 0.0 wt % to 40.0 wt %, a sum (CaO+SrO+BaO) of 0.2 wt % or greater, a sum ($PbO+V_2O_5$) of from 0.0 wt % to 1.0 wt %, a ratio CaO/($Li_2O+Na_2O+K_2O+MgO+CaO+SrO+BaO+ZnO$) of 0.50 or greater, a ratio ($SiO_2/(SiO_2+B_2O_3)$) of greater than 0.0 to less than or equal to 0.50, and a ratio (CaO+SrO+BaO)/($Nb_2O_5+TiO_2$) of 0.45 or greater. The glass is further substantially free of fluorine.

According to another embodiment of the present disclosure, a glass includes $SiO_2$ from 3.0 mol % to 50.0 mol %, $B_2O_3$ from 18.0 mol % to 33.0 mol %, $Nb_2O_5$ from 1.0 mol % to 30.0 mol %, at least one oxide selected from $WO_3$, $ZrO_2$, SrO, CaO, $Li_2O$, MgO, ZnO, $Y_2O_3$, $Ta_2O_5$, BaO, CdO, $Bi_2O_3$, PbO, $HfO_2$, $TeO_2$, $TiO_2$, $Al_2O_3$, $Gd_2O_3$, $GeO_2$, $K_2O$, $La_2O_3$, $Na_2O$, $MoO_3$, FeO, $Fe_2O_3$, and $Yb_2O_3$, subject to the proviso that: $TiO_2$ is from 0.0 mol % to 22.0 mol %; ZnO is from 0.0 mol % to 10.0 mol %; a sum of ($SiO_2+B_2O_3$) is from 3.0 mol % to 50.0 mol %; a sum of ($Y_2O_3+GeO_2+Ta_2O_5+Al_2O_3+MoO_3+PbO+TeO_2+FeO+Fe_2O_3$) is from 0.0 mol % to 0.5 mol %; a sum of a total content of divalent metal oxides RO and a total content of alkali metal oxides $Alk_2O$ (RO+$Alk_2O$) is from 0.0 mol % to 40.0 mol %; a sum of ($Bi_2O_3$+PbO) is from 0.0 mol % to 20.0 mol %, and wherein the glass is substantially free of fluorine. Further, the glass satisfies formula (XVI):

$$P_n-(1.11+0.18*P_d)\geq 0.000 \qquad (XVI)$$

where $P_n$ is a refractive index parameter having a value of from 1.7 to 1.95 and is calculated according to formula (XIV):

$$P_n=1.76448-0.0025993*SiO_2-0.0032405*B_2O_3+\\0.0080741*La_2O_3+0.0043523*TiO_2+\\0.00068765*ZnO+0.0025517*ZrO_2+\\0.00044436*CaO+0.010555*Nb_2O_5-\\0.00096472*MgO+0.0018347*BaO+\\0.0042527*WO_3+0.0074402*Gd_2O_3+\\0.0051472*Y_2O_3+0.0084813*Ta_2O_5-\\0.00038955*Li_2O-0.0030622*Al_2O_3-\\0.0018065*Na_2O-0.0020469*GeO_2+\\0.00031047*SrO+0.012300*Bi_2O_3+\\0.0057762*Yb_2O_3-0.0023916*K_2O+\\0.0046338*PbO+0.003511*TeO_2 \qquad (XIV)$$

where $P_d$ is a density parameter calculated according to formula (XV):

$$P_d=-0.017278*SiO_2-0.021239*B_2O_3+\\0.052881*La_2O_3-0.0055*TiO_2+0.0094*ZnO+$$

0.00959*ZrO$_2$−0.00513*CaO+0.00483*Nb$_2$O$_5$−
0.00634*MgO+0.017909*BaO+
0.035197*WO$_3$+0.065396*Gd$_2$O$_3$+
0.028828*Y$_2$O$_3$+0.05192*Ta$_2$O$_5$−
0.011038*Li$_2$O−0.024078*Al$_2$O$_3$−
0.012419*Na$_2$O−0.00481*GeO$_2$+0.00629*SrO+
0.085597*Bi$_2$O$_3$+0.068626*Yb$_2$O$_3$−
0.022501*K$_2$O+0.042687*PbO+0.00506*TeO$_2$+
4.42476    (XV)

and
wherein the glass has a transmittance index $T_i$ of from 0.485 to 0.600, where $T_i$ is calculated according to formula (XII):

$$T_i = \frac{(La_2O_3 + Gd_2O_3 + ZrO_2)}{(La_2O_3 + Gd_2O_3 + ZrO_2 + TiO_2 + Nb_2O_5)} \quad \text{(XII)}$$

and each oxide listed in formula (XIV), formula (XV), and formula (XII) refers to the amount of the oxide, expressed in mol %, in the glass.

According to one more embodiment of the present disclosure, a glass includes SiO$_2$ at 3.0 mol % or greater, B$_2$O$_3$ at 1.0 mol % or greater, Nb$_2$O$_5$ from 0.5 mol % to 25.0 mol %, a total content of divalent metal oxides RO of 3.0 mol % or greater, and at least one oxide selected from WO$_3$, ZrO$_2$, SrO, CaO, Li$_2$O, MgO, ZnO, Y$_2$O$_3$, Ta$_2$O$_5$, BaO, CdO, Bi$_2$O$_3$, PbO, HfO$_2$, TeO$_2$, TiO$_2$, Al$_2$O$_3$, Gd$_2$O$_3$, GeO$_2$, K$_2$O, La$_2$O$_3$, Na$_2$O, and Yb$_2$O$_3$, subject to the proviso that: CaO is from 0.0 mol % to 32.0 mol %; Li$_2$O is from 0.0 mol % to 7.0 mol %; MgO is from 0.0 mol % to 5.0 mol %; Y$_2$O$_3$ is from 0.0 mol % to 1.5 mol %; Ta$_2$O$_5$ is from 0.0 mol % to 0.5 mol %; BaO is from 0.0 mol % to 12.0 mol %; CdO is from 0.0 mol % to 10.0 mol %; Bi$_2$O$_3$ is from 0.0 mol % to 20.0 mol %; PbO is from 0.0 mol % to 1.0 mol %; HfO$_2$ is from 0.0 mol % to 5.0 mol %; TeO$_2$ is from 0.0 mol % to 5.0 mol %; TiO$_2$ is from 0.0 mol % to 18.0 mol %; ZnO is from 0.0 mol % to 2.0 mol %; fluorine is from 0.0 atomic % to 1.0 atomic %; a total content of rare earth metal oxides RE$_2$O$_3$ is from 0.0 mol % to 23.0 mol %; a sum of (RE$_2$O$_3$+TiO$_2$+Nb$_2$O$_5$+ZrO$_2$+Bi$_2$O$_3$+WO$_3$) is 25.0 mol % or greater; a sum of (SiO$_2$+B$_2$O$_3$) is from greater than 0.0 mol % to 50.0 mol %; and a sum of (SiO$_2$+B$_2$O$_3$+Alk$_2$O+ MgO+CaO+SrO+BaO+ZnO) is from 4.0 mol % to 69.0 mol %, where Alk$_2$O is a total content of alkali metal oxides. The glass satisfies formula (XVII):

$$P_n-(2.23-0.71*T_i) \geq 0.000 \quad \text{(XVII)}$$

where $P_n$ is a refractive index parameter having a value of from 1.75 to 1.95, and where the refractive index parameter $P_n$ is calculated according to formula (XIV):

$P_n$=1.76448−0.0025993*SiO$_2$−0.0032405*B$_2$O$_3$+
0.0080741*La$_2$O$_3$+0.0043523*TiO$_2$+
0.00068765*ZnO+0.0025517*ZrO$_2$+
0.00044436*CaO+0.010555*Nb$_2$O$_5$−
0.00096472*MgO+0.0018347*BaO+
0.0042527*WO$_3$+0.0074402*Gd$_2$O$_3$+
0.0051472*Y$_2$O$_3$+0.0084813*Ta$_2$O$_5$−
0.00038955*Li$_2$O−0.0030622*Al$_2$O$_3$−
0.0018065*Na$_2$O−0.0020469*GeO$_2$+
0.00031047*SrO+0.012300*Bi$_2$O$_3$+
0.0057762*Yb$_2$O$_3$−0.0023916*K$_2$O+
0.0046338*PbO+0.003511*TeO$_2$    (XIV)

where $T_i$ is a transmittance index of the glass calculated according to formula (XII):

$$T_i = \frac{(La_2O_3 + Gd_2O_3 + ZrO_2)}{(La_2O_3 + Gd_2O_3 + ZrO_2 + TiO_2 + Nb_2O_5)} \quad \text{(XII)}$$

and
wherein the glass has a density parameter $P_d$ of less than 4.5, where the density parameter $P_d$ is calculated according to formula (XV):

$P_d$=−0.017278*SiO$_2$−0.021239*B$_2$O$_3$+
0.052881*La$_2$O$_3$−0.0055*TiO$_2$+0.0094*ZnO+
0.00959*ZrO$_2$−0.00513*CaO+0.00483*Nb$_2$O$_5$−
0.00634*MgO+0.017909*BaO+
0.035197*WO$_3$+0.065396*Gd$_2$O$_3$+
0.028828*Y$_2$O$_3$+0.05192*Ta$_2$O$_5$−
0.011038*Li$_2$O−0.024078*Al$_2$O$_3$−
0.012419*Na$_2$O−0.00481*GeO$_2$+0.00629*SrO+
0.085597*Bi$_2$O$_3$+0.068626*Yb$_2$O$_3$−
0.022501*K$_2$O+0.042687*PbO+0.00506*TeO$_2$+
4.42476    (XV)

and each oxide listed in formula (XIV), formula (XV), and formula (XII) refers to the amount of the oxide, expressed in mol %, in the glass.

These and other aspects, objects, and features of the present disclosure will be understood and appreciated by those skilled in the art upon studying the following specification, claims, and appended drawings.

DETAILED DESCRIPTION

Figure 1:
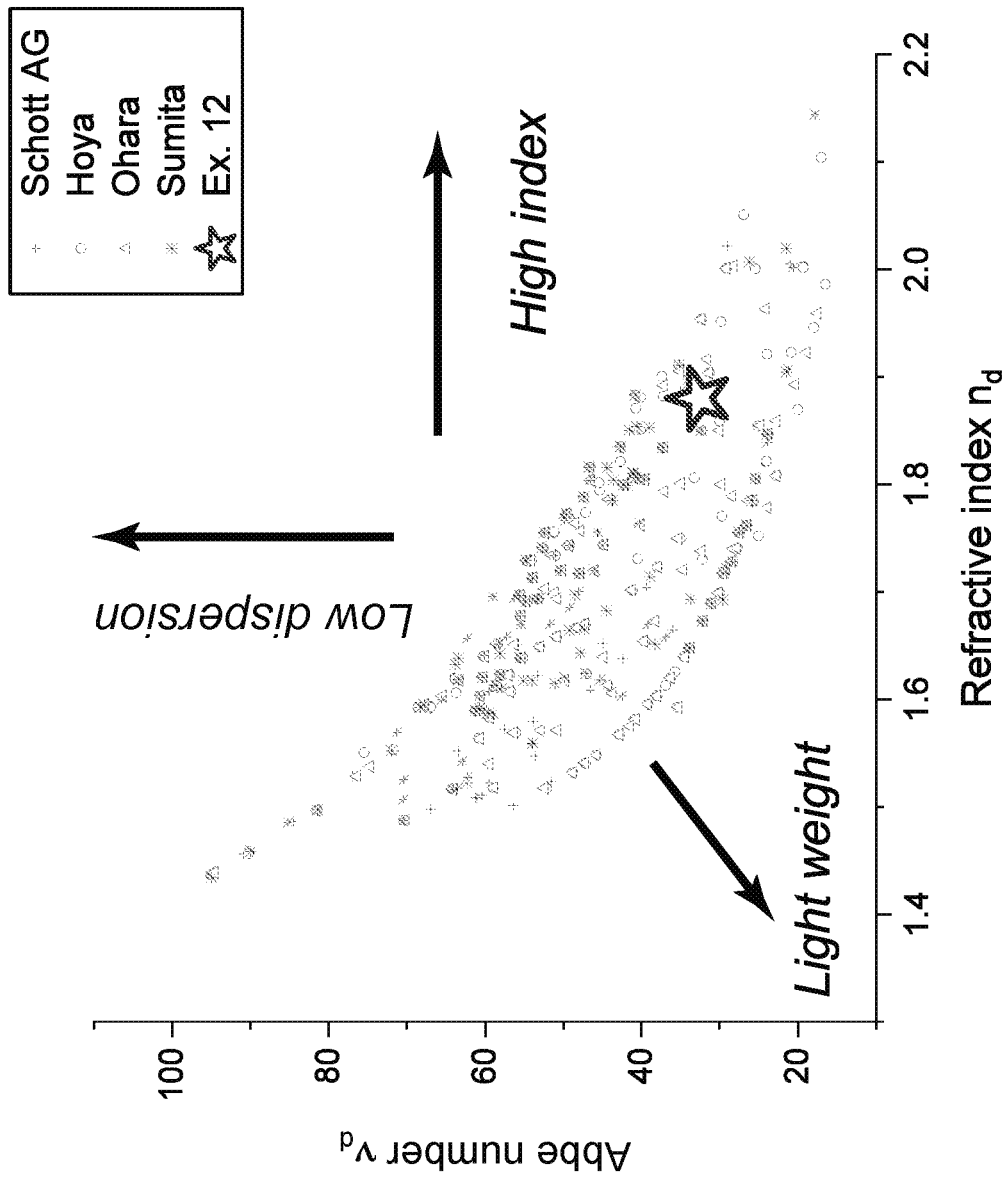
FIG. 1 is a plot illustrating the relationship between measured refractive index $n_d$ (measured at 587.56 nm) and Abbe number $v_d$ for some prior art glasses and an exemplary glass according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including, without limitation, matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "formed from" can mean one or more of comprises, consists essentially of, or consists of. For example, a component that is formed from a particular material can comprise the particular material, consist essentially of the particular material, or consist of the particular material.

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected. In some embodiments, where indicated, the compositions may be expressed in terms of as-batched percent by weight of oxides (wt %).

In the case when fluorine is added to or is present in an oxide glass, the molecular representation of the resulting glass composition may be expressed in different ways. In the present disclosure, the content of fluorine as a single term, when present, is expressed in terms of atomic percent (at. %), which is determined based on the fraction of fluorine in a total sum of all atoms in a glass composition multiplied by a factor of 100.

In the present disclosure, the following method of representation of fluorine-containing compositions and concentration ranges is used. The concentration limits for all oxides (e.g. $SiO_2$, $B_2O_3$, $Na_2O$, etc.) are presented under the assumption that the respective cations (such as, for example, silicon [$Si^{4+}$], boron [$B^{3+}$], sodium [$Na^+$], etc.) are initially presented in the form of the corresponding oxides. When fluorine is present, for the purposes of calculating the concentration of components of the composition, some part of the oxygen in the oxide is equivalently replaced with fluorine (i.e. one atom of oxygen is replaced with two atoms of fluorine). The said fluorine is assumed to be present in the form of silicon fluoride ($SiF_4$); accordingly, the total sum of all oxides plus $SiF_4$ is assumed to be 100 mole percent or 100 weight percent in all compositions.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol %.

As used herein, the term "tramp," when used to describe a particular constituent component in a glass composition, refers to a constituent component that is not intentionally added to the glass composition and is present in an amount of less than 0.05 mol %. Tramp components may be unintentionally added to the glass composition as an impurity in another constituent component and/or through migration of the tramp component into the composition during processing of the glass composition.

The term "glass former" is used herein to refer to a component that, being solely present in the glass composition (i.e., without other components, except for tramps), is able to form a glass when cooling the melt at a rate of not greater than about 200° C./min to about 300° C./min.

The term "modifier", as used herein, refers to the oxides of monovalent or divalent metals, i.e., $M_2O$ or $MO$, where "M" stands for a metal. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in $EuO$, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting glass composition is recalculated assuming that two moles of $CeO_2$ is equivalent to one mole of $Ce_2O_3$, and the resulting glass composition is presented in terms of $Ce_2O_3$. As used herein, the term "$RE_mO_n$" is used to refer to the total content of rare earth metal oxides in all redox states present, and the term "$RE_2O_3$" is used to refer to the total content of rare earth metal oxides in the "+3" redox state.

The measured density values for the glasses reported herein were measured at room temperature in units of $g/cm^3$ using a Helium pycnometer having an error of 0.001 $g/cm^3$. As used herein, density measurements at room temperature (specified as dRT) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the error of 0.001 $g/cm^3$, and thus is not expected to impact the room temperature density measurements reported herein.

As used herein, the term "low density" means a density less than or equal to 4.5 $g/cm^3$ and the term "low density parameter" means a value of the density parameter $P_d$ less than or equal to 4.5 $g/cm^3$.

As used herein, good glass forming ability refers to a resistance of the melt to devitrification as the material cools. Glass forming ability can be measured by determining the critical cooling rate of the melt. The terms "critical cooling rate" or "$v_{cr}$" are used herein to refer to the minimum cooling rate at which a melt of a given composition forms a glass free of crystals visible under an optical microscope under magnification from 100× to 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" is used herein to refer to a temperature above which the glass composition is completely liquid with no crystallization of constituent components of the glass. The liquidus temperature values reported herein were obtained by measuring samples using either DSC or by isostatic hold of samples wrapped in platinum foil. For samples measured using DSC, powdered samples were heated at 10 K/min to 1250° C. The end of the endothermal event corresponding to the melting of crystals was taken as the liquidus temperature. For the second technique (isotactic hold), a glass block (about 1 $cm^3$) was wrapped in platinum foil, to avoid volatilization, and placed in a furnace at a given temperature for 17 hours. The glass block was then observed under an optical microscope to check for crystals.

The refractive index values reported herein were measured at room temperature (about 25° C.), unless otherwise specified. The refractive index values for a glass sample were measured using a Metricon Model 2010 prism coupler refractometer with an error of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" is used herein to refer to a refractive index calculated as described above at a wavelength of 587.56 nm, which corresponds to the helium d-line wavelength. The term "refractive index $n_C$" is used herein to refer to a refractive index calculated as described above at a wavelength of 656.3 nm. The term "refractive index $n_F$" is used herein to refer to a refractive index calculated as described above at a wavelength of 486.1 nm. The term "refractive index $n_g$" is used herein to refer to a refractive index calculated as described above at a wavelength of 435.8 nm.

As used herein, the terms "high refractive index" or "high index" refers to a refractive index value of a glass that is greater than or equal to at least 1.70, unless otherwise indicated. Where indicated, terms "high refractive index" or "high index" refers to a refractive index value of a glass that is greater than or equal to at least 1.75, greater than or equal to 1.80, or greater than or equal to 1.85. As used herein, the term "high refractive index parameter" refers to a value of the refractive index parameter $P_n$ that is greater than or equal to at least 1.70.

The terms "dispersion" and "optical dispersion" are used interchangeably to refer to a difference or ratio of the refractive indices of a glass sample at predetermined wavelengths. One numerical measure of optical dispersion reported herein is the Abbe number, which can be calculated by the formula: $v_x=(n_x-1)/(n_F-n_C)$, where "x" in the present disclosure stands for one of the commonly used wavelengths (for example, 587.56 nm [d-line] or 589.3 nm [D-line]), $n_x$ is the refractive index at this wavelength, and $n_F$ and $n_C$ are refractive indices at the wavelengths 486.1 nm (F-line) and 656.3 nm (C-line), respectively. The numerical values of $v_d$ and $v_D$ differ very slightly, mostly within ±0.1% to ±0.2%. As reported herein, the dispersion of a glass sample is represented by the Abbe number ($v_d$), which characterizes the relationship between the refractive indices of the sample at three different wavelengths according to formula (I):

$$v_d=(n_d-1)/(n_F-n_C) \quad (I)$$

where $n_d$ is the calculated refractive index at 587.56 nm (d-line), $n_F$ is the calculated refractive index at 486.1 nm, and $n_C$ is the calculated refractive index at 656.3 nm. A higher Abbe number corresponds to a lower optical dispersion.

The numerical value for an Abbe number corresponding to "high dispersion" or "low dispersion" may vary depending on the refractive indices for which the Abbe number is calculated. In some cases, an Abbe number corresponding to "low dispersion" for a high refractive index glass may be lower than an Abbe number corresponding to "low dispersion" for a low refractive index glass. In other words, as the calculated refractive index value increases, the value of the Abbe number corresponding to low dispersion decreases.

As used herein, the relative partial dispersion $P_{g-F}$ can be determined according to formula (II):

$$P_{g-F}=(n_g-n_F)/(n_F-n_C) \quad (II)$$

where $n_g$ is the calculated refractive index at 435.8 nm, $n_F$ is the calculated refractive index at 486.1 nm, and $n_C$ is the calculated refractive index at 656.3 nm.

As used herein, unless otherwise specified, the term "internal transmittance" is used to refer to the transmittance through a glass sample that is corrected for Fresnel losses. The term "transmittance" is used to refer to transmittance values for which Fresnel losses are not accounted for. Transmittance of the glass samples were measured on 2 mm thick samples with a Carry 5000 Spectrometer at wavelengths of from 250 nm to 2500 nm, at a resolution of 1 nm, and using an integrating sphere. The internal transmittance values for 10 mm thick samples was calculated between 375 nm and 1175 nm using the measured refractive index and the measured raw transmittance.

The term "blue light" is used herein to refer to blue and ultraviolet light corresponding to wavelengths of from about 330 nm to about 480 nm. The term "internal transmittance for blue light" refers to transmittance to blue light that is corrected for Fresnel losses. The term "transmittance for blue light" refers to transmittance to blue light in which Fresnel losses are not taken into account.

Embodiments of the present disclosure generally relate to silicoborate and borosilicate glasses which have a high refractive index and a low density. In some embodiments, the glasses may also be characterized by a low optical dispersion and/or a high transmittance in the visible and near-ultraviolet (near-UV) range of the electromagnetic spectrum. The glasses of the present disclosure can contain silica ($SiO_2$) and boron oxide ($B_2O_3$) as glass formers, and one or more additional modifiers and/or index raisers, examples of which include $ZrO_2$, $La_2O_3$, $Nb_2O_5$, $TiO_2$, and $Gd_2O_3$. In some embodiments, the glasses may include a relatively low $TiO_2$ content and a relatively high content of $La_2O_3$, $ZrO_2$, and/or other low-absorbing oxide species. According to some embodiments, the glasses can include oxides such as $SiO_2$, $B_2O_3$, CaO, $La_2O_3$, $ZrO_2$, $TiO_2$, and/or $Nb_2O_5$ in proportions that provide a batch composition having acceptable glass-forming ability.

According to an embodiment of the present disclosure, the glasses described herein include silicon dioxide ($SiO_2$) and/or boron oxide ($B_2O_3$) as glass formers. Increasing amounts of glass-forming oxides, such as $SiO_2$ and $B_2O_3$, can result in a corresponding increase in viscosity values at a given temperature, which may protect the melts from crystallization during cooling and thus provide a glass having a lower critical cooling rate. In some embodiments, the glass of the present disclosure may include both $SiO_2$ and $B_2O_3$ to provide a glass having a desirable critical cooling rate, i.e., a desired degree of glass forming ability.

According to one embodiment, $SiO_2$ can be present the glass in an amount of greater than 3.0 mol %, greater than 4.0 mol %, greater than 5.0 mol %, greater than 10.0 mol %, greater than 15.0 mol %, greater than 20.0 mol %, greater than 25.0 mol %, greater than 30.0 mol %, greater than 35.0 mol %, or greater than 40.0 mol %. In some embodiments, $SiO_2$ can be present in the glass in an amount of from 3.0 mol % to 50.0 mol %. For example, $SiO_2$ can be present in an amount of from 3.0 mol % to 50.0 mol %, 4.0 mol % to 50.0 mol %, 5.0 mol % to 50.0 mol %, 10.0 mol % to 50.0 mol %, 15.0 mol % to 50.0 mol %, 20.0 mol % to 50.0 mol %, 24.0 mol % to 50.0 mol %, 29.0 mol % to 50.0 mol %, 35.0 mol % to 50.0 mol %, 40.0 mol % to 50.0 mol %, 45.0 mol % to 50.0 mol %, 3.0 mol % to 45.0 mol %, 4.0 mol % to 45.0 mol %, 5.0 mol % to 45.0 mol %, 10.0 mol % to 45.0 mol %, 15.0 mol % to 45.0 mol %, 20.0 mol % to 45.0 mol %, 24.0 mol % to 45.0 mol %, 29.0 mol % to 45.0 mol %, 35.0 mol % to 45.0 mol %, 40.0 mol % to 45.0 mol %, 3.0 mol % to 40.0 mol %, 4.0 mol % to 40.0 mol %, 5.0 mol % to 40.0 mol %, 10.0 mol % to 40.0 mol %, 15.0 mol % to 40.0 mol %, 20.0 mol % to 40.0 mol %, 24.0 mol % to 40.0 mol %, 29.0 mol % to 40.0 mol %, 35.0 mol % to 40.0 mol %, 3.0 mol % to 35.0 mol %, 4.0 mol % to 35.0 mol %, 5.0 mol % to 35.0 mol %, 10.0 mol % to 35.0 mol %, 15.0 mol % to 35.0 mol %, 20.0 mol % to 35.0 mol %, 24.0 mol % to 35.0 mol %, 29.0 mol % to 35.0 mol %, 3.0 mol % to 29.0 mol %, 4.0 mol % to 29.0 mol %, 5.0 mol % to 29.0 mol %, 10.0 mol % to 29.0 mol %, 15.0 mol % to 29.0 mol %, 20.0 mol % to 29.0 mol %, 24.0 mol % to 29.0 mol %, 3.0 mol % to 24.0 mol %, 4.0 mol % to 24.0 mol %, 5.0 mol % to 24.0 mol %, 10.0 mol % to 24.0 mol %, 15.0 mol % to 24.0 mol %, 20.0 mol % to 24.0 mol %, 3.0 mol % to 20.0 mol %, 4.0 mol % to 20.0 mol %, 5.0 mol % to 20.0 mol %, 10.0 mol % to 20.0 mol %, or 15.0 mol % to 20.0 mol %.

In some embodiments, $SiO_2$ can be present in the glass in an amount of from 0.3 wt % to 30.0 wt %. For example, $SiO_2$ can be present in an amount of from 0.3 wt % to 30.0 wt %, 1.0 wt % to 30.0 wt %, 5.0 wt % to 30.0 wt %, 8.0 wt % to 30.0 wt %, 10.0 wt % to 30.0 wt %, 15.0 wt % to 30.0 wt %, 20.0 wt % to 30.0 wt %, 25.0 wt % to 30.0 wt %, 0.3 wt % to 25.0 wt %, 1.0 wt % to 25.0 wt %, 5.0 wt % to 25.0 wt %, 8.0 wt % to 25.0 wt %, 10.0 wt % to 25.0 wt %, 15.0 wt % to 25.0 wt %, 20.0 wt % to 25.0 wt %, 0.3 wt % to 20.0 wt %, 1.0 wt % to 20.0 wt %, 5.0 wt % to 20.0 wt %, 8.0 wt % to 20.0 wt %, 10.0 wt % to 20.0 wt %, 15.0 wt % to 20.0 wt %, 0.3 wt % to 15.0 wt %, 1.0 wt % to 15.0 wt %, 5.0 wt % to 15.0 wt %, 8.0 wt % to 15.0 wt %, 10.0 wt % to 15.0 wt %, 0.3 wt % to 10.0 wt %, 1.0 wt % to 10.0 wt %, or 5.0 wt % to 10.0 wt %.

According to one embodiment of the present disclosure, $B_2O_3$ can be present in the glass in an amount of 1.0 mol % or greater. For example, $B_2O_3$ can be present in an amount of 1.0 mol % or greater, 3.0 mol % or greater, 5.0 mol % or greater, 10.0 mol % or greater, 15.0 mol % or greater, or 20.0 mol % or greater. In some embodiments, $B_2O_3$ can be present in the glass in an amount of from 1.0 mol % to 35.0 mol %. For example, $B_2O_3$ can be present in the glass in an amount of from 1.0 mol % to 35.0 mol %, 1.0 mol % to 33.0 mol %, 1.0 mol % to 31.0 mol %, 1.0 mol % to 30.0 mol %, 1.0 mol % to 25.0 mol %, 1.0 mol % to 20.0 mol %, 1.0 mol % to 19.0 mol %, 1.0 mol % to 18.0 mol %, 1.0 mol % to 15.0 mol %, 1.0 mol % to 10.0 mol %, 1.0 mol % to 9.0 mol %, 5.0 mol % to 35.0 mol %, 5.0 mol % to 33.0 mol %, 5.0 mol % to 31.0 mol %, 5.0 mol % to 30.0 mol %, 5.0 mol % to 25 mol %, 5.0 mol % to 20.0 mol %, 5.0 mol % to 19.0 mol %, 5.0 mol % to 18.0 mol %, 5.0 mol % to 15.0 mol %, 5.0 mol % to 10.0 mol %, 5.0 mol % to 9.0 mol %, 9.0 mol % to 35.0 mol %, 9.0 mol % to 33.0 mol %, 9.0 mol % to 31.0 mol %, 9.0 mol % to 30.0 mol %, 9.0 mol % to 25.0 mol %, 9.0 mol % to 20.0 mol %, 9.0 mol % to 19.0 mol %, 9.0 mol % to 18.0 mol %, 9.0 mol % to 15.0 mol %, 9.0 mol % to 10.0 mol %, 10.0 mol % to 35.0 mol %, 10.0 mol % to 33.0 mol %, 10.0 mol % to 31.0 mol %, 10.0 mol % to 30.0 mol %, 10.0 mol % to 25.0 mol %, 10.0 mol % to 20.0 mol %, 10.0 mol % to 19.0 mol %, 10.0 mol % to 18.0 mol %, 10.0 mol % to 15.0 mol %, 15.0 mol % to 35.0 mol %, 15.0 mol % to 33.0 mol %, 15.0 mol % to 31.0 mol %, 15.0 mol % to 30.0 mol %, 15.0 mol % to 25.0 mol %, 15.0 mol % to 20.0 mol %, 15.0 mol % to 19.0 mol %, 15.0 mol % to 18.0 mol %, 18.0 mol % to 35.0 mol %, 18.0 mol % to 33.0 mol %, 18.0 mol % to 31.0 mol %, 18.0 mol % to 30.0 mol %, 18.0 mol % to 25 mol %, 18.0 mol % to 20.0 mol %, 18.0 mol % to 19.0 mol %, 19.0 mol % to 35.0 mol %, 19.0 mol % to 33.0 mol %, 19.0 mol % to 31.0 mol %, 19.0 mol % to 30.0 mol %, 19.0 mol % to 25.0 mol %, 19.0 mol % to 20.0 mol %, 20.0 mol % to 35.0 mol %, 20.0 mol % to 33.0 mol %, 20.0 mol % to 31.0 mol %, or 20.0 mol % to 30.0 mol %.

In some embodiments, $B_2O_3$ can be present in the glass in an amount of from 0.3 wt % to 30.0 wt %. For example, $B_2O_3$ can be present in an amount of from 0.3 wt % to 30.0 wt %, 1.0 wt % to 30.0 wt %, 5.0 wt % to 30.0 wt %, 8.0 wt % to 30.0 wt %, 10.0 wt % to 30.0 wt %, 15.0 wt % to 30.0 wt %, 20.0 wt % to 30.0 wt %, 25.0 wt % to 30.0 wt %, 0.3 wt % to 25.0 wt %, 1.0 wt % to 25.0 wt %, 5.0 wt % to 25.0 wt %, 8.0 wt % to 25.0 wt %, 10.0 wt % to 25.0 wt %, 15.0 wt % to 25.0 wt %, 20.0 wt % to 25.0 wt %, 0.3 wt % to 20.0 wt %, 1.0 wt % to 20.0 wt %, 5.0 wt % to 20.0 wt %, 8.0 wt % to 20.0 wt %, 10.0 wt % to 20.0 wt %, 15.0 wt % to 20.0 wt %, 0.3 wt % to 15.0 wt %, 1.0 wt % to 15.0 wt %, 5.0 wt % to 15.0 wt %, 8.0 wt % to 15.0 wt %, 10.0 wt % to 15.0 wt %, 0.3 wt % to 10.0 wt %, 1.0 wt % to 10.0 wt %, or 5.0 wt % to 10.0 wt %.

However, the combination of $SiO_2$ and $B_2O_3$ may result in a decrease of the refractive index, which may make it more challenging to provide a glass having the desired high refractive index. Therefore, in some embodiments, total amount of $SiO_2$ and $B_2O_3$ ($SiO_2+B_2O_3$) in the glasses may be limited. According to one embodiment, the glasses of the present disclosure include a total amount of $SiO_2$ and $B_2O_3$ ($SiO_2+B_2O_3$) of from greater than 0.0 mol % to 50.0 mol %. For example, a sum of ($SiO_2+B_2O_3$) in the glass can be from greater than 0.0 mol % to 50.0 mol %, 1.0 mol % to 50.0 mol %, 3.0 mol % to 50.0 mol %, 5.0 mol % to 50.0 mol %, 10.0 mol % to 50.0 mol %, 15.0 mol % to 50.0 mol %, 20.0 mol % to 50.0 mol %, 25.0 mol % to 50.0 mol %, 30.0 mol % to 50.0 mol %, 35.0 mol % to 50.0 mol %, 40.0 mol % to 50.0 mol %, 45.0 mol % to 50.0 mol %, greater than 0.0 mol % to 46.0 mol %, 1.0 mol % to 46.0 mol %, 3.0 mol % to 46.0 mol %, 5.0 mol % to 46.0 mol %, 10.0 mol % to 46.0 mol %, 15.0 mol % to 46.0 mol %, 20.0 mol % to 46.0 mol %, 25.0 mol % to 46.0 mol %, 30.0 mol % to 46.0 mol %, 32.0 mol % to 44.0 mol %, 35.0 mol % to 46.0 mol %, 40.0 mol % to 46.0 mol %, greater than 0.0 mol % to 40.0 mol %, 1.0 mol % to 40.0 mol %, 3.0 mol % to 40.0 mol %, 5.0 mol % to 40.0 mol %, 10.0 mol % to 40.0 mol %, 15.0 mol % to 40.0 mol %, 20.0 mol % to 40.0 mol %, 25.0 mol % to 40.0 mol %, 30.0 mol % to 40.0 mol %, 35.0 mol % to 40.0 mol %, greater than 0.0 mol % to 35.0 mol %, 1.0 mol % to 35.0 mol %, 3.0 mol % to 35.0 mol %, 5.0 mol % to 35.0 mol %, 10.0 mol % to 35.0 mol %, 15.0 mol % to 35.0 mol %, 20.0 mol % to 35.0 mol %, 25.0 mol % to 35.0 mol %, 30.0 mol % to 35.0 mol %, greater than 0.0 mol % to 30.0 mol %, 1.0 mol % to 30.0 mol %, 3.0 mol % to 30.0 mol %, 5.0 mol % to 30.0 mol %, 10.0 mol % to 30.0 mol %, 15.0 mol % to 30.0 mol %, 20.0 mol % to 30.0 mol %, 25.0 mol % to 30.0 mol %, greater than 0.0 mol % to 25.0 mol %, 1.0 mol % to 25.0 mol %, 3.0 mol % to 25.0 mol %, 5.0 mol % to 25.0 mol %, 10.0 mol % to 25.0 mol %, 15.0 mol % to 25.0 mol %, 20.0 mol % to 25.0 mol %, greater than 0.0 mol % to 20.0 mol %, 1.0 mol % to 20.0 mol %, 3.0 mol % to 20.0 mol %, 5.0 mol % to 20.0 mol %, 10.0 mol % to 20.0 mol %, 15.0 mol % to 20.0 mol %, greater than 0.0 mol % to 15.0 mol %, 1.0 mol % to 15.0 mol %, 3.0 mol % to 15.0 mol %, 5.0 mol % to 15.0 mol %, 10.0 mol % to 15.0 mol %, greater than 0.0 mol % to 10.0 mol %, 1.0 mol % to 10.0 mol %, 3.0 mol % to 10.0 mol %, 5.0 mol % to 10.0 mol %, greater than 0.0 mol % to 5.0 mol %, 1.0 mol % to 5.0 mol %, 3.0 mol % to 5.0 mol %, greater than 0.0 mol % to 3.0 mol %, or 1.0 mol % to 3.0 mol %.

In some embodiments, a ratio of $SiO_2$ to $B_2O_3$ ($SiO_2/B_2O_3$), in percent by weight of oxides, is from 0.40 to 0.70. For example, a ratio of $SiO_2$ to $B_2O_3$ ($SiO_2/B_2O_3$), in percent by weight of oxides, can be from 0.40 to 0.70, 0.40 to 0.65, 0.40 to 0.60, 0.40 to 0.55, 0.40 to 0.50, 0.45 to 0.70, 0.45 to 0.65, 0.45 to 0.60, 0.45 to 0.55, 0.45 to 0.50, 0.50 to 0.70, 0.50 to 0.65, 0.50 to 0.60, 0.50 to 0.55, 0.55 to 0.70, 0.55 to 0.65, 0.55 to 0.60, or 0.60 to 0.70.

In some embodiments, a sum (in wt %) of $SiO_2$ and $B_2O_3$ ($SiO_2+B_2O_3$) is from 1.0 wt % to 30.0 wt %. For example, a sum ($SiO_2+B_2O_3$), in wt %, is from 1.0 wt % to 30.0 wt %, 5.0 wt % to 30.0 wt %, 8.0 wt % to 30.0 wt %, 10.0 wt % to 30.0 wt %, 15.0 wt % to 30.0 wt %, 20.0 wt % to 30.0 wt %, 25.0 wt % to 30.0 wt %, 1.0 wt % to 25.0 wt %, 5.0 wt % to 25.0 wt %, 8.0 wt % to 25.0 wt %, 10.0 wt % to 25.0 wt %, 15.0 wt % to 25.0 wt %, 20.0 wt % to 25.0 wt %, 1.0 wt % to 20.0 wt %, 5.0 wt % to 20.0 wt %, 8.0 wt % to 20.0 wt %, 10.0 wt % to 20.0 wt %, 15.0 wt % to 20.0 wt %, 1.0 wt % to 15.0 wt %, 5.0 wt % to 15.0 wt %, 8.0 wt % to 15.0 wt %, 10.0 wt % to 15.0 wt %, 1.0 wt % to 10.0 wt %, or 5.0 wt % to 10.0 wt %.

In some other embodiments, a ratio, expressed in wt % of ($SiO_2/(SiO_2+B_2O_3)$) is greater than 0.0 to less than or equal to 0.50. For example, a ratio, expressed in wt % of ($SiO_2/(SiO_2+B_2O_3)$) is greater than 0.0 to less than or equal to 0.50, greater than 0.0 to less than or equal to 0.40, greater than 0.0 to less than or equal to 0.30, greater than 0.0 to less than or equal to 0.20, greater than 0.0 to less than or equal to 0.10, greater than 0.0 to less than or equal to 0.05, greater than or equal to 0.05 to less than or equal to 0.50, greater than or equal to 0.05 to less than or equal to 0.40, greater than or equal to 0.05 to less than or equal to 0.30, greater than or equal to 0.05 to less than or equal to 0.20, greater than or equal to 0.05 to less than or equal to 0.10, greater than or equal to 0.10 to less than or equal to 0.50, greater than or equal to 0.10 to less than or equal to 0.40, greater than or equal to 0.10 to less than or equal to 0.30, greater than or equal to 0.10 to less than or equal to 0.20, greater than or equal to 0.20 to less than or equal to 0.50, greater than or equal to 0.20 to less than or equal to 0.40, greater than or equal to 0.20 to less than or equal to 0.30, greater than or equal to 0.30 to less than or equal to 0.50, or greater than or equal to 0.30 to less than or equal to 0.40.

In some embodiments, it was found that concentrations of $SiO_2$ less than 3.0 mol % and concentrations of $B_2O_3$ less than 1.0 mol % result in a glass having lower glass forming ability, lower formability, and decreased chemical durability, which may not be suitable for many industrial applications. Conversely, when the concentrations of $SiO_2$ and $B_2O_3$ are too high, it may be difficult to achieve the desired high refractive index. Thus, in some embodiments, the glasses of the present disclosure include $SiO_2$ in an amount of from 3.0 mol % to 50.0 mol % and $B_2O_3$ in an amount of greater than or equal to 1.0 mol %, in amounts such that a sum of $SiO_2$ and $B_2O_3$ ($SiO_2+B_2O_3$) is less than or equal to 50.0 mol %. In some embodiments, the amount of $B_2O_3$ is further defined as being from 18.0 mol % to 33.0 mol %.

According to an embodiment of the present disclosure, the glass can include one or more index raisers that have been added to increase a refractive index of the glass. Examples of index raisers that can be used with the glasses of the present disclosure include titania ($TiO_2$), niobia ($Nb_2O_5$), zirconia ($ZrO_2$), and other rare earth metal oxides.

Titania ($TiO_2$) is generally expected to increase the refractive index of the glass, in combination with achieving a low density and/or acceptably low dispersion. In some examples, titania may produce a glass that is yellow or brown coloring, which can be addressed by bleaching, such as by melting and/or annealing in oxidation conditions and/or through the addition of one or more oxidizers, examples of which include $CeO_2$, $As_2O_5$, and $Mn_2O_3$, etc., to the glass batch. In some cases, titania at too high amount may cause crystallization of refractory species, e.g. rutile ($TiO_2$), sphene ($CaTiSiO_5$), and titanium niobates (e.g. $Ti_2Nb_{10}O_{29}$), etc., which may result in increasing the liquidus temperature of the glass and thus may decrease the glass-forming ability of the melt. In addition, at high concentrations, titania may cause liquid-liquid phase separation of the melt, which may result in a loss of transmittance of the glass. According to an embodiment of the present disclosure, these challenges can be addressed by limiting an amount of $TiO_2$ in the glass to less than or equal to 45 mol %. In some cases, the glass may be free or substantially free of $TiO_2$.

According to some embodiments, $TiO_2$ can be present in the glass in an amount of from 0.0 mol % to 45.0 mol %, 0.0 mol % to 40.0 mol %, 0.0 mol % to 35.0 mol %, 0.0 mol % to 30.0 mol %, 0.0 mol % to 25.0 mol %, 0.0 mol % to 22.0 mol %, 0.0 mol % to 20.0 mol %, 0.0 mol % to 18.0 mol %, 0.0 mol % to 13.0 mol %, 0.0 mol % to 12.0 mol %, 0.0 mol % to 6.0 mol %, 0.03 mol % to 45.0 mol %, 0.03 mol % to 40.0 mol %, 0.03 mol % to 35.0 mol %, 0.03 mol % to 30.0 mol %, 0.03 mol % to 25.0 mol %, 0.03 mol % to 22.0 mol %, 0.03 mol % to 20.0 mol %, 0.03 mol % to 18.0 mol %, 0.03 mol % to 13.0 mol %, 0.03 mol % to 12.0 mol %, 0.03 mol % to 6.0 mol %, 6.0 mol % to 45.0 mol %, 6.0 mol % to 40.0 mol %, 6.0 mol % to 35.0 mol %, 6.0 mol % to 30.0 mol %, 6.0 mol % to 25.0 mol %, 6.0 mol % to 22.0 mol %, 6.0 mol % to 20.0 mol %, 6.0 mol % to 18.0 mol %, 6.0 mol % to 13.0 mol %, 6.0 mol % to 12.0 mol %, 12.0 mol % to 45.0 mol %, 12.0 mol % to 40.0 mol %, 12.0 mol % to 35.0 mol %, 12.0 mol % to 30.0 mol %, 12.0 mol % to 25.0 mol %, 12.0 mol % to 22.0 mol %, 12.0 mol % to 20.0 mol %, 12.0 mol % to 18.0 mol %, 13.0 mol % to 45.0 mol %, 13.0 mol % to 40.0 mol %, 13.0 mol % to 35.0 mol %, 13.0 mol % to 30.0 mol %, 13.0 mol % to 25.0 mol %, 13.0 mol % to 22.0 mol %, 13.0 mol % to 20.0 mol %, 13.0 mol % to 18.0 mol %, 18.0 mol % to 45.0 mol %, 18.0 mol % to 40.0 mol %, 18.0 mol % to 35.0 mol %, 18.0 mol % to 30.0 mol %, 18.0 mol % to 25.0 mol %, 18.0 mol % to 22.0 mol %, 18.0 mol % to 20.0 mol %, 20.0 mol % to 45.0 mol %, 20.0 mol % to 40.0 mol %, 20.0 mol % to 35.0 mol %, 20.0 mol % to 30.0 mol %, 22.0 mol % to 45.0 mol %, 22.0 mol % to 40.0 mol %, 22.0 mol % to 35.0 mol %, 22.0 mol % to 30.0 mol %, 30.0 mol % to 45.0 mol %, or 30.0 mol % to 40.0 mol %. In some examples, $TiO_2$ is present in an amount of less than or equal to 18 mol %. In some examples, $TiO_2$ is present in an amount of from 0.0 wt % to 7.05 wt %. For example, $TiO_2$ can be present in an amount of from 0.0 wt % to 7.05 wt %, from 2.0 wt % to 7.05 wt %, from 5.0 wt % to 7.05 wt %, or from 2.0 wt % to 5.0 wt %. In some embodiments, a $TiO_2$ concentration of greater 18.0 mol %, and in some cases, greater than 22.0 mol %, was found to produce a glass having a lower transmittance than desired and/or result in a melt that tends to crystallize and/or become phase-separated. Thus, in some embodiments, an amount of $TiO_2$ present in the glass is preferably 22.0 mol % or less and more preferably 18.0 mol % or less.

Niobia ($Nb_2O_5$), like titania, can be used in some aspects of the present disclosure to increase the refractive index of glass while also maintaining a low density. However, niobia can introduce a yellow coloring to the glass that cannot be bleached in the same manner as titania, which can result in a loss of transmittance, particularly in the blue and UV range. Niobia, like titania, may cause crystallization and/or phase separation of the melt. In some cases, niobia may provide the glass with a high optical dispersion, which can be significantly higher than that induced by titania and some other index raisers, when added in similar concentrations. The effects of niobia can be affected by the other components of the glass, and thus it can be challenging to determine an exact limit for niobia. Thus, according to one aspect of the present disclosure, the amount of niobia is limited to less than or equal to 20 mol % and in some cases the glass may be free or substantially free of niobia. In some examples, however, the amount of niobia present may be greater than 20 mol %, based on the content of the components of the glass and/or in cases where high blue transmittance is not a high priority, for example. In some embodiments, a $Nb_2O_5$ amount of less than 0.5 mol % was found to increase the difficulty of achieving the desired high refractive index glass at an acceptable glass density. In some embodiments, it was found that with lower concentrations of $Nb_2O_5$, it was difficult to achieve a glass having the desired high refractive index at low density. However, when the concentration of $Nb_2O_5$ was too high, such as greater than 30.0 mol %, and in some cases greater than 25.0 mol %, the resulting glass may have a lower transmittance than desired and/or the glass melt may tend to crystallize and/or become phase separated. Therefore, according to some embodiments, $Nb_2O_5$ can be present in the glass from 0.0 mol % to 30.0 mol %. For example, $Nb_2O_5$ can be present in the glass from 0.0 mol % to 30.0 mol %, 0.0 mol % to 25.0 mol %, 0.0 mol % to 20.0 mol %, 0.0 mol % to 16.0 mol %, 0.0 mol % to 12.0 mol %, 0.0 mol % to 10.0 mol %, 0.0 mol % to 6.0 mol %, 0.0 mol % to 1.0 mol %, 0.0 mol % to 0.6 mol %, 0.0 mol % to 0.5 mol %, 0.5 mol % to 30.0 mol %, 0.5 mol % to 25.0 mol %, 0.5 mol % to 20.0 mol %, 0.5 mol % to 16.0 mol %, 0.5 mol % to 12.0 mol %, 0.5 mol % to 10.0 mol %, 0.5 mol % to 6.0 mol %, 0.5 mol % to 1.0 mol %, 0.5 mol % to 0.6 mol %, 0.6 mol % to 30.0 mol %, 0.6 mol % to 25.0 mol %, 0.6 mol % to 20.0 mol %, 0.6 mol % to 16.0 mol %, 0.6 mol % to 12.0 mol %, 0.6 mol % to 10.0 mol %, 0.6 mol % to 6.0 mol %, 0.6 mol % to 1.0 mol %, 1.0 mol % to 30.0 mol %, 1.0 mol % to 25.0 mol %, 1.0 mol % to 20.0 mol %, 1.0 mol % to 16.0 mol %, 1.0 mol % to 12.0 mol %, 1.0 mol % to 10.0 mol %, 1.0 mol % to 6.0 mol %, 6.0 mol % to 30.0 mol %, 6.0 mol % to 25.0 mol %, 6.0 mol % to 20.0 mol %, 6.0 mol % to 16.0 mol %, 6.0 mol % to 12.0 mol %, 6.0 mol % to 10.0 mol %, 10.0 mol % to 30.0 mol %, 10.0 mol % to 25.0 mol %, 10.0 mol % to 20.0 mol %, 10.0 mol % to 16.0 mol %, 10.0 mol % to 12.0 mol %, 12.0 mol % to 30.0 mol %, 12.0 mol % to 25.0 mol %, 12.0 mol % to 20.0 mol %, 12.0 mol % to 16.0 mol %, 16.0 mol % to 30.0 mol %, 16.0 mol % to 25.0 mol %, 16.0 mol % to 20.0 mol %, 20.0 mol % to 30.0 mol %, 20.0 mol % to 25.0 mol %, or 25.0 mol % to 30.0 mol %. In some examples, $Nb_2O_5$ can be present in an amount of from 0.3 wt % to 50.0 wt %. For example, $Nb_2O_5$ can be present in an amount of from 0.3 wt % to 50.0 wt %, from 0.3 wt % to 40.0 wt %, from 0.3 wt % to 30.0 wt %, from 0.3 wt % to 20.0 wt %, from 0.3 wt % to 10.0 wt %, from 5.0 wt % to 50.0 wt %, from 5.0 wt % to 40.0 wt %, from 5.0 wt % to 30.0 wt %, from 5.0 wt % to 20.0 wt %, from 5.0 wt % to 10.0 wt %, from 10.0 wt % to 50.0 wt %, from 10.0 wt % to 40.0 wt %, from 10.0 wt % to 30.0 wt %, from 10.0 wt % to 20.0 wt %, from 20.0 wt % to 50.0 wt %, from 20.0 wt % to 40.0 wt %, from 20.0 wt % to 30.0 wt %, from 30.0 wt % to 50.0 wt %, or from 30.0 wt % to 40.0 wt %. In some examples, $Nb_2O_5$ can be present in an amount of greater than 10.2 wt % up to and including 20.0 wt %. In some examples, $Nb_2O_5$ can be present in an amount of greater than 10.2 wt % up to and including 50.0 wt %

In some embodiments, the glasses of the present disclosure can include $Nb_2O_5$ and/or $TiO_2$ in an amount such that a sum of $(Nb_2O_5+TiO_2)$ is from 8.0 wt % to 50.0 wt %. For example, $Nb_2O_5$ and/or $TiO_2$ can be present in the glass such that a sum of $(Nb_2O_5+TiO_2)$ is from 8.0 wt % to 50.0 wt %, from 10.0 wt % to 50.0 wt %, 15.0 wt % to 50.0 wt %, 18.0 wt % to 50.0 wt %, 22.0 wt % to 50.0 wt %, 30.0 wt % to 50.0 wt %, 40.0 wt % to 50.0 wt %, 8.0 wt % to 40.0 wt %, from 10.0 wt % to 40.0 wt %, 15.0 wt % to 40.0 wt %, 18.0 wt % to 40.0 wt %, 22.0 wt % to 40.0 wt %, 30.0 wt % to 40.0 wt %, 8.0 wt % to 30.0 wt %, from 10.0 wt % to 30.0 wt %, 15.0 wt % to 30.0 wt %, 18.0 wt % to 30.0 wt %, 22.0 wt % to 30.0 wt %, 8.0 wt % to 22.0 wt %, from 10.0 wt % to 22.0 wt %, or 15.0 wt % to 22.0 wt %. In some examples, a sum of $(Nb_2O_5+TiO_2)$ is greater than 22.0 wt %, up to and including 50.0 wt %. In some examples, $Nb_2O_5$ and $TiO_2$ can be present in the glass such that a ratio of $Nb_2O_5$ to $TiO_2$ $(Nb_2O_5/TiO_2)$, in wt %, is greater than or equal to 1.9.

Zirconia ($ZrO_2$) is another example of an oxide that can increase the refractive index of glasses of the present disclosure while maintaining an acceptably low density. In some examples, $ZrO_2$ may provide the glass with a higher density compared to that of $TiO_2$ and $Nb_2O_5$ at similar refractive index values. $ZrO_2$ can also increase the viscosity of the melt, which may help to protect the melt from crystallization. In contrast to other index raisers that can provide the glass with a low density, such as $TiO_2$ and $Nb_2O_5$, $ZrO_2$ does not introduce coloring in the glass in the visible and near-UV ranges, which may help to maintain a high transmittance of the glass. However, high concentrations of zirconia may cause crystallization of refractory minerals, such as zirconia ($ZrO_2$), zircon (ZrSiO4), calcium zirconate ($CaZrO_3$) and others, which can increase the liquidus temperature. As a result, crystallization may happen at a lower viscosity, which may decrease the glass forming ability of the melt (i.e., may increase the critical cooling rate). To address these challenges, according to one aspect of the present disclosure, the content of zirconia in the glasses is less than or equal to 30 mol % and in some examples the glasses are free or substantially free of zirconia. In some cases, such as when the requirements for glass forming ability are low, the glasses may include higher amounts of zirconia. For example, $ZrO_2$ can be present in the glass from 0.0 mol % to 30.0 mol %, 0.0 mol % to 25.0 mol %, 0.0 mol % to 20.0 mol %, 0.0 mol % to 15.0 mol %, 0.0 mol % to 10.0 mol %, 0.0 mol % to 5.0 mol %, 0.0 mol % to 1.0 mol %, 1.0 mol % to 30.0 mol %, 1.0 mol % to 25.0 mol %, 1.0 mol % to 20.0 mol %, 1.0 mol % to 15.0 mol %, 1.0 mol % to 10.0 mol %, 1.0 mol % to 5.0 mol %, 5.0 mol % to 30.0 mol %, 5.0 mol % to 25.0 mol %, 5.0 mol % to 20.0 mol %, 5.0 mol % to 15.0 mol %, 5.0 mol % to 10.0 mol %, 10.0 mol % to 30.0 mol %, 10.0 mol % to 25.0 mol %, 10.0 mol % to 20.0 mol %, 10.0 mol % to 15.0 mol %, 15.0 mol % to 30.0 mol %, 15.0 mol % to 25.0 mol %, or 15.0 mol % to 20.0 mol %. In some examples, $ZrO_2$ is present in the glass in an amount of from 0.0 wt % to 15.0 wt %. For example, $ZrO_2$ can be present in an amount of from 0.0 wt % to 15.0 wt %, 2.0 wt % to 15.0 wt %, 2.5 wt % to 15.0 wt %, 5.0 wt % to 15.0 wt %, 8.0 wt % to 15.0 wt %, 10.0 wt % to 15.0 wt %, 0.0 wt % to 10.0 wt %, 2.0 wt % to 10.0 wt %, 2.5 wt % to 10.0 wt %, 5.0 wt % to 10.0 wt %, 8.0 wt % to 10.0 wt %, 0.0 wt % to 8.0 wt %, 2.0 wt % to 8.0 wt %, 2.5 wt % to 8.0 wt %, or 5.0 wt % to 8.0 wt %.

In some embodiments, rare earth metal oxides may be added to the glass composition to increase the refractive index of the glasses of the present disclosure. Examples of rare earth metal oxides that can be added to glasses of the present disclosure include $La_2O_3$, $Gd_2O_3$, $Yb_2O_3$, $Y_2O_3$, and $Sc_2O_3$. The oxides of the two last elements, $Y_2O_3$ and $Sc_2O_3$, can also provide the glass with a comparably low density, less than that for titania and niobia at similar refractive indices. However, scandium oxide ($Sc_2O_3$) can be expensive and thus may not be desirable in mass-production. In some cases, $Sc_2O_3$ may be acceptable where the cost of the glass batch is of lower priority. Yttrium oxide ($Y_2O_3$) is of lower cost than scandium oxide. However, in some cases, $Y_2O_3$ may decrease the glass forming ability of the glass (i.e., increase the critical cooling rate), even at lower concentrations. Thus, according to some embodiments of the present disclosure, the glass may be free or substantially free of $Y_2O_3$. In some embodiments, the glass may include a small amount of $Y_2O_3$, such as 0.0 to 1.5 mol %. For example, the glass may include $Y_2O_3$ in an amount of from 0.0 mol % to 1.5 mol %, 0.0 mol % to 1.25 mol %, 0.0 mol % to 1.0 mol %, 0.0 mol % to 0.75 mol %, 0.0 mol % to 0.5 mol %, 0.0 mol % to 0.25 mol %, 0.25 mol % to 1.5 mol %, 0.25 mol % to 1.25 mol %, 0.25 mol % to 1.0 mol %, 0.25 mol % to 0.75 mol %, 0.25 mol % to 0.5 mol %, 0.5 mol % to 1.5 mol %, 0.5 mol % to 1.25 mol %, 0.5 mol % to 1.0 mol %, 0.5 mol % to 0.75 mol %, 0.75 mol % to 1.5 mol %, 0.75 mol % to 1.25 mol %, 0.75 mol % to 1.0 mol %, or 1.0 mol % to 1.5 mol %. In some embodiments, it was found that while $Y_2O_3$ may facilitate forming a glass having a high ratio of refractive index to density, higher amounts of $Y_2O_3$ may result in crystallization of the glass melt during cooling. In some embodiments, however, acceptable glass forming ability is achieved with a $Y_2O_3$ concentration above 1.5 mol %. Thus, according to other embodiments of the present disclosure, the glass may include $Y_2O_3$ in an amount greater than 1.5 mol %, such as in an amount up to 3.0 mol %, or up to 4.0 mol %, or up to 5.0 mol %, or in an amount from 1.5 mol % to 5.0 mol %, 1.5 mol % to 4.0 mol %, 1.5 mol % to 3.0 mol %, 2.0 mol % to 5.0 mol %, 2.0 mol % to 4.0 mol %, or 3.0 mol % to 5.0 mol %. In some embodiments, the glass may include $Y_2O_3$ in an amount of from 0.0 wt % to 10.0 wt %. For example, the glass may include $Y_2O_3$ in an amount of from 0.0 wt % to 10.0 wt %, 2.0 wt % to 10.0 wt %, or 5.0 wt % to 10.0 wt %.

Among the rare earth metal oxides, with the exception of $Y_2O_3$ and $Sc_2O_3$, in some aspects, lanthanum oxide ($La_2O_3$) may be a preferred index raiser. $La_2O_3$ can provide the glasses of the present disclosure with a lower density at similar refractive indices compared to several other rare earth metal oxides. $La_2O_3$ can also provide the glass composition with acceptably good glass formation and is among the most cost efficient of rare earth metal oxides. Thus, in some aspects of the present disclosure, the glass composition can comprise at least some amount of $La_2O_3$. However, in some cases, when the concentration of $La_2O_3$ becomes too high, lanthanum oxide can cause precipitation of refractory species, such as lanthanum silicates ($La_4Si_3O_{12}$, $La_2SiO_5$, $La_2Si_2O_7$), lanthanum borates ($LaBO_3$, $LaB_3O_6$), lanthanum niobate ($LaNbO_4$), lanthanum zirconates ($La_2ZrO_5$, $La_2Zr_2O_7$), lanthanum titanates ($La_2TiO_5$, $La_2Ti_2O_7$) and others, which can increase the liquidus temperature of the glass and may reduce the glass forming ability of the composition. In addition, high concentrations of $La_2O_3$ may stimulate phase separation in the melt that results in a loss of transmittance of the resulting glass. Similar adverse effects can also occur upon the addition of other rare earth metal oxides in high concentrations. Optionally, other rare earth metal oxides such as $Gd_2O_3$ and $Yb_2O_3$ can be added to the glass composition. Rare earth metal oxides, such as $Gd_2O_3$ and $Yb_2O_3$, can facilitate maintaining a high refractive index and good transmittance of the glass, but may undesirably increase a density of the glass. To address these challenges, some embodiments of the present disclosure include limiting the content of $RE_mO_n$ in the glass composition. According to an embodiment of the present disclosure, when added to the present glass compositions, a total content of rare earth metal oxides $RE_mO_n$ may be present in an amount of less than or equal to 45 mol %. In some embodiments, the glass compositions may be free or substantially free of rare earth metal oxides. For example, a total content of rare earth metal oxides $RE_mO_n$ can be present in an amount of from 0.0 mol % to 45.0 mol %, 0.0 mol % to 40.0 mol %, 0.0 mol % to 30.0 mol %, 0.0 mol % to 23.0 mol %, 0.0 mol % to 20.0 mol %, 0.0 mol % to 15.0 mol %, 0.0 mol % to 10.0 mol %, 0.0 mol % to 5.0 mol %, 0.0 mol % to 1.0 mol %, 1.0 mol % to 45.0 mol %, 1.0 mol % to 40.0 mol %, 1.0 mol % to 30.0 mol %, 1.0 mol % to 23.0 mol %, 1.0 mol % to 20.0 mol %, 1.0 mol % to 15.0 mol %, 1.0 mol % to 10.0 mol %, 1.0 mol % to 5.0 mol %, 5.0 mol % to 45.0 mol %, 5.0 mol % to 40.0 mol %, 5.0 mol % to 30.0 mol %, 5.0 mol % to 23.0 mol %, 5.0 mol % to 20.0 mol %, 5.0 mol % to 15.0 mol %, 5.0 mol % to 10.0 mol %, 10.0 mol % to 45.0 mol %, 10.0 mol % to 40.0 mol %, 10.0 mol % to 30.0 mol %, 10.0 mol % to 23.0 mol %, 10.0 mol % to 20.0 mol %, 10.0 mol % to 15.0 mol %, 15.0 mol % to 45.0 mol %, 15.0 mol % to 40.0 mol %, 15.0 mol % to 30.0 mol %, 15.0 mol % to 23.0 mol %, 15.0 mol % to 20.0 mol %, or 20.0 mol % to 45.0 mol %. In some embodiments, it was found that a total content of $RE_mO_n$ higher than 23.0 mol % may result in a glass melt that tends to crystallize during cooling and/or may increase the density of the glass above a desired level.

In some embodiments, the glasses of the present disclosure may optionally include additional and/or alternative index raisers, such as tungsten oxide ($WO_3$), tantalum oxide ($Ta_2O_5$), thorium oxide ($ThO_2$), bismuth oxide ($Bi_2O_3$), which may be used in small amounts, if present. In some embodiments, the glasses of the present disclosure are free or substantially free of tungsten oxide ($WO_3$), tantalum oxide ($Ta_2O_5$), thorium oxide ($ThO_2$), bismuth oxide ($Bi_2O_3$). In some embodiments, the glasses may optionally include additional and/or alternative index raisers selected from vanadia ($V_2O_5$), molybdenum oxide ($MoO_3$), germania ($GeO_2$), tellurium oxide ($TeO_2$), fluorides (e.g. $ZrF_4$, $LaF_3$, etc.), and thallium oxide ($Tl_2O$). Index raisers such as $V_2O_5$, $MoO_3$, $GeO_2$, $TeO_2$, fluorides, and $Tl_2O$ may be generally less preferred in some cases due to low transmittance, cost, and/or environmental concerns, however, these index raisers may be used in some cases.

$Ta_2O_5$ may increase the density of the glass and in some examples may cause crystallization of the glass melt when cooling. In addition, $Ta_2O_5$ can be cost prohibitive in some cases. Therefore, in some embodiments it may be preferable to limit an amount of $Ta_2O_5$ in the glass to an amount of from 0.0 mol % to 1.5 mol %. For example, $Ta_2O_5$ may be present in an amount of from 0.0 mol % to 1.5 mol %, 0.0 mol % to 1.0 mol %, 0.0 mol % to 0.5 mol %, 0.0 mol % to 0.25 mol %, or 0.0 mol % to 0.1 mol %. In some examples, the glass is free or substantially free of $Ta_2O_5$. In some embodiments, the glass may include 0.0 wt % to 1.0 wt % $Ta_2O_5$.

In some embodiments, $Bi_2O_3$ may be present in the glass in an amount of from 0.0 mol % to 20.0 mol %. For example, $Bi_2O_3$ may be present in the glass from 0.0 mol % to 20.0 mol %, 0.0 mol % to 15.0 mol %, 0.0 mol % to 10.0 mol %, 0.0 mol % to 5.0 mol %, 0.0 mol % to 1.0 mol %, 1.0 mol % to 20.0 mol %, 1.0 mol % to 15.0 mol %, 1.0 mol % to 10.0 mol %, 1.0 mol % to 5.0 mol %, 5.0 mol % to 20.0 mol %, 5.0 mol % to 15.0 mol %, 5.0 mol % to 10.0 mol %, or 10.0 mol % to 20.0 mol %. In some embodiments, the glass is free or substantially free of $Bi_2O_3$. Higher amounts of $Bi_2O_3$ may increase the density of the glass above 4.5 g/cm$^3$ and/or may become cost prohibitive and thus preferably the amount of $Bi_2O_3$ in the glass is less than or equal to 20.0 mol %.

In some embodiments, $HfO_2$ may be present in the glass in an amount of from 0.0 mol % to 5.0 mol %. For example, $HfO_2$ may be present in an amount of from 0.0 mol % to 5.0 mol %, 0.0 mol % to 4.0 mol %, 0.0 mol % to 3.0 mol %, 0.0 mol % to 2.0 mol %, 0.0 mol % to 1.0 mol %, 1.0 mol % to 5.0 mol %, 1.0 mol % to 4.0 mol %, 1.0 mol % to 3.0 mol %, or 1.0 mol % to 2.0 mol %. $HfO_2$ can be cost prohibitive and may cause the crystallization of the glass melt at high temperatures. Therefore, the glasses preferably have less than 5.0 mol % and in some examples less than 1.0 mol % of $HfO_2$. In some embodiments, the glasses may be free of substantially free of $HfO_2$.

In some embodiments, $TeO_2$ may be present in the glass in an amount of from 0.0 mol % to 5.0 mol %. For example, $TeO_2$ may be present in an amount of from 0.0 mol % to 5.0 mol %, 0.0 mol % to 4.0 mol %, 0.0 mol % to 3.0 mol %, 0.0 mol % to 2.0 mol %, 0.0 mol % to 1.0 mol %, 1.0 mol % to 5.0 mol %, 1.0 mol % to 4.0 mol %, 1.0 mol % to 3.0 mol %, or 1.0 mol % to 2.0 mol %. $TeO_2$ can be cost prohibitive and may cause an undesirable increase in the density of the glass. Therefore, the glasses preferably have less than 5.0 mol % and in some examples less than 1.0 mol % of $TeO_2$. In some embodiments, the glasses may be free of substantially free of $TeO_2$.

In some embodiments, $GeO_2$ may be present in the glass in an amount of from 0.0 wt % to 2.0 wt %. For example, $GeO_2$ may be present in an amount of from 0.0 wt % to 2.0 wt %, 0.1 wt % to 2.0 wt %, 0.1 wt % to 1.5 wt %, 0.5 wt % to 2.0 wt %, 0.5 wt % to 1.5 wt %, or 1.0 wt % to 2.0 wt %.

According to an embodiment of the present disclosure, the glasses can include one or more modifiers. As described above, the term "modifier" refers to the oxides of monovalent or divalent metals, i.e., $M_2O$ or MO, where "M" stands for a metal. Modifiers can be added to the glass compositions of the present disclosure to facilitate improving the glassforming ability of the melt, i.e. to decrease the critical cooling rate. Examples of modifiers that can be used in the glasses of the present disclosure include alkali and alkaline earth modifiers, such as CaO, MgO, BaO, $Li_2O$, $Na_2O$, and $K_2O$, as well as other modifiers, such as ZnO and $Ag_2O$. According to one embodiment, the glass composition can include CaO and/or $Li_2O$, which were found to provide a ratio between the desired refractive index and density of the glass. In some embodiments, other alkali and alkaline earth metal oxides (such as $Na_2O$, $K_2O$, MgO, SrO, BaO, etc.), as well as other modifiers that do not provide any coloring (e.g., ZnO, $Ag_2O$, etc.), may be included in the glass composition. While these other modifiers may not facilitate providing the desired refractive index and/or density as CaO and $Li_2O$, these modifiers may be added to the glass composition to provide other characteristics. For example, barium oxide (BaO), potassium oxide ($K_2O$), sodium oxide ($Na_2O$) etc., may be added to increase the solubility of index raisers (such as $TiO_2$, $Nb_2O_5$, $ZrO_2$, etc.) in the glass melts, which could result in an overall increase in the refractive index of the glass and/or an increase in the ratio of refractive index to density. According to one embodiment of the present disclosure, the glasses may include at least CaO as a modifier, as CaO was found to provide a good balance in the desired attributes of density, refractive index, and glass forming ability. Thus, in many examples of the present disclosure, all or at least a part of the modifier(s) present in the glass composition are in the form of CaO.

According to an embodiment of the present disclosure, one or more modifiers can be individually present in the glass composition in an amount of from 0.0 mol % to 32.0 mol %. For example, one or more modifiers can be individually present in the glass composition in an amount of from 0.0 mol % to 32.0 mol %, 0.0 mol % to 31.0 mol %, 0.0 mol % to 30.0 mol %, 0.0 mol % to 25.0 mol %, 0.0 mol % to 20.0 mol %, 0.0 mol % to 15.0 mol %, 0.0 mol % to 10.0 mol %, 0.0 mol % to 8.0 mol %, 0.0 mol % to 7.0 mol %, 0.0 mol % to 5.0 mol %, 0.0 mol % to 2.0 mol %, 2.0 mol % to 32.0 mol %, 2.0 mol % to 31.0 mol %, 2.0 mol % to 30.0 mol %, 2.0 mol % to 25.0 mol %, 2.0 mol % to 20.0 mol %, 2.0 mol % to 15.0 mol %, 2.0 mol % to 10.0 mol %, 2.0 mol % to 8.0 mol %, 2.0 mol % to 7.0 mol %, 2.0 mol % to 5.0 mol %, 5.0 mol % to 32.0 mol %, 5.0 mol % to 31.0 mol %, 5.0 mol % to 30.0 mol %, 5.0 mol % to 25.0 mol %, 5.0 mol % to 20.0 mol %, 5.0 mol % to 15.0 mol %, 5.0 mol % to 10.0 mol %, 5.0 mol % to 8.0 mol %, 5.0 mol % to 7.0 mol %, 7.0 mol % to 32.0 mol %, 7.0 mol % to 31.0 mol %, 7.0 mol % to 30.0 mol %, 7.0 mol % to 25.0 mol %, 7.0 mol % to 20.0 mol %, 7.0 mol % to 15.0 mol %, 7.0 mol % to 10.0 mol %, 8.0 mol % to 32.0 mol %, 8.0 mol % to 31.0 mol %, 8.0 mol % to 30.0 mol %, 8.0 mol % to 25.0 mol %, 8.0 mol % to 20.0 mol %, 8.0 mol % to 15.0 mol %, 8.0 mol % to 10.0 mol %, 10.0 mol % to 32.0 mol %, 10.0 mol % to 31.0 mol %, 10.0 mol % to 30.0 mol %, 10.0 mol % to 25.0 mol %, 10.0 mol % to 20.0 mol %, or 10.0 mol % to 15.0 mol %. In some embodiments, the glass may be free or substantially free of modifiers.

In some embodiments, CaO may be present in an amount of from 0.0 mol % to 32.0 mol %. For example, CaO can be present in the glass composition in an amount of from 0.0 mol % to 32.0 mol %, 0.0 mol % to 31.0 mol %, 0.0 mol % to 30.0 mol %, 0.0 mol % to 25.0 mol %, 0.0 mol % to 20.0 mol %, 0.0 mol % to 15.0 mol %, 0.0 mol % to 10.0 mol %, 0.0 mol % to 8.0 mol %, 0.0 mol % to 7.0 mol %, 0.0 mol % to 5.0 mol %, 0.0 mol % to 2.0 mol %, 2.0 mol % to 32.0 mol %, 2.0 mol % to 31.0 mol %, 2.0 mol % to 30.0 mol %, 2.0 mol % to 25.0 mol %, 2.0 mol % to 20.0 mol %, 2.0 mol % to 15.0 mol %, 2.0 mol % to 10.0 mol %, 2.0 mol % to 8.0 mol %, 2.0 mol % to 7.0 mol %, 2.0 mol % to 5.0 mol %, 5.0 mol % to 32.0 mol %, 5.0 mol % to 31.0 mol %, 5.0 mol % to 30.0 mol %, 5.0 mol % to 25.0 mol %, 5.0 mol % to 20.0 mol %, 5.0 mol % to 15.0 mol %, 5.0 mol % to 10.0 mol %, 5.0 mol % to 8.0 mol %, 5.0 mol % to 7.0 mol %, 7.0 mol % to 32.0 mol %, 7.0 mol % to 31.0 mol %, 7.0 mol % to 30.0 mol %, 7.0 mol % to 25.0 mol %, 7.0 mol % to 20.0 mol %, 7.0 mol % to 15.0 mol %, 7.0 mol % to 10.0 mol %, 8.0 mol % to 32.0 mol %, 8.0 mol % to 31.0 mol %, 8.0 mol % to 30.0 mol %, 8.0 mol % to 25.0 mol %, 8.0 mol % to 20.0 mol %, 8.0 mol % to 15.0 mol %, 8.0 mol % to 10.0 mol %, 10.0 mol % to 32.0 mol %, 10.0 mol % to 31.0 mol %, 10.0 mol % to 30.0 mol %, 10.0 mol % to 25.0 mol %, 10.0 mol % to 20.0 mol %, or 10.0 mol % to 15.0 mol %. In some examples, CaO may be present in the glass in an amount of from 0.5 wt % to 25.0 wt %, 1.0 wt % to 25.0 wt %, 5.0 wt % to 25.0 wt %, 8.0 wt % to 25.0 wt %, 10.0 wt % to 25.0 wt %, 0.5 wt % to 20.0 wt %, 1.0 wt % to 20.0 wt %, 5.0 wt % to 20.0 wt %, 8.0 wt % to 20.0 wt %, 10.0 wt % to 20.0 wt %, 0.5 wt % to 15.0 wt %, 1.0 wt % to 15.0 wt %, 5.0 wt % to 15.0 wt %, 8.0 wt % to 15.0 wt %, 10.0 wt % to 15.0 wt %, 0.5 wt % to 10.0 wt %, 1.0 wt % to 10.0 wt %, 5.0 wt % to 10.0 wt %, or 8.0 wt % to 10.0 wt %. In some examples, CaO may be present in an amount of greater than 8.0 wt % up to and including 25.0 wt %. In some embodiments, it was found that a concentration of CaO greater than 32.0 mol % may increase the difficulty of producing a glass having a higher refractive index and/or may result in a glass melt that tends to crystallize.

In some embodiments, ZnO may be present in the glass in an amount of from 0.0 mol % to 10.0 mol %. For example, ZnO may be present in an amount of from 0.0 mol % to 10.0 mol %, 0.0 mol % to 8.0 mol %, 0.0 mol % to 6.0 mol %, 0.0 mol % to 4.0 mol %, 0.0 mol % to 2.0 mol %, 0.0 mol % to 1.0 mol %, 1.0 mol % to 10.0 mol %, 1.0 mol % to 8.0 mol %, 1.0 mol % to 6.0 mol %, 1.0 mol % to 4.0 mol %, 1.0 mol % to 2.0 mol %, 2.0 mol % to 10.0 mol %, 2.0 mol % to 8.0 mol %, 2.0 mol % to 6.0 mol %, 2.0 mol % to 4.0 mol %, 4.0 mol % to 10.0 mol %, 4.0 mol % to 8.0 mol %, or 4.0 mol % to 6.0 mol %. In some examples, ZnO is present in an amount of less than or equal to 2.0 mol %, including 0.0 mol %. It was found that in some embodiments, at higher concentrations of ZnO, the glass forming ability of the melt decreases and the melt may tend to crystallize during cooling. Thus, in some examples the concentration of ZnO is less than or equal to 10.0 mol %, less than or equal to 8.0 mol %, less than or equal to 6.0 mol %, less than or equal to 4.0 mol %, and in some cases less than or equal to 2.0 mol %. In some embodiments of the present disclosure, it was found that the addition of ZnO in amounts greater than 2.0 mol % results in crystallization of the glass melt during cooling, and thus in some embodiments, preferably ZnO is present in amounts of less than or equal to 2.0 mol %. In some examples, ZnO is present in an amount of from 0.0 wt % to 2.0 wt %.

In some embodiments, $Li_2O$ may be present in the glass in an amount of from 0.0 mol % to 7.0 mol %. For example, $Li_2O$ may be present in an amount of from 0.0 mol % to 7.0 mol %, 0.0 mol % to 5.0 mol %, 0.0 mol % to 3.0 mol %, 0.0 mol % to 1.0 mol %, 1.0 mol % to 7.0 mol %, 1.0 mol % to 5.0 mol %, 1.0 mol % to 3.0 mol %, 3.0 mol % to 7.0 mol %, 3.0 mol % to 5.0 mol %, or 5.0 mol % to 7.0 mol %. In some examples, $Li_2O$ is present in an amount of from 0.0 wt % to 2.0 wt %. In some glasses, $Li_2O$ may negatively affect the glass forming ability of the glass composition and thus, in some embodiments, the glass may be free or substantially free of $Li_2O$.

In some embodiments, BaO may be present in the glass in an amount of from 0.0 mol % to 15.0 mol %. For example, BaO may be present in an amount of from 0.0 mol % to 15.0 mol %, 0.0 mol % to 12.0 mol %, 0.0 mol % to 10.0 mol %, 0.0 mol % to 5.0 mol %, 0.0 mol % to 3.0 mol %, 0.0 mol % to 1.0 mol %, 1.0 mol % to 15.0 mol %, 1.0 mol % to 12.0 mol %, 1.0 mol % to 10.0 mol %, 1.0 mol % to 5.0 mol %, 3.0 mol % to 15.0 mol %, 3.0 mol % to 12.0 mol %, 3.0 mol % to 10.0 mol %, 3.0 mol % to 5.0 mol %, 5.0 mol % to 15.0 mol %, or 5.0 mol % to 12.0 mol %. In some examples, BaO is present in an amount of from 0.0 wt % to 10.0 wt %, 0.0 wt % to 8.0 wt %, 0.0 wt % to 5.0 wt %, 0.0 wt % to 1.0 wt %, 1.0 wt % to 10.0 wt %, 1.0 wt % to 8.0 wt %, or 1.0 wt % to 5.0 wt %. In some embodiments, it was found that an amount of BaO greater than 15.0 mol % may increase the density of the glass above a desired limit.

In some embodiments, MgO may be present in the glass in an amount of from 0.0 mol % to 5.0 mol %. For example, MgO may be present in an amount of from 0.0 mol % to 5.0 mol %, 0.0 mol % to 3.0 mol %, 0.0 mol % to 1.0 mol %, 1.0 mol % to 5.0 mol %, 1.0 mol % to 3.0 mol %, or 3.0 mol % to 5.0 mol %. In some glasses, MgO may negatively affect the glass forming ability of the glass composition and thus, in some embodiments, the glass may be free or substantially free of MgO.

According to one embodiment of the present disclosures, the one or more modifiers may be present in the glasses in an amount such that a ratio of CaO to a sum of ($Li_2O$+$Na_2O$+$K_2O$+MgO+CaO+SrO+BaO+ZnO), in wt %, represented as CaO/($Li_2O$+$Na_2O$+$K_2O$+MgO+CaO+SrO+BaO+ZnO), is greater than or equal to 0.50.

In some embodiments, the one or more modifiers may be present in an amount such that a sum of a total content of divalent metal oxides (RO) plus a total content of alkali metal oxides ($Alk_2O$), represented as (RO+$Alk_2O$), is from 0.0 mol % to 40.0 mol %. For example, the one or more modifiers may be present in an amount such that (RO+$Alk_2O$) is from 0.0 mol % to 40.0 mol %, 0.0 mol % to 36.0 mol %, 0.0 mol % to 30.0 mol %, 0.0 mol % to 22.0 mol %, 0.0 mol % to 20.0 mol %, 0.0 mol % to 15.0 mol %, 0.0 mol % to 10.0 mol %, 0.0 mol % to 5.0 mol %, 0.0 mol % to 1.0 mol %, 1.0 mol % to 40.0 mol %, 1.0 mol % to 36.0 mol %, 1.0 mol % to 30.0 mol %, 1.0 mol % to 22.0 mol %, 1.0 mol % to 20.0 mol %, 1.0 mol % to 15.0 mol %, 1.0 mol % to 10.0 mol %, 1.0 mol % to 5.0 mol %, 5.0 mol % to 40.0 mol %, 5.0 mol % to 36.0 mol %, 5.0 mol % to 30.0 mol %, 5.0 mol % to 22.0 mol %, 5.0 mol % to 20.0 mol %, 5.0 mol % to 15.0 mol %, 5.0 mol % to 10.0 mol %, 10.0 mol % to 40.0 mol %, 10.0 mol % to 36.0 mol %, 10.0 mol % to 30.0 mol %, 10.0 mol % to 22.0 mol %, 10.0 mol % to 20.0 mol %, 20.0 mol % to 40.0 mol %, 20.0 mol % to 36.0 mol %, 20.0 mol % to 30.0 mol %, 20.0 mol % to 22.0 mol %, 22.0 mol % to 40.0 mol %, 22.0 mol % to 36.0 mol %, 22.0 mol % to 30.0 mol %, or 30.0 mol % to 40.0 mol %.

In some embodiments, the one or more modifiers may be present in an amount such that a sum of a total content of divalent metal oxides (RO) plus a total content of monovalent metal oxides ($R_2O$), represented as (RO+$R_2O$), is from 0.0 mol % to 40.0 mol %. At higher amounts of RO and/or $R_2O$ modifiers, the glass melts may tend to crystallize and it may be challenging to reach the desired high refractive index. In addition, higher amounts of RO and $R_2O$ may decrease the chemical durability of the glass. Examples of monovalent metal oxides $R_2O$ include alkali metal oxides. Examples of divalent metal oxides include alkaline earth metal oxides, ZnO, and PbO. For example, the one or more modifiers may be present in an amount such that (RO+$R_2O$) is from 0.0 mol % to 40.0 mol %, 0.0 mol % to 36.0 mol %, 0.0 mol % to 30.0 mol %, 0.0 mol % to 22.0 mol %, 0.0 mol % to 20.0 mol %, 0.0 mol % to 15.0 mol %, 0.0 mol % to 10.0 mol %, 0.0 mol % to 5.0 mol %, 0.0 mol % to 1.0 mol %, 1.0 mol % to 40.0 mol %, 1.0 mol % to 36.0 mol %, 1.0 mol % to 30.0 mol %, 1.0 mol % to 22.0 mol %, 1.0 mol % to 20.0 mol %, 1.0 mol % to 15.0 mol %, 1.0 mol % to 10.0 mol %, 1.0 mol % to 5.0 mol %, 5.0 mol % to 40.0 mol %, 5.0 mol % to 36.0 mol %, 5.0 mol % to 30.0 mol %, 5.0 mol % to 22.0 mol %, 5.0 mol % to 20.0 mol %, 5.0 mol % to 15.0 mol %, 5.0 mol % to 10.0 mol %, 10.0 mol % to 40.0 mol %, 10.0 mol % to 36.0 mol %, 10.0 mol % to 30.0 mol %, 10.0 mol % to 22.0 mol %, 10.0 mol % to 20.0 mol %, 20.0 mol % to 40.0 mol %, 20.0 mol % to 36.0 mol %, 20.0 mol % to 30.0 mol %, 20.0 mol % to 22.0 mol %, 22.0 mol % to 40.0 mol %, 22.0 mol % to 36.0 mol %, 22.0 mol % to 30.0 mol %, or 30.0 mol % to 40.0 mol %.

In some embodiments, the glass may include a total amount of divalent metal oxides (RO) present in an amount of greater than or equal to 3.0 mol %. For example, the glass may include a total amount of RO, where RO includes alkaline earth metal oxides, ZnO, PbO, etc., in an amount of greater than or equal to 3.0 mol %, greater than or equal to 5.0 mol %, greater than or equal to 10.0 mol %, greater than or equal to 15.0 mol %, greater than or equal to 20.0 mol %, greater than or equal to 25.0 mol %, or greater than or equal to 30.0 mol %. In some embodiments, it was found that at lower amounts of RO, it may be difficult to accommodate the index raising species, examples of which include $TiO_2$, $Nb_2O_5$, $ZrO_2$ and others, in the glass composition, which result in the glass melt tending to crystallize during cooling.

In some embodiments, $TiO_2$, $Nb_2O_5$, $ZrO_2$, $Bi_2O_3$, and $WO_3$ may be absent or present in the glass in amounts such that a sum of ($RE_mO_n$+$TiO_2$+$Nb_2O_5$+$ZrO_2$+$Bi_2O_3$+$WO_3$) is greater than or equal to 25.0 mol %, where $RE_mO_n$ is a total amount of rare earth metal oxides in the glass composition. In some examples, when these species are present such that the sum of ($RE_mO_n$+$TiO_2$+$Nb_2O_5$+$ZrO_2$+$Bi_2O_3$+$WO_3$) is less than 25.0 mol %, it may be difficult to form a glass having the desired high refractive index.

In some embodiments, $SiO_2$, $B_2O_3$, $Alk_2O$, MgO, CaO, SrO, BaO, and ZnO may be absent or present in the glass in amounts such that a sum of ($SiO_2$+$B_2O_3$+$Alk_2O$+MgO+CaO+SrO+BaO+ZnO) is less than or equal to 69.0 mol %, where $Alk_2O$ is the total content of alkali metal oxides in the glass composition. In some examples, the sum of ($SiO_2$+$B_2O_3$+$Alk_2O$+MgO+CaO+SrO+BaO+ZnO) may be from 4.0 mol % to 69.0 mol %. In some examples, when these species are present in amounts such that a sum of ($SiO_2$+$B_2O_3$+$Alk_2O$+MgO+CaO+SrO+BaO+ZnO) is greater than 69.0 mol %, it may be difficult to form a glass having the desired high refractive index. In the case of BaO, for example, higher concentrations may make it difficult to form a glass having the desired high refractive index at low densities. In some embodiments, CaO, SrO, and/or BaO may be present or absent in the glass such that a sum (CaO+SrO+BaO), in wt %, is 0.2 wt % or greater.

In some embodiments, the glass may include CdO in an amount of from 0.0 mol % to 15.0 mol %. For example, CdO may be present in an amount of from 0.0 mol % to 15.0 mol %, 0.0 mol % to 10.0 mol %, 0.0 mol % to 5.0 mol %, 0.0 mol % to 1.0 mol %, 1.0 mol % to 15.0 mol %, 1.0 mol % to 10.0 mol %, 1.0 mol % to 5.0 mol %, 5.0 mol % to 15.0 mol %, or 5.0 mol % to 10.0 mol %. In some examples, the glass is free or substantially free of CdO.

In some embodiments, the glass may include PbO in an amount of from 0.0 mol % to 1.0 mol %. For example, PbO may be present in the glass in an amount of from 0.0 mol % to 1.0 mol %, 0.0 mol % to 0.75 mol %, 0.0 mol % to 0.5 mol %, or 0.0 mol % to 0.1 mol %. In some examples, the glass is free or substantially free of PbO. In other embodiments of the present disclosure, the glass may include PbO in an amount greater than 1.0 mol %, such as in an amount up to 2.0 mol %, or up to 3.0 mol %, or up to 4.0 mol %, or up to 5.0 mol %, or in an amount from 1.0 mol % to 5.0 mol %, 1.0 mol % to 4.0 mol %, 1.0 mol % to 3.0 mol %, 2.0 mol % to 5.0 mol %, 2.0 mol % to 4.0 mol %, or 3.0 mol % to 5.0 mol %.

In some embodiments of the present disclosure, the glass includes at least one of $La_2O_3$, $Yb_2O_3$, $Gd_2O_3$, $TiO_2$, and $Nb_2O_5$. For example, $SiO_2$, $B_2O_3$, $La_2O_3$, $Yb_2O_3$, $Gd_2O_3$, $TiO_2$, and/or $Nb_2O_5$ can be present in the glass such that a ratio of ($SiO_2$+$B_2O_3$)/($La_2O_3$+$Yb_2O_3$+$TiO_2$+$Nb_2O_5$), in terms of wt %, is 0.3 or greater. In another example, $SiO_2$, $B_2O_3$, $La_2O_3$, $Yb_2O_3$, $Gd_2O_3$, $TiO_2$, and/or $Nb_2O_5$ can be present in the glass such that a ratio of ($TiO_2$+$Nb_2O_5$)/($La_2O_3$+$Gd_2O_3$+$Yb_2O_3$), in terms of wt %, is less than 1.35.

In some embodiments, the glass may include $Gd_2O_3$ in an amount of from 0.0 wt % to 20.0 wt %. For example, the glass may include $Gd_2O_3$ in an amount of from 0.0 wt % to 20.0 wt %, 0.0 wt % to 15.0 wt %, 0.0 wt % to 10.0 wt %, 0.0 wt % to 5.0 wt %, 2.0 wt % to 20.0 wt %, 2.0 wt % to 15.0 wt %, 2.0 wt % to 10.0 wt %, 2.0 wt % to 5.0 wt %, 5.0 wt % to 20.0 wt %, 5.0 wt % to 15.0 wt %, 5.0 wt % to 10.0 wt %, 10.0 wt % to 20.0 wt %, 10.0 wt % to 15.0 wt %, or 15.0 wt % to 20.0 wt %.

In some embodiments, the glass may include $La_2O_3$ and/or $Gd_2O_3$ in amounts such that a sum ($La_2O_3$+$Gd_2O_3$), in wt %, is from 0.0 wt % to 40.0 wt %. For example, a sum ($La_2O_3$+$Gd_2O_3$), in wt %, in the glass may be from 0.0 wt % to 40.0 wt %, 0.0 wt % to 35.0 wt %, 0.0 wt % to 30.0 wt %, 0.0 wt % to 25.0 wt %, 0.0 wt % to 20.0 wt %, 0.0 wt % to 15.0 wt %, 0.0 wt % to 10.0 wt %, 0.0 wt % to 5.0 wt %, 5.0 wt % to 40.0 wt %, 5.0 wt % to 35.0 wt %, 5.0 wt % to 30.0 wt %, 5.0 wt % to 25.0 wt %, 5.0 wt % to 20.0 wt %, 5.0 wt % to 15.0 wt %, 5.0 wt % to 10.0 wt %, 10.0 wt % to 40.0 wt %, 10.0 wt % to 35.0 wt %, 10.0 wt % to 30.0 wt %, 10.0 wt % to 25.0 wt %, 10.0 wt % to 20.0 wt %, 10.0 wt % to 15.0 wt %, 15.0 wt % to 40.0 wt %, 15.0 wt % to 35.0 wt %, 15.0 wt % to 30.0 wt %, 15.0 wt % to 25.0 wt %, 15.0 wt % to 20.0 wt %, 20.0 wt % to 40.0 wt %, 20.0 wt % to 35.0 wt %, 20.0 wt % to 30.0 wt %, 20.0 wt % to 25.0 wt %, 25.0 wt % to 40.0 wt %, 25.0 wt % to 35.0 wt %, 25.0 wt % to 30.0 wt %, or 30.0 wt % to 40.0 wt %.

According to some embodiments, the glasses of the present disclosure can include CaO, SrO, BaO, $Nb_2O_5$, and/or $TiO_2$ in amounts, in wt %, such that a ratio (CaO+SrO+BaO)/($Nb_2O_5$+$TiO_2$) is greater than or equal to 0.45. For example, the glasses of the present disclosure can include CaO, SrO, BaO, $Nb_2O_5$, and/or $TiO_2$ in amounts, in wt %, such that a ratio (CaO+SrO+BaO)/($Nb_2O_5$+$TiO_2$) is greater than or equal to 0.45, greater than or equal to 0.475, or greater than or equal to 0.50.

Some oxides, such as for example PbO, $MoO_3$, and $GeO_2$ may be undesirable for reasons such as environmental impact, coloring, and/or cost. Some oxides, such as for example $Al_2O_3$, $Y_2O_3$, and $Ta_2O_5$ may be undesirable in high amounts in the glass due to their ability to decrease the glass forming ability of the glass composition. In some embodiments, a sum of $Y_2O_3$, $GeO_2$, $Ta_2O_5$, $Al_2O_3$, $MoO_3$, PbO, $TeO_2$, FeO, and $Fe_2O_3$ ($Y_2O_3$+$GeO_2$+$Ta_2O_5$+$Al_2O_3$+$MoO_3$+PbO+$TeO_2$+FeO+$Fe_2O_3$) is from 0.0 mol % to 0.5 mol %. In some embodiments, the glass is free or substantially free of $Y_2O_3$, $GeO_2$, $Ta_2O_5$, $Al_2O_3$, $MoO_3$, PbO, $TeO_2$, FeO, and $Fe_2O_3$, such that the sum ($Y_2O_3$+$GeO_2$+$Ta_2O_5$+$Al_2O_3$+$MoO_3$+PbO+$TeO_2$+FeO+$Fe_2O_3$) is 0.0 mol %.

In some embodiments, the glasses of the present disclosure may be free or substantially free of fluorine. In some embodiments, the glasses may include fluorine from 0.0 atomic % to 1.0 atomic %. For example, the glasses may include fluorine from 0.0 atomic % to 1.0 atomic %, 0.0 atomic % to 0.5 atomic %, 0.0 atomic % to 0.25 atomic %, or 0.0 atomic % to 0.1 atomic %.

In some embodiments, the glasses of the present disclosure may be free or substantially free of at least one of PbO, $GeO_2$, $TeO_2$, $WO_3$, $Y_2O_3$, and $Li_2O$. In other embodiments the glasses may be free or substantially free of all of PbO, $GeO_2$, $TeO_2$, $WO_3$, $Y_2O_3$, and $Li_2O$.

In some embodiments, the glass is free or substantially free of at least one of antimony, arsenic, fluorine, $Bi_2O_3$, and PbO. For example, the glass may be free or substantially free of PbO and $Bi_2O_3$. In another example, the glasses of the present disclosure may be free or substantially free of arsenic and/or antimony. In yet another example, the glass is free or substantially free of antimony, arsenic, fluorine, $Bi_2O_3$, and PbO.

In some embodiments, $Bi_2O_3$ and/or PbO may be absent or present in amounts such that a sum of $Bi_2O_3$ plus PbO ($Bi_2O_3$+PbO) is from 0.0 mol % to 20.0 mol %. For example, $Bi_2O_3$ and/or PbO may be absent or present in amounts such that ($Bi_2O_3$+PbO) is from 0.0 mol % to 20.0 mol %, 0.0 mol % to 15.0 mol %, 0.0 mol % to 10.0 mol %, 0.0 mol % to 5.0 mol %, 0.0 mol % to 1.0 mol %, 1.0 mol % to 20.0 mol %, 1.0 mol % to 15.0 mol %, 1.0 mol % to 10.0 mol %, 1.0 mol % to 5.0 mol %, 5.0 mol % to 20.0 mol %, 5.0 mol % to 15.0 mol %, 5.0 mol % to 10.0 mol %, or 10.0 mol % to 20.0 mol %. At higher concentrations of $Bi_2O_3$ and PbO, the density of the formed glass may increase above 4.5 g/cm3. In addition, $Bi_2O_3$ and PbO may be undesirable due to cost and/or environmental concerns, and thus preferably the amounts of $Bi_2O_3$ and/or PbO combined are less than 20.0 mol %. In some embodiments, the glasses may be free or substantially free of one or both of $Bi_2O_3$ and PbO.

In some embodiments, $V_2O_5$ and/or PbO may be absent or present in amounts such that a sum, in wt %, of $V_2O_5$ plus PbO ($V_2O_5$+PbO) is from 0.0 wt % to 1.0 wt %. For example, a sum ($V_2O_5$+PbO), in wt %, can be from 0.0 wt % to 1.0 wt %, 0.1 wt % to 1.0 wt %, or 0.5 wt % to 1.0 wt %. In some embodiments, the glasses may be free or substantially free of one or both of $V_2O_5$ and PbO.

According to another embodiment of the present disclosure, the glasses are free or substantially free of Fe, Cu, Co, Ni, and Cr. These elements may contribute to the glass having an undesired color and thus, in some embodiments, the glasses are free or substantially free of colorants such as Fe, Cu, Co, Ni, and Cr.

According to an embodiment of the present disclosure, the glasses described herein have a refractive index $n_d$ of greater than or equal to 1.70, as measured at 587.56 nm. In some examples, the glasses have a refractive index $n_d$ of greater than or equal to 1.70, greater than or equal to 1.75, greater than or equal to 1.80, greater than or equal to 1.83, greater than or equal to 1.85, greater than or equal to 1.88, greater than or equal to 1.90, as measured at 587.56 nm. In some examples, the glasses have a refractive index $n_d$ of from 1.70 to 1.95, 1.70 to 1.90, 1.70 to 1.85, 1.70 to 1.83, 1.70 to 1.80, 1.70 to 1.75, 1.75 to 1.95, 1.75 to 1.90, 1.75 to 1.85, 1.75 to 1.83, 1.75 to 1.80, 1.80 to 1.95, 1.80 to 1.90, 1.80 to 1.85, 1.80 to 1.83, 1.85 to 1.95, or 1.85 to 1.90, as measured at 587.56 nm.

At a given refractive index, lower density corresponds to a lower weight of the optical element which the glass is utilized in. Size and weight can be important in many types of optical devices, particularly portable optical devices, such as augmented reality systems, for example. As described above, the glasses of the present disclosure have a high refractive index in combination with a low density. According to an embodiment of the present disclosure, the glasses described herein have a density of 4.5 g/cm$^3$ or less, as measured at 25° C. In some examples, the glasses of the present disclosure may have a density of 4.5 g/cm$^3$ or less, 4.4 g/cm$^3$ or less, 4.3 g/cm$^3$ or less, 4.2 g/cm$^3$ or less, 4.1 g/cm$^3$ or less, 4.0 g/cm$^3$ or less, as measured at 25° C.

In some embodiments, the glasses of the present disclosure can be characterized by a refractive index $n_d$ and a density $d_{RT}$ according to formula (III):

$$(n_d-1)/d_{RT} \geq 0.205 \qquad \text{(III)}$$

where the refractive index $n_d$ is measured at a wavelength of 587.56 nm and the density is measured at 25° C. (in g/cm$^3$). In some embodiments, the glasses of the present disclosure can be characterized by a refractive index $n_d$ and a density dRT according to formula (IV):

$$n_d-(1.11+0.18*d_{RT}) \geq 0 \qquad \text{(IV)}$$

where the refractive index $n_d$ has a value of from 1.7 to 1.95, as measured at a wavelength of 587.56 nm, and the density is measured at 25° C. (in g/cm$^3$). In some embodiments, the glasses of the present disclosure may satisfy formula (IV)(a) and/or (IV)(b):

$$n_d-(1.120+0.18*d_{RT}) > 0 \qquad \text{(IV)(a)}$$

$$n_d-(1.135+0.18*d_{RT}) > 0 \qquad \text{(IV)(b)}.$$

The desired optical dispersion for a glass may vary depending on the particular application. The lower the optical dispersion of a glass, the larger the Abbe number $v_d$, which corresponds to a lower degree of scattering of light by the glass. Lower optical dispersion is particularly desirable in applications which focus light at different wavelengths within the same lens. In other applications, such as splitting the light according to wavelength, a higher optical dispersion may be desired. According to an embodiment of the present disclosure, the glasses described herein are characterized by a low optical dispersion. As discussed above, optical dispersion can be numerically represented by the Abbe number $v_d$. According to an embodiment of the present disclosure, the glasses described herein have a low optical dispersion, as characterized by an Abbe number $v_d$ of 35 or less. For example, the glass can have an Abbe number $v_d$ of 35 or less or 33 or less. In some embodiments, for a glass having a refractive index higher than 1.8, optical dispersion can be considered acceptably low if the Abbe number $v_d$ is greater than or equal to about 25. For example, the glasses of the present disclosure may have an Abbe number $v_d$ of from 25 to 35, 25 to 33, 25 to 31, 25 to 30, 25 to 28, 25 to 27, 27 to 35, 27 to 33, 27 to 31, 27 to 30, 27 to 28, 28 to 35, 28 to 33, 28 to 31, 28 to 30, 30 to 35, 30 to 33, 30 to 31, 31 to 35, or 31 to 33.

FIG. 1 illustrates a plot of refractive index $n_d$ as a function of Abbe number $v_d$ ("Abbe diagram") for some comparative glasses from the catalogs of several optical companies (Schott AG, Hoya, Ohara, and Sumita) and an exemplary glass according to the present disclosure, Exemplary Glass 12 ("Ex. 12"), described in Table 6 below. The glasses shown in FIG. 1 illustrate the challenge in forming glasses having a high refractive index, a low density, and a low optical dispersion (i.e., high Abbe number). Generally speaking, as the refractive index of a glass increases, the density of the glass will also typically increase. At a given refractive index, conventional wisdom in the art suggests that glasses having a lower optical dispersion (i.e., a higher Abbe number) will have a higher density. In some embodiments, the glasses of the present disclosure can provide a compromise between high refractive index, low density, and low optical dispersion that may be useful in some optical applications.

Figure 2:
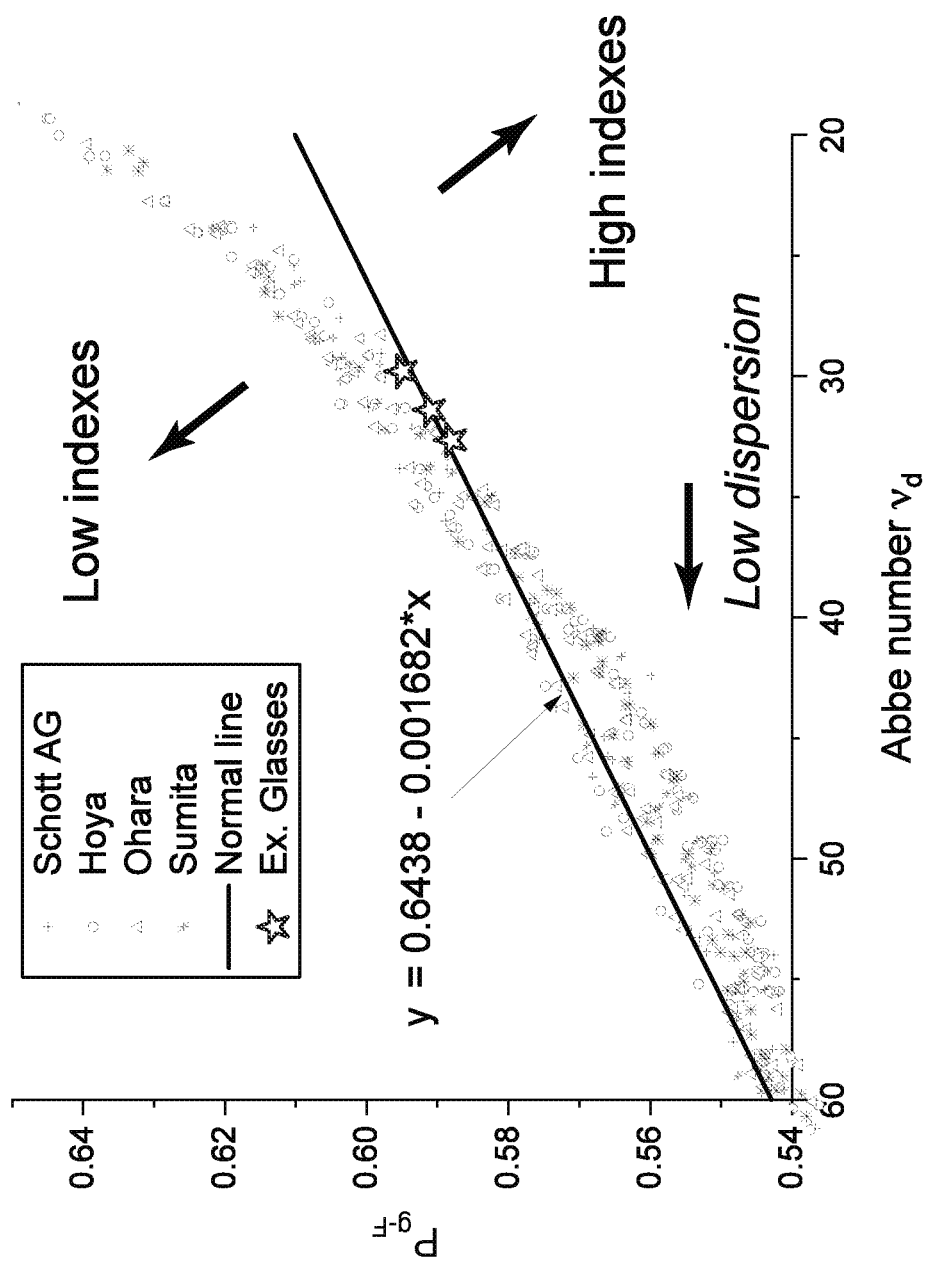
FIG. 2 is a plot illustrating the relationship between Abbe number $v_d$ and relative partial dispersion $P_{g-F}$ for some prior art glasses and some exemplary glasses according to an embodiment of the present disclosure.

In some optical applications, such as photo camera lenses and bifocal eyeglass lenses, it is desirable to correct the distortions of optical images formed by the optical elements (e.g., the lenses). To address these challenges, some optical systems may include multiple optical elements made of optical materials having different refractive indices and dispersions, such as, for example, achromat systems. In some applications, it is preferable that the optical dispersions of the materials satisfy particular relationships. One common relationship is referred to as the "normal line" and characterizes the relationship between the refractive index of the sample at four different wavelengths: $n_d$ (587.56 nm), $n_F$ (486.1 nm), $n_C$ (656.3 nm) and $n_g$ (435.8 nm), as follows in formula (V):

$$P_{g-F} = \frac{(n_g - n_F)}{(n_F - n_C)} = A + B v_d = A + B\left(\frac{(n_d - 1)}{(n_F - n_C)}\right) \qquad \text{(V)}$$

where the numerical values of the coefficients A and B in the present disclosure are those provided in "Color correction in optical systems," by Dr. Ralf Jedamzik, released by Schott Advanced Optics in May 2014 (p. 14), in which A=0.6438 and B=−0.001682. $P_{g-F}$ is referred to as the partial relative dispersion. A calculated value of $P_{g-F}$ that approaches the value described by formula (V) is indicative of the ability of the material to satisfy the "normal line" relationship that is required in many types of optical systems. FIG. 2 illustrates a plot of $P_{g-F}$ as a function of Abbe number $v_d$ for comparative glasses from the optical catalogs of Schott AG, Hoya, Ohara, and Sumita, and some exemplary glasses ("Ex. Glasses") according to the present disclosure. FIG. 2 illustrates the relationship of the comparative and exemplary glasses to the "normal line," shown in the plot as a line according to the equation: y=0.6438–0.001682*x. The examples illustrated in FIG. 2 demonstrate the challenge of forming glasses that align with the normal line, i.e., glasses that have a minimal deviation or distance from the normal line.

According to some embodiments of the present disclosure, the glasses described herein can have a relative partial dispersion $P_{g-F}$ that satisfies formula (VI) and formula (VII):

$$P_{g-F} < 0.6750 - 0.0028 * v_d \qquad (VI)$$

and $$-0.005 \leq P_{g-F} - (0.6438 - 0.001682 * v_d) \leq 0.005 \qquad (VII)$$

where the Abbe number is about 33 or less.

In some embodiments, the glasses are characterized by a high transmittance. In general, the higher the transmittance of a glass, the longer is the path traversed by light at a given optical loss, which can improve optical performance in many applications. High refractive index glasses typically include species, such as $TiO_2$ and $Nb_2O_5$, that absorb at least a portion of optical light, particularly light in the blue and near-UV regions of the electromagnetic spectrum. In embodiments of the present disclosure, the transmittance of the glass may be characterized for different wavelengths within the range of from about 300 nm to 2300 nm. High transmission in the visible and near-UV range (blue region) is particularly desirable in some applications. High transmittance in the blue can be challenging to achieve in high refractive index glasses. High level of $TiO_2$ and/or $Nb_2O_5$ that are typically used in glasses to increase refractive index tend to decrease the transmittance in the near-UV region and shift the UV cut-off to higher wavelengths. Internal transmittance (Fresnel losses accounted for) in the blue can be considered as acceptable when a sample of thickness 10 mm has an internal transmittance equal to or greater than 90% at a wavelength of 460 nm, good when the internal transmittance is equal to or greater than 95%, and excellent when the internal transmittance is equal to or greater than 97%.

Figure 3:
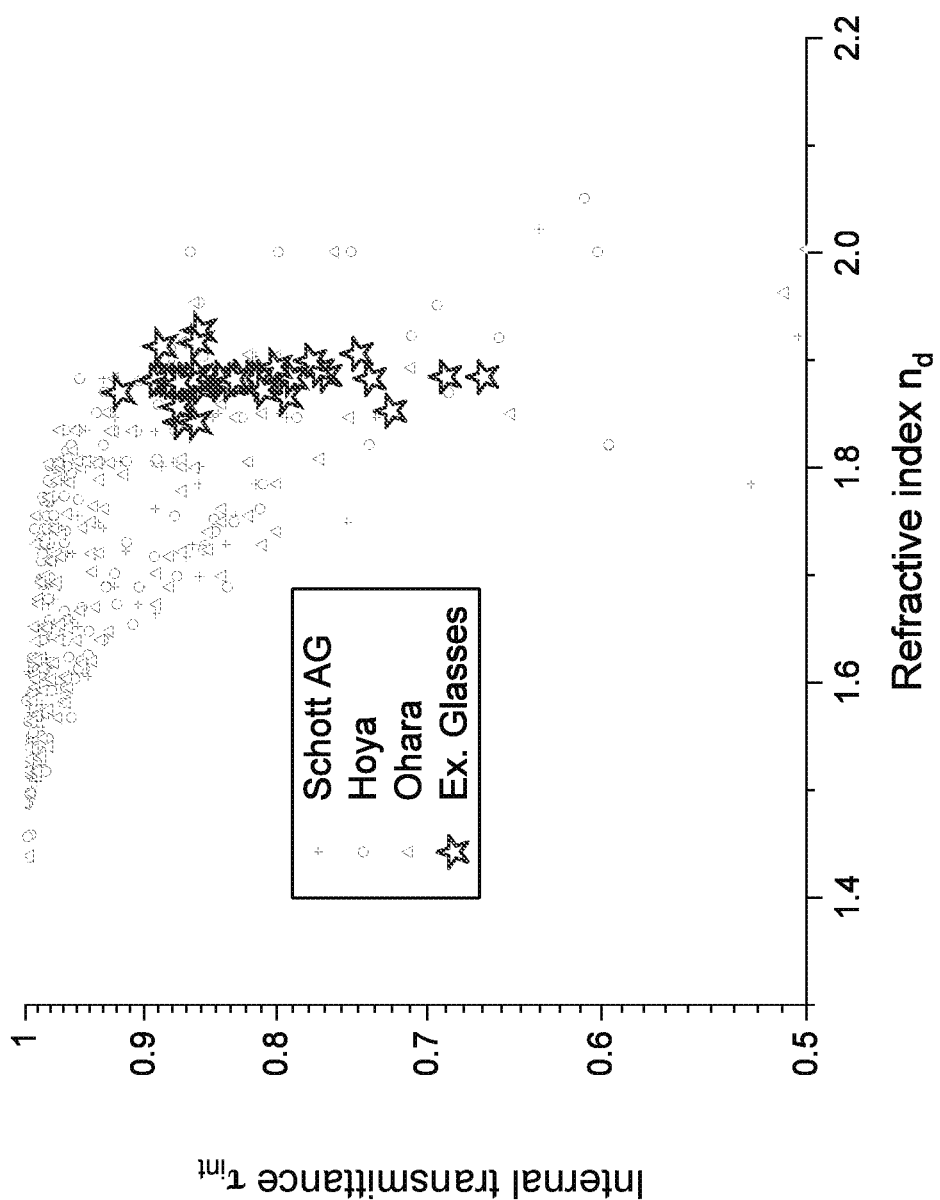
FIG. 3 is a plot illustrating the relationship between measured refractive index $n_d$ (measured at 587.56 nm) and internal transmittance $\tau_{int}$ at the wavelength of 400 nm for some prior art glasses and some exemplary glasses according to an embodiment of the present disclosure.

FIG. 3 is a plot of refractive index $n_d$ as a function of internal transmittance Tint for comparative glasses from the optical catalogs of Schott AG, Hoya, and Ohara, and some exemplary glasses (Ex. Glasses) according to an embodiment of the present disclosure. The data illustrated in FIG. 3 was obtained for comparative and exemplary glass samples having a thickness of 10 mm, as measured at a wavelength of 400 nm. As illustrated in FIG. 3, as the refractive index increases above 1.7, 1.8, etc., the blue transmittance of the glass generally decreases. Without wishing to be limited by any theory, it is believed that the addition of species such as $TiO_2$ and $Nb_2O_5$, which are often added in an effort to form a glass having a low density, may adversely affect the ability of the glass to transmit blue light. Thus, as discussed above, in some embodiments of the present disclosure, the amount of $TiO_2$ and/or $Nb_2O_5$ in the present glasses may be limited as described herein, particularly when an increase in the transmittance of blue light is desired.

Figure 4:
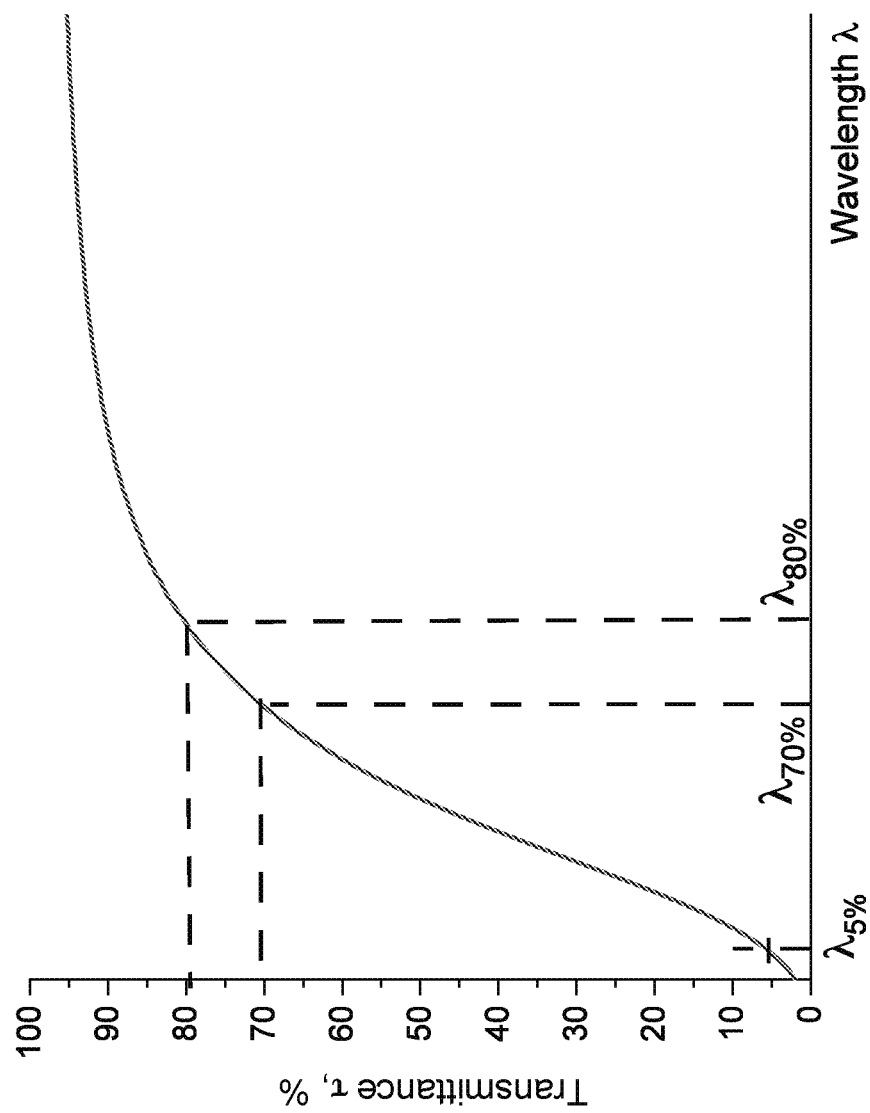
FIG. 4 is a plot schematically illustrating the dependence of the transmittance of a glass sample on the incident wavelength in the blue and near-UV range of the electromagnetic spectrum.

FIG. 4 is a schematic representation of the total transmittance as a function of wavelength for specific values of transmittance, namely, 5%, 70%, and 80%. The wavelengths corresponding to each of these specific values of transmittance, 5%, 70%, and 80%, are represented as $\lambda_{5\%}$, $\lambda_{70\%}$, and $\lambda_{80\%}$, respectively. In the context of the present disclosure, a lower value for the quantities $\lambda_{5\%}$, $\lambda_{70\%}$, and $\lambda_{80\%}$ corresponds to improved blue and UV transmittance of the optical glass.

In some embodiments of the present disclosure, the glasses may have a total transmittance of 70% at a wavelength $\lambda_{70\%}$, in nanometers, according to formula (VIII) and/or according to formula (IX):

$$\lambda_{70\%} \leq (580 * n_d) - 691 \qquad (VIII)$$

$$\lambda_{70\%} \leq (580 * n_d) - 680 \qquad (IX)$$

where $n_d$ is the refractive index measured at a wavelength of 587.56 nm and the total transmittance is measured on a sample of 10 mm thickness.

In some embodiments of the present disclosure, the glasses may have a total transmittance of 70% at a wavelength $\lambda_{70\%}$, in nanometers, based on a relative partial dispersion $P_{g-F}$ of the glass according to formula (X):

$$\lambda_{70\%} \leq 210 + 300 * P_{g-F} \qquad (X)$$

where $P_{g-F}$ is the relative partial dispersion of the glass as described above with respect to formula (V).

In some embodiments of the present disclosure, the glasses may have a total transmittance of 80% at a wavelength $\lambda_{80\%}$, in nanometers, according to formula (XI):

$$\lambda_{80\%} \leq (1100 * n_d) - 1620 \qquad (XI).$$

According to one embodiment, the glasses of the present disclosure can have a total transmittance τ of greater than or equal to 10%, as measured at 360 nm through a glass sample having a thickness of 10 mm. For example, the glasses can have a total transmittance τ of greater than or equal to 10%, greater than or equal to 12%, greater than or equal to 15% or greater than or equal to 18%, as measured at 360 nm through a glass sample having a thickness of 10 mm. In some examples, the glass of the present disclosure can have a total transmittance τ of 10% to 20%, 10% to 18%, 10% to 15%, or 10% to 12%, as measured at 360 nm through a glass sample having a thickness of 10 mm. In some embodiments, the glasses can have a total transmittance τ of greater than or equal to 25%, as measured at 370 nm through a glass sample having a thickness of 10 mm. For example, the glasses can have a total transmittance τ of greater than or equal to 25%, greater than or equal to 28%, greater than or equal to 30%, or greater than or equal to 32%, as measured at 370 nm through a glass sample having a thickness of 10 mm. In some examples, the glass of the present disclosure can have a total transmittance τ of 25% to 35%, 25% to 32%, 25% to 30%, or 25% to 28%, as measured at 370 nm through a glass sample having a thickness of 10 mm. In some embodiments, the glasses can have a total transmittance τ of greater than or equal to 50%, as measured at 380 nm through a glass sample having a thickness of 10 mm. For example, the glasses can have a total transmittance τ of greater than or equal to 50%, greater than or equal to 55%, or greater than or equal to 58%, as measured at 380 nm through a glass sample having a thickness of 10 mm. For example, the glass of the present disclosure can have a total transmittance τ of 50% to 60%, 50% to 58%, or 50% to 55%, as measured at 380 nm through a glass sample having a thickness of 10 mm.

According to some embodiments, the glasses of the present disclosure can have a transmittance index $T_i$ of equal to or greater than 0.485, where the transmittance index $T_i$ is determined according to formula (XII):

$$T_i = \frac{(La_2O_3 + Gd_2O_3 + ZrO_2)}{(La_2O_3 + Gd_2O_3 + ZrO_2 + TiO_2 + Nb_2O_5)} \qquad (XII)$$

where each oxide listed in formula (XII) refers to the amount of the oxide, expressed in mol %, in the glass. In some examples, when the transmittance index $T_i$ according to formula (XII) is less than 0.485, the transmittance of the glass may not be sufficiently high for some applications. In some examples, the transmittance index $T_i$ according to formula (XII) is may be greater than or equal to 0.485, greater than or equal to 0.500, greater than or equal to 0.550, or greater than or equal to 0.575. For example, the transmittance index $T_i$ according to formula (XII) may be from 0.485 to 0.600, 0.490 to 0.600, 0.500 to 0.600, 0.520 to 0.600, 0.540 to 0.600, 0.560 to 0.600, 0.580 to 0.600, 0.485 to 0.580, 0.490 to 0.580, 0.500 to 0.580, 0.520 to 0.580, 0.540 to 0.580, 0.560 to 0.580, 0.485 to 0.560, 0.490 to 0.560, 0.500 to 0.560, 0.520 to 0.560, 0.540 to 0.560, 0.485 to 0.540, 0.490 to 0.540, 0.500 to 0.540, 0.520 to 0.540, 0.485 to 0.520, 0.490 to 0.520, or 0.500 to 0.520.

In some embodiments, the glass may be characterized by a refractive index $n_d$ (measured at 587.56 nm) and a transmittance index $T_i$ that satisfies formula (XIII):

$$n_d - (2.23 - 0.71 * T_i) \geq 0 \quad \text{(XIII)}$$

Refractive index and density are two properties that can be predicted from the glass composition. A linear regression analysis of comparative glasses near the composition space of the exemplary glasses of the present disclosure and some exemplary glasses was performed to determine an equation that can predict the composition dependence of the refractive index $n_d$ at a wavelength of 587.56 nm and the composition dependence of the density of the glass at 25° C. (in g/cm³). Formulas (XIV) and (XV) below were obtained from the linear regression analysis and used to predict the refractive index and density, respectively, of the glasses:

$$P_n = 1.76448 - 0.0025993*SiO_2 - 0.0032405*B_2O_3 + 0.0080741*La_2O_3 + 0.0043523*TiO_2 + 0.00068765*ZnO + 0.0025517*ZrO_2 + 0.00044436*CaO + 0.010555*Nb_2O_5 - 0.00096472*MgO + 0.0018347*BaO + 0.0042527*WO_3 + 0.0074402*Gd_2O_3 + 0.0051472*Y_2O_3 + 0.0084813*Ta_2O_5 - 0.00038955*Li_2O - 0.0030622*Al_2O_3 - 0.0018065*Na_2O - 0.0020469*GeO_2 + 0.00031047*SrO + 0.012300*Bi_2O_3 + 0.0057762*Yb_2O_3 - 0.0023916*K_2O + 0.0046338*PbO + 0.003511*TeO_2 \quad \text{(XIV)}$$

$$P_d = -0.017278*SiO_2 - 0.021239*B_2O_3 + 0.052881*La_2O_3 - 0.0055*TiO_2 + 0.0094*ZnO + 0.00959*ZrO_2 - 0.00513*CaO + 0.00483*Nb_2O_5 - 0.00634*MgO + 0.017909*BaO + 0.035197*WO_3 + 0.065396*Gd_2O_3 + 0.028828*Y_2O_3 + 0.05192*Ta_2O_5 - 0.011038*Li_2O - 0.024078*Al_2O_3 - 0.012419*Na_2O - 0.00481*GeO_2 + 0.00629*SrO + 0.085597*Bi_2O_3 + 0.068626*Yb_2O_3 - 0.022501*K_2O + 0.042687*PbO + 0.00506*TeO_2 + 4.42476 \quad \text{(XV)}$$

where $P_n$ is a refractive index parameter that predicts the refractive index $n_d$ of the glass at a wavelength of 587.56 nm and $P_d$ is a density parameter that predicts the density of the glass at a 25° C. (in g/cm³) based on the composition of the glass, where each oxide listed in formula (XIV) and (XV) refers to the amount of the oxide in the glass, expressed in mol %.

Figure 5:
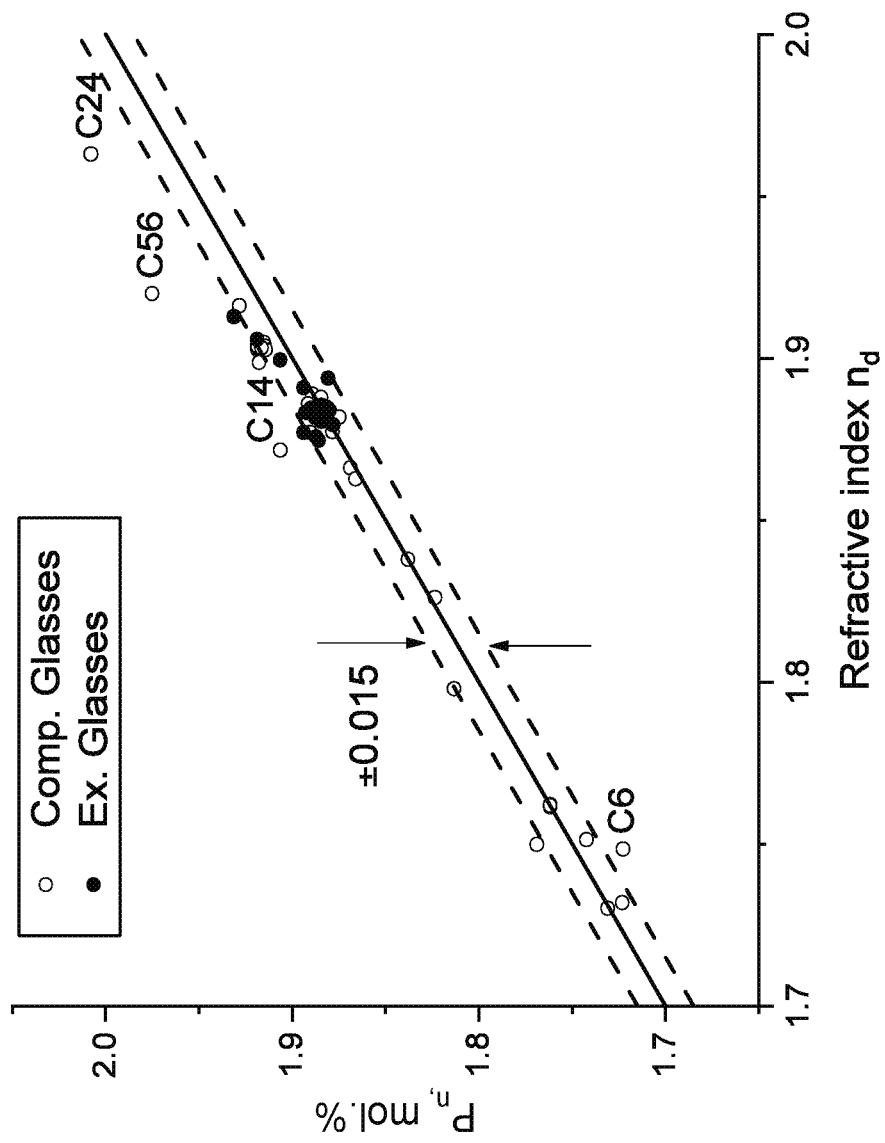
FIG. 5 is a plot illustrating the relationship between measured refractive index $n_d$ (measured at 587.56 nm) and the refractive index parameter $P_n$ for some comparative glasses and some exemplary glasses according to an embodiment of the present disclosure.
Figure 6:
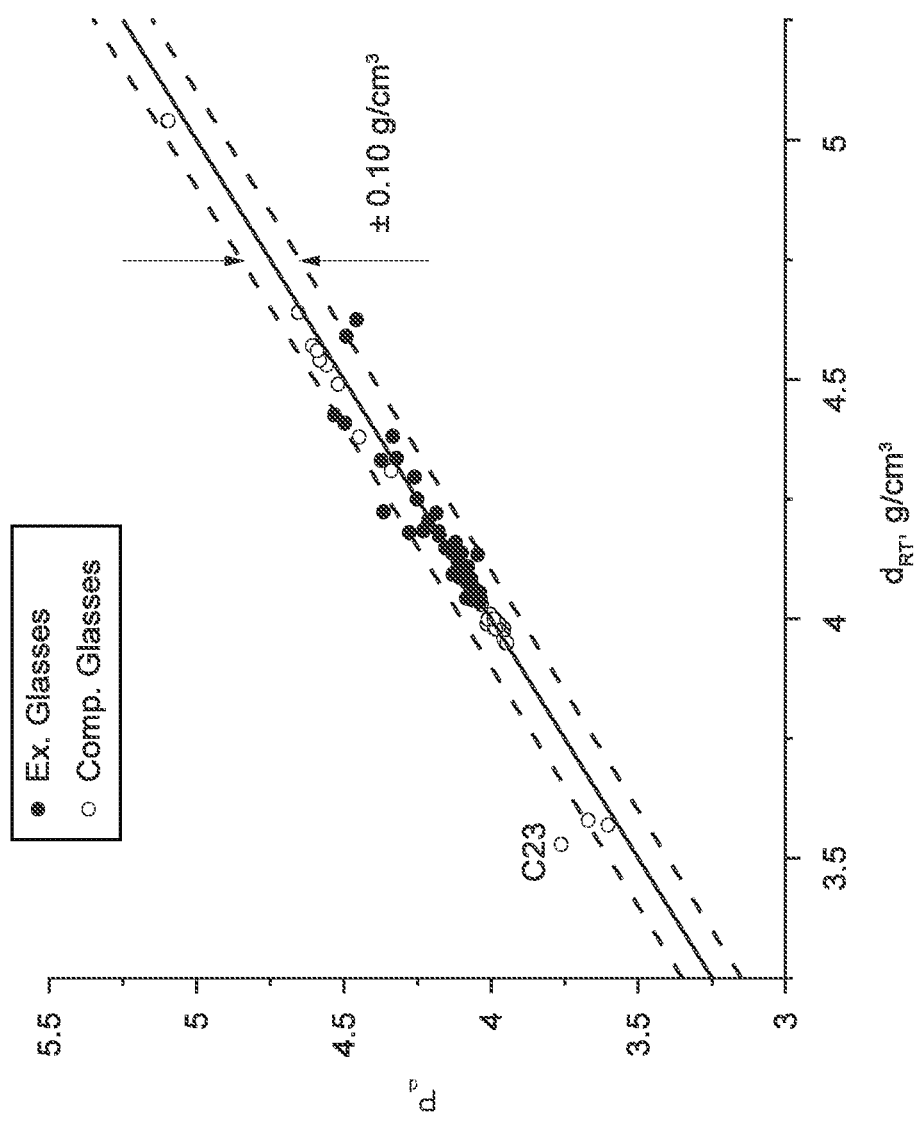
FIG. 6 is a plot illustrating the relationship between measured density and the density parameter $P_d$ for some comparative glasses and some exemplary glasses according to an embodiment of the present disclosure.

FIG. 5 is a plot of measured refractive index $n_d$ (measured at 587.56 nm) as a function of refractive index parameter $P_n$ for some Comparative Glasses ("Comp. Glasses") and Exemplary Glasses ("Ex. Glasses"). As illustrated by the data in FIG. 5, the compositional dependence of the refractive index parameter $P_n$ had an error within a range of ±0.015 units of the measured refractive index $n_d$ for the majority of glasses. FIG. 6 is a plot of measured density (measured at 25° C., in g/cm³) as a function of density parameter $P_d$ for some comparative glasses and exemplary glasses. As illustrated by the data in FIG. 6, the composition dependence of the density parameter $P_d$ had an error within a range of ±0.10 g/cm³ of the measured density for the majority of glasses. Table 1 below specifies the concentration limits where the formulas (XIV) and (XV) were derived. The linear regression analysis used to determine formulas (XIV) and (XV) randomly selected glasses to use as a training set to develop the regression and selected glasses to use as a validation set to evaluate the ability to interpolate within predefined compositional limits (shown in Table 1 below), with the exclusion of insignificant variables and outliers. An external dataset of prior art glass compositions was used to evaluate the ability to predict the particular properties outside of the specified compositional limits with a reasonable accuracy. Multiple iterations of this process were performed in order to determine the best variant for each property of interest, corresponding to formulas (XIV) and (XV). The data for the Comparative Glass compositions used in the linear regression modeling was obtained from the publically available SciGlass Information System database. With regard to the refractive index $n_d$ at 587.56 nm, for glasses in the SciGlass Information System database that did not report a refractive index $n_d$ measured at 587.56 nm, the modeling system provided an interpolation of the refractive index $n_d$ at 587.56 nm based on the refractive index values that were provided for that particular glass.

TABLE 1

| Composition Area Used for Modeling | | |
|---|---|---|
| Oxide | Minimum (mol %) | Maximum (mol %) |
| $B_2O_3$ | 10 | 30 |
| $SiO_2$ | 5 | 20 |
| $TiO_2$ | 0 | 30 |
| $Nb_2O_5$ | 0 | 30 |
| $La_2O_3$ | 0 | 20 |
| $ZrO_2$ | 0 | 10 |
| CaO | 0 | 25 |
| SrO | 0 | 10 |
| $K_2O$ | 0 | 10 |
| $Li_2O$ | 0 | 10 |
| $Na_2O$ | 0 | 10 |
| BaO | 0 | 10 |
| $Yb_2O_3$ | 0 | 10 |
| $Gd_2O_3$ | 0 | 10 |
| $Bi_2O_3$ | 0 | 20 |
| Other species | 0 | Not limited |

Concentration limits representing some embodiments of the present disclosure are specified in Tables 2, 3 and 4 below.

According to an embodiment, the glasses of the present disclosure can have a refractive index parameter $P_n$ of from 1.7 to 1.95. For example, the glasses can have a refractive index parameter P. of from 1.7 to 1.95, 1.75 to 1.95, 1.80 to 1.95, 1.85 to 1.95, 1.90 to 1.95, 1.7 to 1.90, 1.75 to 1.90, 1.80 to 1.90, 1.85 to 1.90, 1.7 to 1.85, 1.75 to 1.85, 1.80 to 1.85, 1.7 to 1.80, or 1.75 to 1.80.

According to another embodiment, the glasses of the present disclosure can have a density parameter $P_d$ of less than or equal to 4.5. For example, the glasses can have a density parameter $P_d$ of less than or equal to 4.5, less than or equal to 4.4, less than or equal to 4.3, less than or equal to 4.2, or less than or equal to 4.1.

According to one more embodiment of the present disclosure, the present glasses can have a refractive index parameter $P_n$ and a density parameter $P_d$ that satisfies formula (XVI):

$$P_n-(1.11+0.18*P_d)\geq 0.000 \quad \text{(XVI)}$$

where the refractive index parameter $P_n$ has a value of from 1.7 to 1.95. In some embodiments, the glasses of the present disclosure may also satisfy formula (XVI)(a):

$$P_n-(1.120+0.18*P_d)>0.000 \quad \text{(XVI)(a)}$$

and some glasses may also satisfy formula (XVI)(b)

$$P_n-(1.135+0.18*P_d)>0.000 \quad \text{(XVI)(b)}.$$

In some embodiments, the glasses of the present disclosure can have a refractive index parameter $P_n$ and a transmittance index $T_i$ that satisfies formula (XVII):

$$P_n-(2.23-0.71*T_i)\geq 0.000 \quad \text{(XVII)}$$

where $P_n$ has a value of from 1.75 to 1.95.

In some embodiments, the glasses may be characterized by good glass forming ability, which can be assessed as a resistance to devitrification during cooling. As discussed above, glass forming ability can be measured numerically by determining the critical cooling rate of a melt, i.e., the minimum cooling rate at which a melt forms a glass without crystallization. According to one embodiment, the glasses may be characterized by a critical cooling rate less than or equal to 300° C./min. and in some examples, less than or equal to 100° C./min. In some embodiments, the glasses of the present disclosure can be characterized by an ability to cool, in air, from 1100° C. to 500° C. in 2.5 minutes without crystallizing. Glasses characterized by this glass forming ability can be compatible with press molding processes.

Exemplary Glasses A of the present disclosure according to some embodiments of the present disclosure are shown below in Table 2. Table 2 identifies the combination of components and their respective amounts according to some embodiments of the present disclosure. The Exemplary Glasses A in Table 2 may include additional components according to any aspects of the present disclosure as described herein.

TABLE 2

Exemplary Glasses A

| Component | Amount (wt %) |
|---|---|
| $SiO_2$ | 0.3 wt % to 30.0 wt % |
| $B_2O_3$ | 0.3 wt % to 30.0 wt % |
| $Nb_2O_5$ | 0.3 wt % to 50.0 wt % |
| $ZrO_2$ | 2.5 wt % to 15.0 wt % |
| CaO | 0.5 wt % to 25.0 wt % |
| $Gd_2O_3$ | 0.0 wt % to 20.0 wt % |
| $Y_2O_3$ | 0.0 wt % to 10.0 wt % |
| $TiO_2$ | 0.0 wt % to 7.05 wt % |
| ZnO | 0.0 wt % to 2.0 wt % |
| $Li_2O$ | 0.0 wt % to 2.0 wt % |
| $GeO_2$ | 0.0 wt % to 2.0 wt % |
| $Ta_2O_5$ | 0.0 wt % to 1.0 wt % |
| ($Nb_2O_5$ + $TiO_2$) | 18.0 wt % to 50.0 wt % |
| ($SiO_2$ + $B_2O_3$) | 1.0 wt % to 30.0 wt % |
| ($La_2O_3$ + $Gd_2O_3$) | 0.0 wt % to 40.0 wt % |
| (CaO + SrO + BaO) | ≥0.2 wt % |
| (PbO + $V_2O_5$) | 0.0 wt % to 1.0 wt % |
| CaO/($Li_2O$ + $Na_2O$ + $K_2O$ + MgO + CaO + SrO + BaO + ZnO) (in wt %) | ≥0.50 |
| $SiO_2$/($SiO_2$ + $B_2O_3$) (in wt %) | 0.0 to 0.50 |
| (CaO + SrO + BaO)/($Nb_2O_5$ + $TiO_2$) (in wt %) | ≥0.45 |
| fluorine | substantially free |

Exemplary Glasses B of the present disclosure according to some embodiments of the present disclosure are shown below in Table 3. Table 3 identifies the combination of components and their respective amounts according to an embodiment of the present disclosure. The Exemplary Glasses B in Table 3 may include additional components according to any aspects of the present disclosure as described herein.

TABLE 3

Exemplary Glasses B

| Composition | Amount (mol %) |
|---|---|
| $SiO_2$ | 3.0 mol % to 50.0 mol % |
| $B_2O_3$ | 18.0 mol % to 33.0 mol % |
| $Nb_2O_5$ | 1.0 mol % to 30.0 mol % |
| $TiO_2$ | 0.0 mol % to 22.0 mol % |
| ZnO | 0.0 mol % to 10.0 mol % |
| ($SiO_2$ + $B_2O_3$) | 3.0 mol % to 50.0 mol % |
| ($Y_2O_3$ + $GeO_2$ + $Ta_2O_5$ + $Al_2O_3$ + $MoO_3$ + PbO + $TeO_2$ + FeO + $Fe_2O_3$) | 0.0 mol % to 0.5 mol % |
| (RO + $Alk_2O$) | 0.0 mol % to 40.0 mol % |
| ($Bi_2O_3$ + PbO) | 0.0 mol % to 20.0 mol % |
| fluorine | substantially free |

Exemplary Glasses B according to embodiments of the present disclosure may also satisfy formula (XVI):

$$P_n-(1.11+0.18*P_d)\geq 0.000 \quad \text{(XVI)}$$

where $P_n$ is from 1.7 to 1.95 and $P_n$ and $P_d$ are calculated according to formula (XIV) and formula (XV), respectively. Exemplary Glasses B may also have a transmittance index $T_i$ of from 0.485 to 0.600, where $T_i$ is calculated according to formula (XII).

Exemplary Glasses C of the present disclosure according to some embodiments of the present disclosure are shown below in Table 4. Table 4 identifies the combination of components and their respective amounts according to an embodiment of the present disclosure. The Exemplary Glasses C in Table 4 may include additional components according to any aspects of the present disclosure as described herein.

TABLE 4

Exemplary Glasses C

| Composition | Amount (mol %) |
|---|---|
| $SiO_2$ | ≥3.0 mol % |
| $B_2O_3$ | ≥1.0 mol % |
| $Nb_2O_5$ | 0.5 mol % to 25.0 mol % |
| RO | ≥3.0 mol % |
| CaO | 0.0 mol % to 32.0 mol % |
| $Li_2O$ | 0.0 mol % to 7.0 mol % |
| MgO | 0.0 mol % to 5.0 mol % |
| $Y_2O_3$ | 0.0 mol % to 1.5 mol % |
| $Ta_2O_5$ | 0.0 mol % to 0.5 mol % |
| BaO | 0.0 mol % to 12.0 mol % |
| CdO | 0.0 mol % to 10.0 mol % |
| $Bi_2O_3$ | 0.0 mol % to 20.0 mol % |
| PbO | 0.0 mol % to 1.0 mol % |
| $HfO_2$ | 0.0 mol % to 5.0 mol % |
| $TeO_2$ | 0.0 mol % to 5.0 mol % |
| $TiO_2$ | 0.0 mol % to 18.0 mol % |
| ZnO | 0.0 mol % to 2.0 mol % |
| $RE_2O_3$ | 0.0 mol % to 23.0 mol %; |
| ($RE_2O_3$ + $TiO_2$ + $Nb_2O_5$ + $ZrO_2$ + $Bi_2O_3$ + $WO_3$) | ≥25.0 mol % |
| ($SiO_2$ + $B_2O_3$) | greater than 0.0 mol % to 50.0 mol %; |
| ($SiO_2$ + $B_2O_3$ + $Alk_2O$ + MgO + CaO + SrO + BaO + ZnO) | 4.0 mol % to 69.0 mol % |

Exemplary Glasses C according to an embodiment of the present disclosure can optionally include fluorine from 0.0 atomic % to 1.0 atomic %. In some embodiments, the Exemplary Glasses C satisfy formula (XVII):

$$P_n-(2.23-0.71*T_i) \geq 0.000 \qquad \text{(XVII)}$$

where $P_n$ is from 1.75 to 1.95 and $P_n$ is calculated according to formula (XIV) and $T_i$ is calculated according to formula (XII). Exemplary Glasses C may also have a density parameter $P_d$ of less than 4.5, where $P_d$ is calculated according to formula (XV).

Embodiments of the present disclosure can provide glasses that are characterized by a high refractive index $n_d$ of greater than 1.7, in some embodiments greater than 1.8, in combination with a density of less than, or less than or equal to, 4.5 g/cm³ (as measured at 25° C.), optionally in combination with one or more additional desired features. In some embodiments, the glasses of the present disclosure can provide an improvement in glass forming ability compared to some prior art silicoborate glasses that have similar values of density and refractive index $n_d$. These improvements in glass forming ability can simplify production, provide cost savings and/or improve the quality of the final glass product. In some embodiments, the glasses of the present disclosure may provide comparable or improved optical dispersion, transmittance for blue light, resistance to devitrification, and/or chemical durability compared to prior art glasses having similar refractive index $n_d$ and/or density characteristics.

EXAMPLES

The following examples describe various features and advantages provided by the disclosure, and are in no way intended to limit the invention and appended claims.

Exemplary Glasses and Comparative Glasses were all prepared by melting relatively pure oxide materials. Table 5 below lists the typical tramp elements found in some of the oxides used in preparing the Exemplary Glasses and Comparative Glasses described herein.

TABLE 5

Raw Oxide Materials and Corresponding Level of Tramp Elements.

| Raw material | Fe content (ppm) | Cu content (ppm) | Ni content (ppm) | Cr content (ppm) |
| --- | --- | --- | --- | --- |
| Quartz | <10 | <1 | <1 | <1 |
| Boric anhydride | <10 | <1 | <1 | <1 |
| Titanium oxide | <50 | <15 | <1 | <5 |
| Zirconium oxide | <5 | <5 | <5 | <5 |
| Niobium oxide | <70 | <5 | <5 | <5 |
| Lanthanum oxide | <90 | <4 | <5 | <5 |

To prepare glass samples for the Exemplary Glasses 1 to 26, one kilogram of batch was prepared in a pure platinum crucible. The crucible was placed in a furnace set at a temperature of 1250° C., after which, the temperature in the furnace was raised to 1300° C. and held at 1300° C. for 2 hours. The furnace temperature was then reduced to 1250° C. and the glass was allowed to equilibrate at this temperature for an hour before being poured on a steel table followed by annealing at $T_g$ for an hour.

Some sample melts were also melted in a "one liter" platinum crucible heated by Joule effect. In this process, approximately 3700 g of raw materials was used. The crucible was filled in 1.5 hours at 1250° C. The temperature was then raised to 1300° C. and held for one hour. During this step, the glass was continuously stirred at 60 rpm. The temperature was then decreased to 1200° C. where it was allowed to equilibrate for 30 minutes and the stirring speed was decreased to 20 rpm. The delivery tube was heated at 1225° C. and the glass was casted on a cooled graphite table. The glass was formed into a bar of approximately 25 mm in thickness, 50 mm in width, and 90 cm in length. The prepared bars were inspected under an optical microscope to check for crystallization and were all crystal free. The glass quality observed under the optical microscope was good with the bars being striae and bubble free. The glass was placed at $T_g$ in a lehr oven for 1 hour for a rough annealing. The bars were then annealed in a static furnace for one hour at $T_g$ and the temperature was then lowered at 1° C./min.

Figure 7:
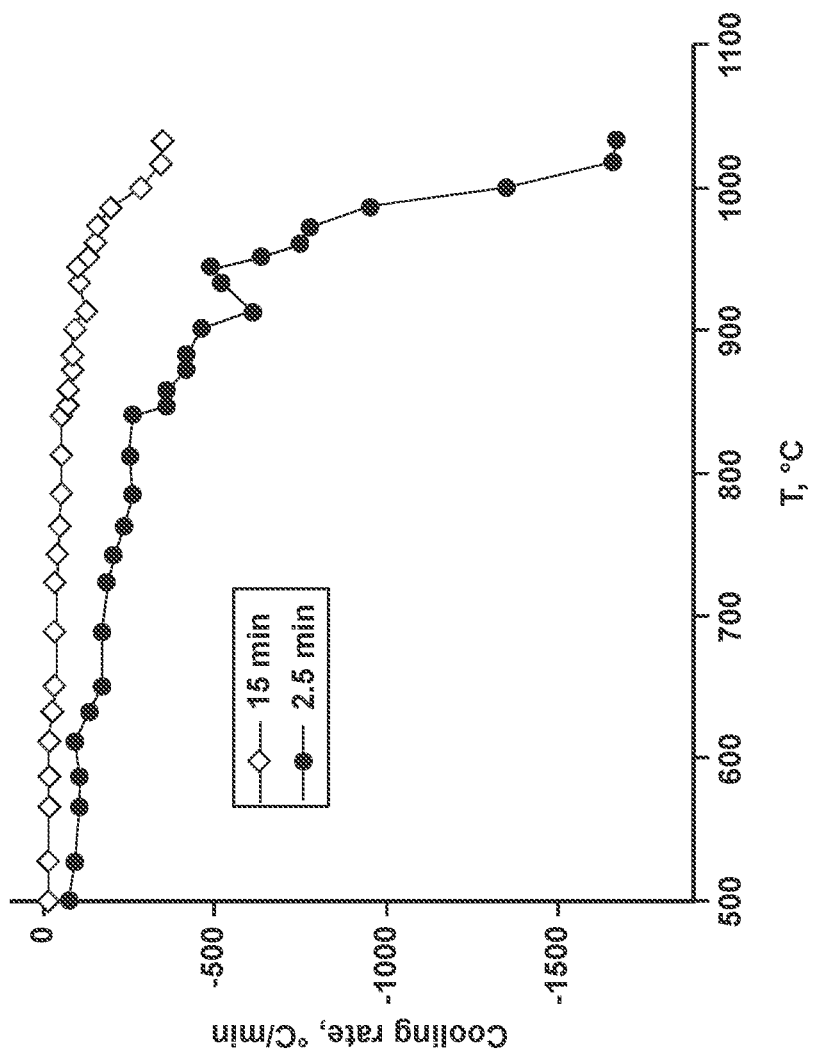
FIG. 7 is a plot of an exemplary cooling schedule according to a "15 min test" condition and a "2.5 min test" condition for some exemplary glasses according to an embodiment of the present disclosure.

To prepare glass samples for Exemplary Glasses 27 to 65, about 15 grams of each sample (content of target species was more than 99.99 wt %) was melted from batch raw materials at a temperature of about 1300° C. in platinum or platinum-rhodium crucibles (Pt:Rh=80:20) for 1 hour. Two controlled cooling conditions were applied. In the first condition (referred to as "15 min test"), it takes about 15 min for the samples to cool from 1100° C. to 500° C. inside a furnace. In the second condition (referred to as "2.5 min test"), it takes about 2.5 min for the samples to cool from 1100° C. to 500° C. Temperature readings were obtained by direct reading of the furnace temperature or using an IR camera reading with calibration scaling. The first condition (15 min test) approximately corresponds to the cooling rate of up to 300° C./min at a temperature of 1000° C. and the second test approximately corresponds to the cooling rate of up to 600° C./min at 1000° C. (near to this temperature, the cooling rate approached the maximum). When the temperature is lower, the cooling rate also decreases significantly. Typical schedules of the first and second cooling regimes are shown in FIG. 7. No chemical analysis of the tested samples was performed because chemical analysis was performed for similar samples prepared in independent meltings by XRF method (X-ray fluorescence—for all oxides, except for $B_2O_3$) and by ICP method (inductively coupled plasma mass spectrometry—for $B_2O_3$). These analyses gave deviations from the batched compositions within ±2.0 mass % for the major components such as $Nb_2O_5$ which is equivalently less than about 1 mol %.

Table 6 below lists the glass compositions and properties for Exemplary Glasses 1-65, according to embodiments of the present disclosure. Table 6 includes the observations from three devitrification tests, referred to as "Devit test 1," "Devit test 2," and Devit test 3." "Devit test 1" refers to the results of observations of glass samples melted in 1 liter crucibles under an optical microscope (between 100× and 500× magnification). The abbreviations "A", "B", "C" and "D" are used as follows: no evidence of crystallization ("A"); a very limited number of crystals was found under the microscope, typically in only one or two spots within the glass and only at the surface, with more than 98% of the surface being crystal free ("B"); more crystals at the surface, but with more than 90% of the glass surface being crystal-free ("C"); and some crystals in the bulk of crucible, with less than 90% of the glass surface being crystal-free ("D"). "Devit test 2" refers to the "15 min test" cooling procedure as described above; the observation "OK" is used to indicate that a glass composition passed this test. "Devit test 3" refers to the "2.5 min test" cooling procedure as described above; the observation "OK" is used to indicate that a glass composition passed this test.

TABLE 6

Exemplary Glass Compositions and Properties

| Exemplary Glass | | 1 | 2 | 3 | 4 | 5 | 6 | 7 | 8 |
|---|---|---|---|---|---|---|---|---|---|
| Composition—mol. % | | | | | | | | | |
| $B_2O_3$ | mol. % | 25.61 | 25.61 | 25.60 | 25.61 | 25.61 | 25.61 | 25.61 | 25.61 |
| CaO | mol. % | 24.21 | 24.21 | 22.22 | 20.21 | 18.21 | 24.21 | 24.21 | 24.21 |
| $SiO_2$ | mol. % | 13.73 | 13.73 | 13.73 | 13.73 | 13.73 | 13.73 | 13.73 | 13.73 |
| $La_2O_3$ | mol. % | 9.15 | 9.15 | 9.15 | 9.15 | 9.15 | 9.15 | 9.15 | 9.15 |
| $ZrO_2$ | mol. % | 7.23 | 7.23 | 7.23 | 7.23 | 7.23 | 7.23 | 7.23 | 7.23 |
| $TiO_2$ | mol. % | 12.75 | 12.75 | 12.75 | 12.75 | 12.75 | 10.75 | 8.75 | 6.75 |
| $Nb_2O_5$ | mol. % | 7.32 | 7.32 | 7.32 | 7.32 | 7.32 | 9.32 | 11.32 | 13.32 |
| BaO | mol. % | 0 | 0 | 2.00 | 4.00 | 6.00 | 0 | 0 | 0 |
| Composition—wt % | | | | | | | | | |
| $B_2O_3$ | wt % | 16.51 | 16.51 | 16.21 | 15.93 | 15.66 | 15.96 | 15.44 | 14.96 |
| CaO | wt % | 12.57 | 12.57 | 11.33 | 10.13 | 8.97 | 12.15 | 11.76 | 11.39 |
| $SiO_2$ | wt % | 7.64 | 7.64 | 7.50 | 7.37 | 7.25 | 7.38 | 7.15 | 6.92 |
| $La_2O_3$ | wt % | 27.60 | 27.60 | 27.11 | 26.64 | 26.18 | 26.68 | 25.82 | 25.02 |
| $ZrO_2$ | wt % | 8.25 | 8.25 | 8.10 | 7.96 | 7.83 | 7.97 | 7.72 | 7.48 |
| $TiO_2$ | wt % | 9.43 | 9.43 | 9.26 | 9.10 | 8.95 | 7.69 | 6.05 | 4.52 |
| $Nb_2O_5$ | wt % | 18.01 | 18.01 | 17.69 | 17.39 | 17.09 | 22.17 | 26.06 | 29.71 |
| BaO | wt % | 0 | 0 | 2.79 | 5.48 | 8.08 | 0 | 0 | 0 |
| Measured properties | | | | | | | | | |
| $n_d$ | | 1.8827 | 1.8845 | 1.8856 | | 1.8846 | 1.891 | 1.8995 | 1.9059 |
| $d_{RT}$ | g/cm³ | 4.036 | 4.055 | 4.077 | 4.137 | 4.175 | 4.063 | 4.109 | 4.138 |
| $v_d$ | | 30.6 | 30.2 | 30.7 | | 31.1 | 30.8 | 30.0 | 29.6 |
| $n_{C\,(656.27)}$ | | 1.8744 | 1.8762 | 1.8773 | | 1.8764 | 1.8825 | 1.8908 | 1.8971 |
| $n_{F\,(486.13)}$ | | 1.9033 | 1.9054 | 1.9062 | | 1.9049 | 1.9115 | 1.9209 | 1.9277 |
| $T_i$ | | 0.44940 | 0.44940 | 0.44940 | 0.44937 | 0.44937 | 0.44939 | 0.44938 | 0.44942 |
| Devit test 1 | | A | A | | | | A | B | C |
| $n_d - (1.12 + 0.18 * d_{RT})$ | | 0.0362 | 0.0346 | 0.0317 | | 0.0131 | 0.0397 | 0.0399 | 0.0411 |
| $n_d - (2.23 - 0.71 * T_i)$ | | -0.0282 | -0.0264 | -0.0253 | | -0.0264 | -0.0199 | -0.0114 | -0.005 |
| Predicted properties | | | | | | | | | |
| $P_n$ [for $n_d$] | | 1.882 | 1.882 | 1.884 | 1.887 | 1.890 | 1.894 | 1.907 | 1.919 |
| $P_d$ [for $d_{RT}$] | g/cm³ | 4.038 | 4.038 | 4.084 | 4.130 | 4.176 | 4.058 | 4.079 | 4.100 |
| $P_n - (1.12 + 0.18 * P_d)$ | | 0.0348 | 0.0348 | 0.0293 | 0.0238 | 0.0183 | 0.0435 | 0.0522 | 0.0609 |
| $P_n - (2.23 - 0.71 * T_i)$ | | -0.0293 | -0.0293 | -0.0265 | -0.0237 | -0.0210 | -0.0169 | -0.0045 | 0.0080 |

| Exemplary Glass | | 9 | 10 | 11 | 12 | 13 | 14 | 15 | 16 |
|---|---|---|---|---|---|---|---|---|---|
| Composition—mol. % | | | | | | | | | |
| $B_2O_3$ | mol. % | 25.61 | 25.61 | 25.61 | 25.61 | 25.61 | 25.61 | 25.62 | 25.61 |
| CaO | mol. % | 24.21 | 24.21 | 24.21 | 24.22 | 24.21 | 24.21 | 24.20 | 24.21 |
| $SiO_2$ | mol. % | 13.73 | 13.73 | 13.73 | 13.73 | 13.73 | 13.73 | 13.73 | 13.73 |
| $La_2O_3$ | mol. % | 9.15 | 10.15 | 11.15 | 12.15 | 9.15 | 9.15 | 9.15 | 9.15 |
| $ZrO_2$ | mol. % | 7.23 | 7.23 | 7.23 | 7.23 | 7.23 | 7.23 | 7.23 | 7.23 |

TABLE 6-continued

Exemplary Glass Compositions and Properties

| | | 17 | 18 | 19 | 20 | 21 | 22 | 23 | 24 |
|---|---|---|---|---|---|---|---|---|---|
| TiO$_2$ | mol. % | 4.75 | 11.75 | 10.75 | 9.75 | 10.75 | 8.75 | 10.75 | 8.75 |
| Nb$_2$O$_5$ | mol. % | 15.32 | 7.32 | 7.32 | 7.32 | 7.32 | 7.32 | 7.32 | 7.32 |
| Yb$_2$O$_3$ | mol. % | 0 | 0 | 0 | 0 | 2.00 | 4.00 | 0 | 0 |
| Gd$_2$O$_3$ | mol. % | 0 | 0 | 0 | 0 | 0 | 0 | 2.00 | 4.00 |

Composition—wt %

| | | 17 | 18 | 19 | 20 | 21 | 22 | 23 | 24 |
|---|---|---|---|---|---|---|---|---|---|
| B$_2$O$_3$ | wt % | 14.51 | 16.14 | 15.79 | 15.45 | 15.60 | 14.79 | 15.69 | 14.94 |
| CaO | wt % | 11.05 | 12.29 | 12.02 | 11.77 | 11.88 | 11.26 | 11.94 | 11.38 |
| SiO$_2$ | wt % | 6.71 | 7.47 | 7.30 | 7.15 | 7.22 | 6.84 | 7.26 | 6.91 |
| La$_2$O$_3$ | wt % | 24.26 | 29.93 | 32.17 | 34.30 | 26.08 | 24.72 | 26.23 | 24.98 |
| ZrO$_2$ | wt % | 7.25 | 8.06 | 7.89 | 7.72 | 7.79 | 7.39 | 7.84 | 7.47 |
| TiO$_2$ | wt % | 3.09 | 8.50 | 7.60 | 6.75 | 7.51 | 5.80 | 7.55 | 5.86 |
| Nb$_2$O$_5$ | wt % | 33.14 | 17.61 | 17.23 | 16.86 | 17.02 | 16.14 | 17.12 | 16.31 |
| Yb$_2$O$_3$ | wt % | 0 | 0 | 0 | 0 | 6.90 | 13.07 | 0 | 0 |
| Gd$_2$O$_3$ | wt % | 0 | 2.00 | 4.00 | 0 | 0 | 0 | 6.38 | 12.15 |

Measured properties

| | | 17 | 18 | 19 | 20 | 21 | 22 | 23 | 24 |
|---|---|---|---|---|---|---|---|---|---|
| n$_d$ | | 1.9129 | 1.8844 | 1.8829 | 1.8833 | 1.8806 | 1.8758 | 1.8818 | 1.8772 |
| d$_{RT}$ | g/cm$^3$ | 4.160 | 4.096 | 4.149 | 4.205 | 4.221 | 4.381 | 4.182 | 4.335 |
| v$_d$ | | 29.4 | 31.0 | 31.8 | 32.0 | 31.8 | 33.1 | 32.0 | 34.2 |
| n$_{C\,(656.27)}$ | | 1.9040 | 1.8762 | 1.8749 | 1.8753 | 1.8725 | 1.8681 | 1.8738 | 1.8696 |
| n$_{F\,(486.13)}$ | | 1.9350 | 1.9047 | 1.9027 | 1.9029 | 1.9002 | 1.8945 | 1.9014 | 1.8952 |
| T$_i$ | | 0.44937 | 0.47680 | 0.50427 | 0.53167 | 0.47547 | 0.50474 | 0.50426 | 0.55906 |
| Devit test 1 | | D | | | A | | B | | B |
| n$_d$ − (1.12 + 0.18 * d$_{RT}$) | | 0.0441 | 0.0271 | 0.0161 | 0.0064 | 8.200E-04 | −0.0328 | 0.009 | −0.0231 |
| n$_d$ − (2.23 − 0.71 * T$_i$) | | 0.002 | −0.0071 | 0.0109 | 0.0308 | −0.0118 | 0.0042 | 0.0098 | 0.0441 |

Predicted properties

| | | 17 | 18 | 19 | 20 | 21 | 22 | 23 | 24 |
|---|---|---|---|---|---|---|---|---|---|
| P$_n$ [for n$_d$] | | 1.931 | 1.885 | 1.889 | 1.893 | 1.885 | 1.887 | 1.888 | 1.894 |
| P$_d$ [for d$_{RT}$] | g/cm$^3$ | 4.121 | 4.096 | 4.155 | 4.213 | 4.186 | 4.334 | 4.180 | 4.321 |
| P$_n$ − (1.12 + 0.18 * P$_d$) | | 0.0696 | 0.0280 | 0.0213 | 0.0145 | 0.0110 | −0.0128 | 0.0155 | −0.0038 |
| P$_n$ − (2.23 − 0.71 * T$_i$) | | 0.0203 | −0.0061 | 0.0171 | 0.0403 | −0.0080 | 0.0157 | 0.0158 | 0.0609 |

| Exemplary Glass | | 17 | 18 | 19 | 20 | 21 | 22 | 23 | 24 |
|---|---|---|---|---|---|---|---|---|---|

Composition—mol. %

| | | 17 | 18 | 19 | 20 | 21 | 22 | 23 | 24 |
|---|---|---|---|---|---|---|---|---|---|
| B$_2$O$_3$ | mol. % | 25.60 | 25.61 | 25.61 | 25.61 | 25.60 | 25.61 | 25.61 | 25.62 |
| CaO | mol. % | 24.21 | 22.21 | 20.21 | 18.21 | 16.21 | 24.21 | 24.21 | 24.21 |
| SiO$_2$ | mol. % | 13.73 | 13.73 | 13.73 | 13.73 | 13.73 | 13.73 | 13.73 | 13.73 |
| La$_2$O$_3$ | mol. % | 9.15 | 9.15 | 9.15 | 9.15 | 9.15 | 9.15 | 9.15 | 9.15 |
| ZrO$_2$ | mol. % | 9.23 | 7.23 | 7.23 | 7.23 | 7.23 | 7.23 | 7.23 | 7.23 |
| TiO$_2$ | mol. % | 10.75 | 12.75 | 12.75 | 12.75 | 12.75 | 11.75 | 9.75 | 11.75 |
| Nb$_2$O$_5$ | mol. % | 7.32 | 7.32 | 7.32 | 7.32 | 7.32 | 7.32 | 7.32 | 7.32 |
| Yb$_2$O$_3$ | mol. % | 0 | 0 | 0 | 0 | 0 | 1.00 | 0 | 0 |
| Gd$_2$O$_3$ | mol. % | 0 | 0 | 0 | 6.00 | 0 | 0 | 3.00 | 0 |
| SrO | mol. % | 0 | 2.00 | 4.00 | 0 | 8.00 | 0 | 0 | 1.00 |

Composition—wt %

| | | 17 | 18 | 19 | 20 | 21 | 22 | 23 | 24 |
|---|---|---|---|---|---|---|---|---|---|
| B$_2$O$_3$ | wt % | 16.37 | 16.36 | 16.22 | 16.08 | 15.94 | 16.04 | 15.18 | 16.09 |
| CaO | wt % | 12.47 | 11.43 | 10.31 | 9.21 | 8.13 | 12.21 | 11.56 | 12.25 |

TABLE 6-continued

Exemplary Glass Compositions and Properties

| | | 25 | 26 | 27 | 28 | 29 | 30 | 31 | 32 |
|---|---|---|---|---|---|---|---|---|---|
| $SiO_2$ | wt % | 7.58 | 7.57 | 7.51 | 7.44 | 7.38 | 7.42 | 7.02 | 7.44 |
| $La_2O_3$ | wt % | 27.38 | 27.36 | 27.12 | 26.89 | 26.66 | 26.82 | 25.38 | 26.89 |
| $ZrO_2$ | wt % | 10.45 | 8.18 | 8.11 | 8.04 | 7.97 | 8.02 | 7.59 | 8.04 |
| $TiO_2$ | wt % | 7.89 | 9.35 | 9.27 | 9.19 | 9.11 | 8.44 | 6.63 | 8.47 |
| $Nb_2O_5$ | wt % | 17.87 | 17.86 | 17.70 | 17.55 | 17.40 | 17.50 | 16.57 | 17.55 |
| $Yb_2O_3$ | wt % | 0 | 0 | 0 | 0 | 0 | 3.55 | 10.07 | 0 |
| $Gd_2O_3$ | wt % | 0 | 0 | 0 | 0 | 0 | 0 | 0 | 3.27 |
| SrO | wt % | 0 | 1.90 | 3.77 | 5.61 | 7.41 | 0 | 0 | 0 |

Measured properties

| | | 25 | 26 | 27 | 28 | 29 | 30 | 31 | 32 |
|---|---|---|---|---|---|---|---|---|---|
| $n_d$ | | 1.8795 | 1.8834 | 1.8847 | 1.8859 | 1.8859 | 1.8831 | 1.8747 | 1.8819 |
| $d_{RT}$ | g/cm$^3$ | 4.083 | 4.043 | 4.044 | 4.087 | 4.093 | 4.122 | 4.296 | 4.106 |
| $v_d$ | | 31.7 | 29.7 | 30.6 | 31.5 | 29.8 | 32.5 | 32.6 | 31.3 |
| $n_{C\,(656.27)}$ | | 1.8715 | 1.8748 | 1.8763 | 1.8853 | 1.9069 | 1.8749 | 1.8669 | 1.8738 |
| $n_{F\,(486.13)}$ | | 1.8992 | 1.9046 | 1.9052 | 1.9137 | 1.9377 | 1.9021 | 1.8938 | 1.9020 |
| $T_i$ | | 0.50432 | 0.44938 | 0.44939 | 0.44938 | 0.44938 | 0.46210 | 0.48966 | 0.47680 |
| Devit test 1 | | A | A | | | | A | C | A |
| $n_d - (1.12 + 0.18 * d_{RT})$ | | 0.0246 | 0.0357 | 0.0368 | 0.0382 | 0.0292 | 0.0211 | −0.0186 | 0.0228 |
| $n_d - (2.23 - 0.71 * T_i)$ | | 0.0076 | −0.0275 | −0.0262 | −0.017 | −0.025 | −0.0188 | −0.0076 | −0.0096 |

Predicted properties

| | | 25 | 26 | 27 | 28 | 29 | 30 | 31 | 32 |
|---|---|---|---|---|---|---|---|---|---|
| $P_n$ [for $n_d$] | | 1.878 | 1.881 | 1.881 | 1.881 | 1.881 | 1.883 | 1.886 | 1.885 |
| $P_d$ [for $d_{RT}$] | g/cm$^3$ | 4.068 | 4.061 | 4.084 | 4.106 | 4.129 | 4.112 | 4.260 | 4.109 |
| $P_n - (1.12 + 0.18 * P_d)$ | | 0.0258 | 0.0305 | 0.0261 | 0.0217 | 0.0173 | 0.0229 | −9.200E-04 | 0.0251 |
| $P_n - (2.23 - 0.71 * T_i)$ | | 0.0061 | −0.0295 | −0.0298 | −0.0301 | −0.0303 | −0.0189 | 0.0036 | −0.0068 |

Composition—mol. %

| Exemplary Glass | | 25 | 26 | 27 | 28 | 29 | 30 | 31 | 32 |
|---|---|---|---|---|---|---|---|---|---|
| $B_2O_3$ | mol. % | 25.61 | 23.73 | 25.65 | 9.99 | 21.00 | 19.48 | 20.84 | 19.43 |
| CaO | mol. % | 24.21 | 24.21 | 24.15 | 6.01 | 5.99 | 5.99 | 6.00 | 6.01 |
| $SiO_2$ | mol. % | 13.73 | 15.61 | 13.68 | 27.98 | 17.55 | 15.93 | 18.18 | 16.72 |
| $La_2O_3$ | mol. % | 9.15 | 9.15 | 9.17 | 9.99 | 9.86 | 10.24 | 10.68 | 10.87 |
| $ZrO_2$ | mol. % | 7.23 | 7.23 | 7.20 | 8.00 | 10.07 | 3.02 | 9.57 | 3.09 |
| $TiO_2$ | mol. % | 9.75 | 12.75 | 12.74 | 9.99 | 8.98 | 10.47 | 6.99 | 6.99 |
| $Nb_2O_5$ | mol. % | 7.32 | 7.32 | 7.33 | 9.99 | 9.47 | 10.51 | 10.66 | 12.99 |
| BaO | mol. % | 0 | 0 | 0 | 5.99 | 3.99 | 4.00 | 3.99 | 4.00 |
| $Gd_2O_3$ | mol. % | 3.00 | 0 | 0 | 0 | 0 | 0 | 0 | 0 |
| SrO | mol. % | 0 | 0 | 0 | 6.00 | 4.00 | 3.99 | 3.99 | 3.99 |
| $CeO_2$ | mol. % | 0 | 0 | 0.06 | 0.06 | 0.06 | 0.06 | 0.07 | 0.06 |
| $Fe_2O_3$ | mol. % | 0 | 0 | 0.01 | 0.01 | 0.01 | 0.01 | 0.01 | 0.01 |
| $Al_2O_3$ | mol. % | 0 | 0 | 0.01 | 0.01 | 0.01 | 0.01 | 0.01 | 0.01 |
| $Li_2O$ | mol. % | 0 | 0 | 0 | 1.98 | 4.00 | 3.98 | 4.01 | 4.00 |
| $Na_2O$ | mol. % | 0 | 0 | 0 | 1.99 | 3.00 | 3.01 | 3.00 | 2.99 |
| $K_2O$ | mol. % | 0 | 0 | 0 | 2.00 | 2.00 | 1.99 | 2.00 | 2.00 |
| $WO_3$ | mol. % | 0 | 0 | 0 | 0 | 0 | 7.31 | 0 | 6.83 |

Composition—wt %

| | | 25 | 26 | 27 | 28 | 29 | 30 | 31 | 32 |
|---|---|---|---|---|---|---|---|---|---|
| $B_2O_3$ | wt % | 15.30 | 15.32 | 16.51 | 5.64 | 12.11 | 10.26 | 11.64 | 9.84 |
| CaO | wt % | 11.65 | 12.59 | 12.52 | 2.73 | 2.78 | 2.54 | 2.70 | 2.45 |

TABLE 6-continued

Exemplary Glass Compositions and Properties

| | | 33 | 34 | 35 | 36 | 37 | 38 | 39 | 40 |
|---|---|---|---|---|---|---|---|---|---|
| SiO₂ | wt % | 7.08 | 8.70 | 7.60 | 13.63 | 8.73 | 7.24 | 8.76 | 7.31 |
| La₂O₃ | wt % | 25.59 | 27.64 | 27.62 | 26.39 | 26.61 | 25.25 | 27.92 | 25.77 |
| ZrO₂ | wt % | 7.65 | 8.26 | 8.20 | 8.00 | 10.28 | 2.82 | 9.46 | 2.77 |
| TiO₂ | wt % | 6.69 | 9.45 | 9.41 | 6.47 | 5.94 | 6.33 | 4.48 | 4.06 |
| Nb₂O₅ | wt % | 16.70 | 18.04 | 18.01 | 21.53 | 20.85 | 21.14 | 22.73 | 25.12 |
| BaO | wt % | 0 | 0 | 0 | 7.45 | 5.07 | 4.64 | 4.91 | 4.46 |
| Gd₂O₃ | wt % | 9.34 | 0 | 0 | 0 | 0 | 0 | 0 | 0 |
| SrO | wt % | 0 | 0 | 0 | 5.04 | 3.43 | 3.13 | 3.32 | 3.01 |
| CeO₂ | wt % | 0 | 0 | 0.0954 | 0.0837 | 0.0855 | 0.0781 | 0.0966 | 0.0751 |
| Fe₂O₃ | wt % | 0 | 0 | 0.0148 | 0.013 | 0.0132 | 0.0121 | 0.0128 | 0.0116 |
| Al₂O₃ | wt % | 0 | 0 | 0.0094 | 0.0083 | 0.0084 | 0.0077 | 0.0082 | 0.0074 |
| Li₂O | wt % | 0 | 0 | 0 | 0.48 | 0.99 | 0.90 | 0.96 | 0.87 |
| Na₂O | wt % | 0 | 0 | 0 | 1.00 | 1.54 | 1.41 | 1.49 | 1.35 |
| K₂O | wt % | 3.99 | 0 | 0 | 1.53 | 1.56 | 1.42 | 1.51 | 1.37 |
| WO₃ | wt % | 3.00 | 0 | 0 | 0 | 0 | 12.82 | 0 | 11.52 |

Measured properties

| | | 33 | 34 | 35 | 36 | 37 | 38 | 39 | 40 |
|---|---|---|---|---|---|---|---|---|---|
| $n_d$ | | 1.8832 | 1.8826 | 1.8828 | | | | | |
| $d_{RT}$ | g/cm³ | 4.250 | 4.135 | | | | 4.409 | 4.180 | 4.426 |
| $v_d$ | | 31.6 | 30.3 | | | | | | |
| $n_{C\,(656.27)}$ | | 1.8751 | 1.8743 | | | | | | |
| $n_{F\,(486.13)}$ | | 1.9031 | 1.9034 | | | | | | |
| $T_i$ | | 0.53170 | 0.44937 | 0.44913 | 0.47376 | 0.51922 | 0.38740 | 0.53432 | 0.41145 |
| Devit test 1 | | B | | OK | OK | OK | OK | OK | OK |
| Devit test 3 | | | | | | | | | |
| $n_d - (1.12 + 0.18 * d_{RT})$ | | −0.0018 | 0.0183 | | | | | | |
| $n_d - (2.23 - 0.71 * T_i)$ | | 0.0307 | −0.0283 | −0.0282 | | | | | |

Predicted properties

| | | 33 | 34 | 35 | 36 | 37 | 38 | 39 | 40 |
|---|---|---|---|---|---|---|---|---|---|
| $P_n$ [for $n_d$] | | 1.891 | 1.883 | 1.882 | 1.916 | 1.895 | 1.938 | 1.903 | 1.950 |
| $P_d$ [for $d_{RT}$] | g/cm³ | 4.251 | 4.045 | 4.039 | 4.350 | 4.229 | 4.497 | 4.277 | 4.532 |
| $P_n - (1.12 + 0.18 * P_d)$ | | 0.0058 | 0.0347 | 0.0348 | 0.0128 | 0.0134 | 0.0081 | 0.0130 | 0.0141 |
| $P_n - (2.23 - 0.71 * T_i)$ | | 0.0384 | −0.0281 | −0.0293 | 0.0222 | 0.0334 | −0.0176 | 0.0521 | 0.0119 |

Composition—mol. %

| Exemplary Glass | | 33 | 34 | 35 | 36 | 37 | 38 | 39 | 40 |
|---|---|---|---|---|---|---|---|---|---|
| B₂O₃ | mol. % | 29.98 | 25.98 | 25.98 | 25.97 | 25.98 | 25.98 | 25.97 | 25.98 |
| CaO | mol. % | 5.99 | 24.98 | 24.98 | 24.98 | 24.97 | 24.97 | 24.98 | 24.98 |
| SiO₂ | mol. % | 5.53 | 11.24 | 10.47 | 11.45 | 10.71 | 10.04 | 11.67 | 10.89 |
| La₂O₃ | mol. % | 10.02 | 9.99 | 12.08 | 10.00 | 12.05 | 13.76 | 9.99 | 12.13 |
| ZrO₂ | mol. % | 8.49 | 7.00 | 6.99 | 6.99 | 6.99 | 6.99 | 7.00 | 6.99 |
| TiO₂ | mol. % | 11.54 | 11.51 | 11.42 | 10.28 | 10.03 | 10.16 | 8.95 | 8.78 |
| Nb₂O₅ | mol. % | 7.09 | 9.23 | 7.99 | 10.25 | 9.18 | 7.99 | 11.36 | 10.16 |
| BaO | mol. % | 4.00 | 0 | 0 | 0 | 0 | 0 | 0 | 0 |
| SrO | mol. % | 4.00 | 0 | 0 | 0 | 0 | 0 | 0 | 0 |
| CeO₂ | mol. % | 0.06 | 0.06 | 0.07 | 0.06 | 0.07 | 0.08 | 0.06 | 0.07 |
| Fe₂O₃ | mol. % | 0.01 | 0.01 | 0.01 | 0.01 | 0.01 | 0.01 | 0.01 | 0.01 |
| Li₂O | mol. % | 3.99 | 0 | 0 | 0 | 0 | 0 | 0 | 0 |
| Na₂O | mol. % | 3.00 | 0 | 0 | 0 | 0 | 0 | 0 | 0 |

TABLE 6-continued

Exemplary Glass Compositions and Properties

| | | 41 | 42 | 43 | 44 | 45 | 46 | 47 | 48 |
|---|---|---|---|---|---|---|---|---|---|
| $K_2O$ | mol. % | 2.00 | 0 | 0 | 0 | 0 | 0 | 0 | 0 |
| $WO_3$ | w1% | 4.30 | 0 | 0 | 0 | 0 | 0 | 0 | 0 |
| $Ta_2O_5$ | mol. % | 0 | 0.01 | 0.01 | 0.01 | 0.01 | 0.01 | 0.01 | 0.01 |

Composition—wt %

| | | 41 | 42 | 43 | 44 | 45 | 46 | 47 | 48 |
|---|---|---|---|---|---|---|---|---|---|
| $B_2O_3$ | wt % | 16.83 | 15.88 | 15.47 | 15.62 | 15.20 | 14.93 | 15.35 | 14.95 |
| CaO | wt % | 2.71 | 12.30 | 11.98 | 12.10 | 11.77 | 11.56 | 11.89 | 11.58 |
| $SiO_2$ | wt % | 2.68 | 5.93 | 5.38 | 5.94 | 5.41 | 4.98 | 5.95 | 5.41 |
| $La_2O_3$ | wt % | 26.32 | 28.57 | 33.67 | 28.14 | 32.99 | 37.01 | 27.63 | 32.67 |
| $ZrO_2$ | wt % | 8.44 | 7.57 | 7.37 | 7.44 | 7.24 | 7.11 | 7.32 | 7.12 |
| $TiO_2$ | wt % | 7.43 | 8.07 | 7.80 | 7.09 | 6.73 | 6.70 | 6.07 | 5.80 |
| $Nb_2O_5$ | wt % | 15.19 | 21.54 | 18.17 | 23.53 | 20.51 | 17.54 | 25.64 | 22.32 |
| BaO | wt % | 4.95 | 0 | 0 | 0 | 0 | 0 | 0 | 0 |
| StO | wt % | 3.34 | 0 | 0 | 0 | 0 | 0 | 0 | 0 |
| $CeO_2$ | wt % | 0.0832 | 0.0906 | 0.10 | 0.0891 | 0.10 | 0.11 | 0.0876 | 0.0895 |
| $Fe_2O_3$ | wt % | 0.0129 | 0.014 | 0.0137 | 0.0138 | 0.0134 | 0.0132 | 0.0136 | 0.0132 |
| $Li_2O$ | wt % | 0.96 | 0 | 0 | 0 | 0 | 0 | 0 | 0 |
| $Na_2O$ | wt % | 1.50 | 0 | 0 | 0 | 0 | 0 | 0 | 0 |
| $K_2O$ | wt % | 1.52 | 0 | 0 | 0 | 0 | 0 | 0 | 0 |
| $WO_3$ | wt % | 8.04 | 0 | 0 | 0 | 0 | 0 | 0 | 0 |
| $Ta_2O_5$ | wt % | 0 | 0.0388 | 0.0378 | 0.0382 | 0.0371 | 0.0365 | 0.0375 | 0.0365 |

Measured properties

| | | 41 | 42 | 43 | 44 | 45 | 46 | 47 | 48 |
|---|---|---|---|---|---|---|---|---|---|
| $d_{RT}$ | $g/cm^3$ | 4.224 | | | | | | | |
| $T_i$ | | 0.49827 | 0.45037 | 0.49567 | 0.45283 | 0.49782 | 0.53336 | 0.45546 | 0.50234 |
| Devit test 2 | | OK | OK | OK | OK | OK | OK | OK | OK |
| Devit test 3 | | | OK | OK | OK | OK | OK | OK | OK |

Predicted properties

| | | 41 | 42 | 43 | 44 | 45 | 46 | 47 | 48 |
|---|---|---|---|---|---|---|---|---|---|
| $P_n$ [for $n_d$] | | 1.898 | 1.908 | 1.914 | 1.913 | 1.919 | 1.923 | 1.919 | 1.924 |
| $P_d$ [for $d_{RT}$] | $g/cm^3$ | 4.365 | 4.128 | 4.246 | 4.136 | 4.254 | 4.349 | 4.145 | 4.266 |
| $P_n - (1.12 + 0.18 * P_d)$ | | -0.0074 | 0.0453 | 0.0295 | 0.0487 | 0.0337 | 0.0201 | 0.0525 | 0.0365 |
| $P_n - (2.23 - 0.71 * T_i)$ | | 0.0222 | -0.0020 | 0.0356 | 0.0048 | 0.0428 | 0.0717 | 0.0120 | 0.0512 |

Exemplary Glass

Composition—mol. %

| | | 41 | 42 | 43 | 44 | 45 | 46 | 47 | 48 |
|---|---|---|---|---|---|---|---|---|---|
| $B_2O_3$ | mol. % | 25.98 | 25.96 | 25.98 | 25.98 | 25.97 | 25.97 | 25.98 | 25.98 |
| CaO | mol. % | 24.97 | 24.98 | 24.98 | 24.97 | 24.96 | 24.96 | 24.97 | 24.97 |
| $SiO_2$ | mol. % | 10.31 | 9.61 | 12.00 | 11.09 | 10.44 | 9.80 | 11.00 | 10.42 |
| $La_2O_3$ | mol. % | 13.68 | 15.51 | 9.99 | 12.39 | 14.14 | 15.83 | 9.99 | 9.99 |
| $ZrO_2$ | mol. % | 7.00 | 6.99 | 7.00 | 7.00 | 6.99 | 6.99 | 8.67 | 7.00 |
| $TiO_2$ | mol. % | 8.76 | 8.85 | 7.00 | 6.99 | 7.00 | 7.00 | 11.31 | 11.27 |
| $Nb_2O_5$ | mol. % | 9.21 | 7.99 | 12.99 | 11.48 | 10.39 | 9.34 | 8.00 | 7.99 |
| $CeO_2$ | mol. % | 0.08 | 0.09 | 0.06 | 0.07 | 0.08 | 0.10 | 0.06 | 0.06 |
| $Fe_2O_3$ | mol. % | 0.01 | 0.01 | 0.01 | 0.01 | 0.01 | 0.01 | 0.01 | 0.01 |
| $WO_3$ | mol. % | 0 | 0 | 0 | 0 | 0 | 0 | 0 | 2.30 |
| $Ta_2O_5$ | mol. % | 0.01 | 0.01 | 0.01 | 0.01 | 0.01 | 0.01 | 0.01 | 0.01 |

TABLE 6-continued

Exemplary Glass Compositions and Properties

Composition—wt %

| | | 49 | 50 | 51 | 52 | 53 | 54 | 55 | 56 |
|---|---|---|---|---|---|---|---|---|---|
| B₂O₃ | wt % | 14.69 | 14.40 | 14.98 | 14.58 | 14.30 | 14.04 | 16.09 | 15.69 |
| CaO | wt % | 11.37 | 11.16 | 11.60 | 11.29 | 11.07 | 10.87 | 12.46 | 12.15 |
| SiO₂ | wt % | 5.03 | 4.60 | 5.97 | 5.37 | 4.96 | 4.57 | 5.88 | 5.43 |
| La₂O₃ | wt % | 36.19 | 40.26 | 26.95 | 32.55 | 36.43 | 40.04 | 28.96 | 28.24 |
| ZrO₂ | wt % | 7.00 | 6.86 | 7.14 | 6.95 | 6.81 | 6.69 | 9.51 | 7.48 |
| TiO₂ | wt % | 5.68 | 5.63 | 4.63 | 4.50 | 4.42 | 4.34 | 8.04 | 7.81 |
| Nb₂O₅ | wt % | 19.88 | 16.92 | 28.59 | 24.60 | 21.84 | 19.27 | 18.92 | 18.43 |
| CeO₂ | wt % | 0.11 | 0.12 | 0.0855 | 0.0971 | 0.11 | 0.13 | 0.0918 | 0.0895 |
| Fe₂O₃ | wt % | 0.013 | 0.0127 | 0.0132 | 0.0129 | 0.0126 | 0.0124 | 0.0142 | 0.0139 |
| WO₃ | wt % | 0 | 0 | 0 | 0 | 0 | 0 | 0 | 4.63 |
| Ta₂O₅ | wt % | 0.0359 | 0.0352 | 0.0366 | 0.0356 | 0.035 | 0.0343 | 0.0393 | 0.0383 |

Measured properties

| $T_i$ | | 0.53514 | 0.57197 | 0.45946 | 0.51216 | 0.54861 | 0.58286 | 0.49157 | 0.46863 |
|---|---|---|---|---|---|---|---|---|---|
| Devit test 2 | | OK | OK | OK | OK | OK | OK | OK | OK |
| Devit test 3 | | OK | OK | OK | OK | OK | OK | OK | OK |

Predicted properties

| $P_n$ [for $n_d$] | | 1.928 | 1.933 | 1.926 | 1.932 | 1.937 | 1.941 | 1.899 | 1.906 |
|---|---|---|---|---|---|---|---|---|---|
| $P_d$ [for $d_{RT}$] | g/cm³ | 4.354 | 4.457 | 4.158 | 4.293 | 4.392 | 4.487 | 4.143 | 4.218 |
| $P_n - (1.12 + 0.18 * P_d)$ | | 0.0246 | 0.0103 | 0.0580 | 0.0395 | 0.0261 | 0.0131 | 0.0336 | 0.0268 |
| $P_n - (2.23 - 0.71 * T_i)$ | | 0.0782 | 0.1086 | 0.0226 | 0.0659 | 0.0960 | 0.1245 | 0.0183 | 0.0089 |

| Exemplary Glass | | 49 | 50 | 51 | 52 | 53 | 54 | 55 | 56 |
|---|---|---|---|---|---|---|---|---|---|

Composition—mol. %

| B₂O₃ | mol. % | 25.98 | 25.98 | 25.98 | 25.98 | 25.98 | 25.98 | 25.97 | 25.97 |
|---|---|---|---|---|---|---|---|---|---|
| CaO | mol. % | 24.97 | 24.97 | 24.98 | 24.98 | 30.04 | 25.95 | 17.24 | 24.98 |
| SiO₂ | mol. % | 10.46 | 9.99 | 10.04 | 9.56 | 7.95 | 6.29 | 9.73 | 9.61 |
| La₂O₃ | mol. % | 9.99 | 9.99 | 10.00 | 9.99 | 9.99 | 9.99 | 13.80 | 15.51 |
| ZrO₂ | mol. % | 8.56 | 7.00 | 8.55 | 6.99 | 6.99 | 6.99 | 6.99 | 6.99 |
| TiO₂ | mol. % | 9.81 | 9.97 | 8.59 | 8.69 | 10.97 | 9.00 | 8.89 | 8.83 |
| Nb₂O₅ | mol. % | 7.99 | 7.99 | 8.00 | 7.99 | 7.99 | 7.99 | 7.99 | 7.99 |
| CeO₂ | mol. % | 0.06 | 0.06 | 0.06 | 0.06 | 0.06 | 0.06 | 0.08 | 0.09 |
| Fe₂O₃ | mol. % | 0.01 | 0.01 | 0.01 | 0.01 | 0.01 | 0.01 | 0.01 | 0.01 |
| WO₃ | mol. % | 2.16 | 4.02 | 3.79 | 5.74 | | | | |
| Ta₂O₅ | mol. % | 0.01 | 0.01 | 0.01 | 0.01 | 0.01 | 0.01 | 0.01 | 0.01 |
| ZnO | mol. % | 0 | 0 | 0 | 0 | 0 | 7.73 | 9.29 | 0 |

Composition—wt %

| B₂O₃ | wt % | 15.63 | 15.33 | 15.29 | 14.99 | 16.29 | 16.08 | 14.67 | 14.40 |
|---|---|---|---|---|---|---|---|---|---|
| CaO | wt % | 12.10 | 11.87 | 11.84 | 11.61 | 15.17 | 12.94 | 7.84 | 11.16 |
| SiO₂ | wt % | 5.43 | 5.09 | 5.10 | 4.76 | 4.30 | 3.36 | 4.74 | 4.60 |
| La₂O₃ | wt % | 28.13 | 27.59 | 27.54 | 26.98 | 29.31 | 28.94 | 36.47 | 40.26 |
| ZrO₂ | wt % | 9.12 | 7.31 | 8.90 | 7.14 | 7.76 | 7.66 | 6.99 | 6.86 |
| TiO₂ | wt % | 6.77 | 6.75 | 5.80 | 5.75 | 7.89 | 6.39 | 5.76 | 5.62 |
| Nb₂O₅ | wt % | 18.35 | 18.01 | 17.97 | 17.60 | 19.13 | 18.88 | 17.23 | 16.92 |
| CeO₂ | wt % | 0.0892 | 0.0875 | 0.0872 | 0.0855 | 0.0929 | 0.0918 | 0.11 | 0.12 |

TABLE 6-continued

Exemplary Glass Compositions and Properties

Measured properties

| | | 57 | 58 | 59 | 60 | 61 | 62 | 63 | 64 |
|---|---|---|---|---|---|---|---|---|---|
| $Fe_2O_3$ | wt % | 0.0138 | 0.0135 | 0.0135 | 0.0132 | 0.0144 | 0.0142 | 0.013 | 0.0127 |
| $WO_3$ | wt % | 4.33 | 7.90 | 7.43 | 11.03 | 0 | 0 | 0 | 0 |
| $Ta_2O_5$ | wt % | 0.0382 | 0.0375 | 0.0374 | 0.0366 | 0.0398 | 0.0393 | 0.0359 | 0.0352 |
| ZnO | wt % | 0 | 0 | 0 | 0 | 0 | 5.59 | 6.13 | 0 |
| $d_{RT}$ | g/cm³ | | | | | | | 4.590 | 4.625 |
| $T_i$ | | 0.51026 | 0.48612 | 0.52793 | 0.50451 | 0.47254 | 0.49993 | 0.55197 | 0.57219 |
| Devit test 2 | | OK | OK | OK | OK | OK | OK | OK | OK |
| Devit test 3 | | | | OK | | OK | OK | OK | OK |

Predicted properties

| | | 57 | 58 | 59 | 60 | 61 | 62 | 63 | 64 |
|---|---|---|---|---|---|---|---|---|---|
| $P_n$ [for $n_d$] | | 1.903 | 1.909 | 1.906 | 1.912 | 1.904 | 1.903 | 1.922 | 1.933 |
| $P_d$ [for $d_{RT}$] | g/cm³ | 4.236 | 4.294 | 4.307 | 4.368 | 4.156 | 4.289 | 4.491 | 4.457 |
| $P_n - (1.12 + 0.18 * P_d)$ | | 0.0206 | 0.0161 | 0.0106 | 0.0054 | 0.0357 | 0.0109 | -0.0069 | 0.0102 |
| $P_n - (2.23 - 0.71 * T_i)$ | | 0.0354 | 0.0241 | 0.0507 | 0.0399 | 0.0091 | 0.0278 | 0.0833 | 0.1088 |

Composition—mol. %

| Exemplary Glass | | 57 | 58 | 59 | 60 | 61 | 62 | 63 | 64 |
|---|---|---|---|---|---|---|---|---|---|
| $B_2O_3$ | mol. % | 25.98 | 25.97 | 25.98 | 25.97 | 25.97 | 25.97 | 25.98 | 19.99 |
| CaO | mol. % | 16.92 | 24.98 | 17.28 | 24.98 | 17.47 | 24.98 | 34.97 | 6.00 |
| $SiO_2$ | mol. % | 9.74 | 9.61 | 8.02 | 9.61 | 8.08 | 8.99 | 5.00 | 15.76 |
| $La_2O_3$ | mol. % | 13.73 | 15.51 | 15.51 | 15.51 | 15.50 | 9.99 | 10.00 | 9.72 |
| $ZrO_2$ | mol. % | 7.00 | 6.99 | 6.99 | 6.99 | 7.00 | 7.00 | 6.99 | 8.41 |
| $TiO_2$ | mol. % | 8.88 | 8.83 | 8.88 | 8.83 | 10.38 | 7.00 | 8.99 | 11.92 |
| $Nb_2O_5$ | mol. % | 8.00 | 7.99 | 7.99 | 7.99 | 7.99 | 8.00 | 8.00 | 7.11 |
| BaO | mol. % | 0 | 0 | 0 | 0 | 0 | 0 | 0 | 4.00 |
| SrO | mol. % | 0 | 0 | 0 | 0 | 0 | 0 | 0 | 4.00 |
| $CeO_2$ | mol. % | 0.08 | 0.09 | 0 | 0.09 | 0.09 | 0.06 | 0.06 | 0.06 |
| $Fe_2O_3$ | mol. % | 0.01 | 0.01 | 0 | 0.01 | 0.01 | 0.01 | 0.01 | 0.01 |
| $Al_2O_3$ | mol. % | 0 | 0 | 0 | 0 | 0 | 0 | 0 | 0.01 |
| $Li_2O$ | mol. % | 0 | 0 | 0 | 0 | 0 | 0 | 0 | 4.00 |
| $Na_2O$ | mol. % | 0 | 0 | 0 | 0 | 0 | 0 | 0 | 2.99 |
| $K_2O$ | mol. % | 0 | 0 | 0 | 0 | 0 | 7.99 | 0 | 1.99 |
| $WO_3$ | mol. % | 0.01 | 0 | 0.01 | 0.01 | 0.01 | 0.01 | 0.01 | 4.04 |
| $Ta_2O_5$ | mol. % | 0 | 0 | 0 | 0 | 0 | 0 | 0 | 0 |
| ZnO | mol. % | 9.66 | 0 | 9.25 | 0 | 7.50 | 0 | 0 | 0 |

Composition—wt %

| | | 57 | 58 | 59 | 60 | 61 | 62 | 63 | 64 |
|---|---|---|---|---|---|---|---|---|---|
| $B_2O_3$ | wt % | 14.68 | 14.40 | 14.15 | 14.40 | 14.16 | 14.56 | 16.37 | 11.42 |
| CaO | wt % | 7.70 | 11.16 | 7.58 | 11.16 | 7.67 | 11.28 | 17.75 | 2.76 |
| $SiO_2$ | wt % | 4.75 | 4.60 | 3.77 | 4.60 | 3.80 | 4.35 | 2.72 | 7.77 |
| $La_2O_3$ | wt % | 36.31 | 40.26 | 39.54 | 40.26 | 39.54 | 26.20 | 29.48 | 25.98 |
| $ZrO_2$ | wt % | 7.00 | 6.86 | 6.74 | 6.86 | 6.75 | 6.94 | 7.79 | 8.50 |
| $TiO_2$ | wt % | 5.76 | 5.62 | 5.55 | 5.62 | 6.49 | 4.50 | 7.79 | 7.81 |
| $Nb_2O_5$ | wt % | 17.26 | 16.92 | 16.62 | 16.92 | 16.63 | 17.12 | 19.24 | 15.50 |
| BaO | wt % | 0 | 0 | 0 | 0 | 0 | 0 | 0 | 5.03 |
| SrO | wt % | 0 | 0 | 0 | 0 | 0 | 0 | 0 | 3.40 |
| $CeO_2$ | wt % | 0.11 | 0.12 | 0.12 | 0.12 | 0.12 | 0.0831 | 0.0934 | 0.0847 |

TABLE 6-continued

Exemplary Glass Compositions and Properties

| | | 65 | 66 | 67 | 68 | 69 |
|---|---|---|---|---|---|---|
| $Fe_2O_3$ | wt % | 0.013 | 0.0127 | 0.0127 | 0.0125 | 0.0129 | 0.0145 | 0.0131 |
| $Al_2O_3$ | wt % | 0 | 0 | 0 | 0 | 0 | 0 | 0.0084 |
| $Li_2O$ | wt % | 0 | 0 | 0 | 0 | 0 | 0 | 0.98 |
| $Na_2O$ | wt % | 0 | 0 | 0 | 0 | 0 | 0 | 1.52 |
| $K_2O$ | wt % | 0 | 0 | 0 | 0 | 0 | 0 | 1.54 |
| $WO_3$ | wt % | 0 | 0 | 0 | 0 | 14.91 | 0 | 7.68 |
| $Ta_2O_5$ | wt % | 0.0359 | 0.0352 | 0.0352 | 0.0352 | 0.0356 | 0.04 | 0 |
| ZnO | wt % | 6.38 | 0 | 5.89 | 4.78 | 0 | 0 | 0 |

Measured properties

| | | | | | | |
|---|---|---|---|---|---|---|
| $d_{RT}$ | g/cm³ | 0.55123 | 0.57219 | 0.57150 | 0.55056 | 0.53119 | 0.50004 | 4.331 |
| $T_i$ | | OK | OK | OK | OK | OK | | 0.48787 |
| Devit test 2 | | OK | OK | OK | OK | | | OK |
| Devit test 3 | | | | | | | | |

Predicted properties

| | | | | | | |
|---|---|---|---|---|---|---|
| $P_n$ [for $n_d$] | g/cm³ | 1.921 | 1.933 | 1.940 | 1.933 | 1.916 | 1.905 | 1.902 |
| $P_d$ [for $d_{RT}$] | | 4.492 | 4.457 | 4.610 | 4.457 | 4.467 | 4.192 | 4.373 |
| $P_n - (1.12 + 0.18 * P_d)$ | | -0.0075 | 0.0102 | -0.0102 | 0.0102 | -0.0085 | 0.0304 | -0.0049 |
| $P_n - (2.23 - 0.71 * T_i)$ | | 0.0824 | 0.088 | 0.1155 | 0.1088 | 0.0626 | 0.0300 | 0.0187 |

Exemplary Glass | | 65 | 66 | 67 | 68 | 69 |

Composition—mol. %

| | | 65 | 66 | 67 | 68 | 69 |
|---|---|---|---|---|---|---|
| $B_2O_3$ | mol. % | 25.98 | 25.92 | 25.93 | 26.00 | 25.80 |
| CaO | mol. % | 27.89 | 25.47 | 23.92 | 22.11 | 26.18 |
| $SiO_2$ | mol. % | 9.24 | 10.04 | 10.39 | 10.22 | 10.87 |
| $La_2O_3$ | mol. % | 9.99 | 14.48 | 13.79 | 14.05 | 12.96 |
| $ZrO_2$ | mol. % | 6.99 | 6.91 | 6.91 | 7.00 | 6.77 |
| $TiO_2$ | mol. % | 11.83 | 8.34 | 7.87 | 8.04 | 7.35 |
| $Nb_2O_5$ | mol. % | 7.99 | 8.84 | 9.67 | 9.69 | 10.09 |
| $CeO_2$ | mol. % | 0.06 | 0 | 0 | 0 | 0 |
| $Fe_2O_3$ | mol. % | 0.01 | 0 | 0 | 0 | 0 |
| $Li_2O$ | mol. % | 0 | 0 | 0.51 | 0.96 | 0 |
| $Na_2O$ | mol. % | 0 | 0 | 0.51 | 0.96 | 0 |
| $K_2O$ | mol. % | 0 | 0 | 0.51 | 0.96 | 0 |
| $Ta_2O_5$ | mol. % | 0.01 | 0 | 0 | 0 | 0 |

Composition—wt %

| | | 65 | 66 | 67 | 68 | 69 |
|---|---|---|---|---|---|---|
| $B_2O_3$ | wt % | 16.25 | 14.53 | 14.55 | 14.48 | 14.67 |
| CaO | wt % | 14.05 | 11.50 | 10.81 | 9.92 | 11.99 |
| $SiO_2$ | wt % | 4.99 | 4.86 | 5.03 | 4.91 | 5.34 |
| $La_2O_3$ | wt % | 29.25 | 37.99 | 36.20 | 36.63 | 34.48 |
| $ZrO_2$ | wt % | 7.74 | 6.85 | 6.86 | 6.90 | 6.81 |
| $TiO_2$ | wt % | 8.49 | 5.36 | 5.07 | 5.14 | 4.80 |
| $Nb_2O_5$ | wt % | 19.08 | 18.91 | 20.72 | 20.60 | 21.91 |
| $CeO_2$ | wt % | 0.0927 | 0 | 0 | 0 | 0 |
| $Fe_2O_3$ | wt % | 0.0144 | 0 | 0 | 0 | 0 |
| $Li_2O$ | wt % | 0 | 0 | 0.12 | 0.23 | 0 |
| $Na_2O$ | wt % | 0 | 0 | 0.25 | 0.48 | 0 |

TABLE 6-continued

Exemplary Glass Compositions and Properties

| | | | | | | |
|---|---|---|---|---|---|---|
| $K_2O$ | wt % | 0 | 0 | 0.38 | 0.73 | 0 |
| $Ta_2O_5$ | wt % | 0.0397 | 0 | 0 | 0 | 0 |

Measured properties

| | | | | | | |
|---|---|---|---|---|---|---|
| $T_i$ | | 0.46144 | 0.55460 | 0.54121 | 0.54293 | 0.53069 |
| Devit test 2 | | OK | OK | OK | OK | OK |
| Devit test 3 | | OK | | | | |

Predicted properties

| | | | | | | |
|---|---|---|---|---|---|---|
| $P_n$ [for $n_d$] | | 1.903 | 1.930 | 1.927 | 1.928 | 1.925 |
| $P_d$ [for $d_{RT}$] | g/cm³ | 4.140 | 4.399 | 4.347 | 4.351 | 4.313 |
| $P_n - (1.12 + 0.18 * P_d)$ | | 0.0380 | 0.0180 | 0.0245 | 0.0244 | 0.0283 |
| $P_n - (2.23 - 0.71 * T_i)$ | | 7.300E-04 | 0.0936 | 0.0813 | 0.0831 | 0.0714 |

Table 7 below lists the glass compositions and properties for Comparative Glasses 1-53.

TABLE 7

Comparative Glass Compositions and Properties

| Comparative Examples | | C1 | C2 | C3 | C4 | C5 | C6 | C7 | C8 |
|---|---|---|---|---|---|---|---|---|---|
| Reference | | [8] | [10] | [10] | [14] | [14] | [15] | [15] | [17] |
| Composition—mol. % | | | | | | | | | |
| $La_2O_3$ | mol. % | 7.59 | 7.59 | 8.15 | 3.14 | 2.84 | 14.55 | 15.90 | 14.09 |
| $B_2O_3$ | mol. % | 26.95 | 26.95 | 30.76 | 24.75 | 23.82 | 26.20 | 32.12 | 24.01 |
| $SiO_2$ | mol. % | 17.03 | 17.03 | 17.11 | 23.83 | 23.10 | 12.13 | 7.84 | 13.98 |
| CaO | mol. % | 16.73 | 16.73 | 10.69 | 17.39 | 24.75 | 4.33 | 8.40 | 4.23 |
| $Nb_2O_5$ | mol. % | 2.57 | 2.57 | 2.26 | 3.97 | 4.35 | 5.49 | 4.43 | 2.55 |
| $TiO_2$ | mol. % | 7.47 | 7.47 | 7.51 | 3.84 | 1.93 | 12.18 | 13.26 | 19.94 |
| $Li_2O$ | mol. % | 18.55 | 18.55 | 20.07 | 15.80 | 14.19 | 0 | 0 | 0 |
| $ZrO_2$ | mol. % | 3.11 | 3.11 | 2.09 | 3.96 | 5.01 | 5.92 | 4.78 | 7.25 |
| $Na_2O$ | mol. % | 0 | 0 | 1.38 | 0 | 0 | 3.92 | 0 | 0 |
| ZnO | mol. % | 0 | 0 | 0 | 2.90 | 0 | 5.98 | 1.45 | 4.22 |
| $Gd_2O_3$ | mol. % | 0 | 0 | 0 | 0.43 | 0 | 0 | 0 | 0 |
| BaO | mol. % | 0 | 0 | 0 | 0 | 0 | 3.17 | 0 | 9.73 |
| MgO | mol. % | 0 | 0 | 0 | 0 | 0 | 6.02 | 11.69 | 0 |
| $Sb_2O_3$ | mol. % | 0 | 0 | 0 | 0 | 0 | 0.13 | 0.12 | 0 |
| Composition—wt % | | | | | | | | | |
| $La_2O_3$ | wt % | 29.00 | 29.00 | 31.00 | 13.00 | 12.00 | 38.88 | 43.87 | 37.20 |
| $B_2O_3$ | wt % | 22.00 | 22.00 | 25.00 | 21.90 | 21.50 | 14.96 | 18.94 | 13.55 |
| $SiO_2$ | wt % | 12.00 | 12.00 | 12.00 | 18.20 | 18.00 | 5.98 | 3.99 | 6.81 |
| CaO | wt % | 11.00 | 11.00 | 7.00 | 12.40 | 18.00 | 1.99 | 3.99 | 1.92 |
| $Nb_2O_5$ | wt % | 8.00 | 8.00 | 7.00 | 13.40 | 15.00 | 11.96 | 9.97 | 5.50 |
| $TiO_2$ | wt % | 7.00 | 7.00 | 7.00 | 3.90 | 2.00 | 7.98 | 8.97 | 12.91 |
| $Li_2O$ | wt % | 6.50 | 6.50 | 7.00 | 6.00 | 5.50 | 0 | 0 | 0 |
| $ZrO_2$ | wt % | 4.50 | 4.50 | 3.00 | 6.20 | 8.00 | 5.98 | 4.99 | 7.24 |
| $Na_2O$ | wt % | 0 | 0 | 1.00 | 0 | 0 | 1.99 | 0 | 0 |
| ZnO | wt % | 0 | 0 | 0 | 3.00 | 0 | 3.99 | 1.00 | 2.78 |
| $Gd_2O_3$ | wt % | 0 | 0 | 0 | 2.00 | 0 | 0 | 0 | 0 |
| BaO | wt % | 0 | 0 | 0 | 0 | 0 | 3.99 | 0 | 12.09 |
| MgO | wt % | 0 | 0 | 0 | 0 | 0 | 1.99 | 3.99 | 0 |
| $Sb_2O_3$ | wt % | 0 | 0 | 0 | 0 | 0 | 0.30 | 0.30 | 0 |
| Measured properties | | | | | | | | | |
| $n_d$ | | 1.7623 | 1.7623 | 1.7515 | 1.732 | 1.7485 | 1.8772 | 1.8774 | 1.9038 |
| $d_{RT}$ | g/cm$^3$ | 3.580 | 3.580 | 3.570 | | | 4.380 | 4.310 | 4.540 |
| $v_d$ | | 37.9 | 37.9 | 38.4 | 40.8 | 39.2 | 32.8 | 33.6 | 31.3 |
| $n_{C\,(656.27)}$ | | 1.7564 | 1.7564 | 1.7457 | 1.7267 | 1.7428 | | | 1.8954 |
| $n_{F\,(486.13)}$ | | 1.7765 | 1.7765 | 1.7653 | 1.7446 | 1.7620 | 2.0957 | 2.0946 | 1.9244 |
| $T_i$ | | 0.51603 | 0.51603 | 0.51184 | 0.49102 | 0.55536 | 0.53682 | 0.53887 | 0.48680 |
| $n_d - (1.12 + 0.18 * d_{RT})$ | | −0.0021 | −0.0021 | −0.0111 | | | −0.0312 | −0.0184 | −0.0334 |
| $n_d - (2.23 - 0.71 * T_i)$ | | −0.1013 | −0.1013 | −0.1151 | −0.1494 | −0.0872 | 0.0283 | 0.0301 | 0.0194 |
| Predicted properties | | | | | | | | | |
| $P_n$ [for $n_d$] | | 1.762 | 1.762 | 1.742 | 1.723 | 1.723 | 1.891 | 1.878 | 1.919 |
| $P_d$ [for $d_{RT}$] | g/cm$^3$ | 3.670 | 3.670 | 3.603 | 3.482 | 3.445 | 4.448 | 4.339 | 4.582 |
| $P_n - (1.12 + 0.18 * P_d)$ | | −0.0187 | −0.0187 | −0.0262 | −0.0235 | −0.0173 | −0.0302 | −0.0224 | −0.0259 |
| $P_n - (2.23 - 0.71 * T_i)$ | | −0.1017 | −0.1017 | −0.1242 | −0.1582 | −0.1129 | 0.0416 | 0.0312 | 0.0346 |

| Comparative Examples | | C9 | C10 | C11 | C12 | C13 | C14 | C15 | C16 |
|---|---|---|---|---|---|---|---|---|---|
| Reference | | [17] | [17] | [17] | [17] | [17] | [17] | [16] | [5] |
| Composition—mol. % | | | | | | | | | |
| $La_2O_3$ | mol. % | 14.09 | 14.09 | 14.09 | 14.09 | 14.09 | 14.09 | 7.59 | 13.95 |
| $B_2O_3$ | mol. % | 23.97 | 23.99 | 23.98 | 23.99 | 23.99 | 23.98 | 26.95 | 25.37 |
| $SiO_2$ | mol. % | 14.00 | 13.99 | 14.00 | 14.00 | 14.00 | 13.99 | 17.03 | 10.50 |
| CaO | mol. % | 7.04 | 0 | 2.13 | 2.12 | 3.58 | 3.56 | 16.73 | 0 |
| $Nb_2O_5$ | mol. % | 2.56 | 2.56 | 2.56 | 2.56 | 2.55 | 2.55 | 2.57 | 2.85 |
| $TiO_2$ | mol. % | 19.96 | 19.95 | 19.95 | 19.95 | 19.95 | 19.95 | 7.47 | 20.22 |
| $Li_2O$ | mol. % | 0 | 0 | 0 | 0 | 0 | 0 | 18.55 | 0 |
| $ZrO_2$ | mol. % | 7.26 | 7.26 | 7.26 | 7.26 | 7.26 | 7.26 | 3.11 | 8.19 |
| ZnO | mol. % | 4.21 | 4.22 | 4.22 | 4.21 | 4.22 | 4.22 | 0 | 3.11 |
| BaO | mol. % | 6.92 | 6.92 | 9.73 | 8.33 | 8.29 | 6.92 | 0 | 12.35 |
| MgO | mol. % | 0 | 0 | 0 | 0 | 0 | 0 | 0 | 3.14 |
| $Sb_2O_3$ | mol. % | 0 | 0 | 0 | 0 | 0 | 0 | 0 | 0.0868 |
| SrO | mol. % | 0 | 7.03 | 2.09 | 3.51 | 2.07 | 3.47 | 0 | 0.24 |
| Composition—wt % | | | | | | | | | |
| $La_2O_3$ | wt % | 38.05 | 37.02 | 36.91 | 37.11 | 37.33 | 37.54 | 29.00 | 35.93 |
| $B_2O_3$ | wt % | 13.83 | 13.47 | 13.42 | 13.50 | 13.58 | 13.65 | 22.00 | 13.97 |
| $SiO_2$ | wt % | 6.97 | 6.78 | 6.76 | 6.80 | 6.84 | 6.87 | 12.00 | 4.99 |

TABLE 7-continued

Comparative Glass Compositions and Properties

| | | | | | | | | | |
|---|---|---|---|---|---|---|---|---|---|
| CaO | wt % | 3.27 | 0 | 0.96 | 0.96 | 1.63 | 1.63 | 11.00 | 0 |
| Nb$_2$O$_5$ | wt % | 5.63 | 5.48 | 5.46 | 5.49 | 5.52 | 5.55 | 8.00 | 5.99 |
| TiO$_2$ | wt % | 13.21 | 12.85 | 12.81 | 12.88 | 12.96 | 13.03 | 7.00 | 12.77 |
| Li$_2$O | wt % | 0 | 0 | 0 | 0 | 0 | 0 | 6.50 | 0 |
| ZrO$_2$ | wt % | 7.41 | 7.21 | 7.19 | 7.23 | 7.27 | 7.31 | 4.50 | 7.98 |
| ZnO | wt % | 2.84 | 2.77 | 2.76 | 2.77 | 2.79 | 2.81 | 0 | 2.00 |
| BaO | wt % | 8.79 | 8.55 | 11.99 | 10.32 | 10.34 | 8.67 | 0 | 14.97 |
| MgO | wt % | 0 | 0 | 0 | 0 | 0 | 0 | 0 | 1.00 |
| Sb$_2$O$_3$ | wt % | 0 | 0 | 0 | 0 | 0 | 0 | 0 | 0.20 |
| SrO | wt % | 0 | 5.87 | 1.74 | 2.94 | 1.74 | 2.94 | 0 | 0.20 |
| Measured properties | | | | | | | | | |
| n$_d$ | | 1.9049 | 1.9027 | 1.9033 | 1.9033 | 1.9038 | 1.9038 | 1.7616 | 1.9163 |
| d$_{RT}$ | g/cm$^3$ | 4.490 | 4.570 | 4.570 | 4.560 | 4.540 | 4.530 | 39.6 | 4.640 |
| v$_d$ | | 31.2 | 31.3 | 31.3 | 31.3 | 31.3 | 31.3 | | 30.6 |
| n$_{C\,(656.27)}$ | | 1.8964 | 1.8943 | 1.8949 | 1.8949 | 1.8954 | 1.8954 | 1.7559 | |
| n$_{F\,(486.13)}$ | | 1.9255 | 1.9232 | 1.9238 | 1.9238 | 1.9244 | 1.9243 | 1.7752 | 2.1383 |
| T$_i$ | | 0.48675 | 0.48678 | 0.48685 | 0.48685 | 0.48677 | 0.48681 | 0.51603 | 0.48967 |
| n$_d$ − (1.12 + 0.18 * d$_{RT}$) | | −0.0233 | −0.0399 | −0.0393 | −0.0375 | −0.0334 | −0.0316 | | −0.0389 |
| n$_d$ − (2.23 − 0.71 * T$_i$) | | 0.0205 | 0.0183 | 0.019 | 0.019 | 0.0194 | 0.0194 | −0.102 | 0.034 |
| Predicted properties | | | | | | | | | |
| P$_n$ [for n$_d$] | | 1.915 | 1.914 | 1.919 | 1.917 | 1.917 | 1.915 | 1.762 | 1.928 |
| P$_d$ [for d$_{RT}$] | g/cm$^3$ | 4.519 | 4.598 | 4.607 | 4.591 | 4.574 | 4.558 | 3.670 | 4.655 |
| P$_n$ − (1.12 + 0.18 * P$_d$) | | −0.0181 | −0.0335 | −0.0304 | −0.0297 | −0.0264 | −0.0257 | −0.0187 | −0.0295 |
| P$_n$ − (2.23 − 0.71 * T$_i$) | | 0.0309 | 0.0298 | 0.0345 | 0.0323 | 0.0324 | 0.0304 | −0.1017 | 0.0460 |

| Comparative Examples | | C17 | C18 | C19 | C20 | C21 | C22 | C23 | C24 |
|---|---|---|---|---|---|---|---|---|---|
| Reference | | [19] | [3] | [18] | [18] | [18] | [1] | [9] | [2] |
| Composition—mol. % | | | | | | | | | |
| La$_2$O$_3$ | mol. % | 20.61 | 7.59 | 20.61 | 14.08 | 14.08 | 13.95 | 8.99 | 7.86 |
| B$_2$O$_3$ | mol. % | 21.64 | 26.95 | 21.66 | 24.03 | 23.98 | 25.37 | 21.98 | 27.19 |
| SiO$_2$ | mol. % | 15.77 | 17.03 | 15.77 | 13.98 | 14.00 | 10.50 | 18.45 | 12.68 |
| CaO | mol. % | 0 | 16.73 | 0 | 4.23 | 2.12 | 0 | 13.02 | 25.47 |
| Nb$_2$O$_5$ | mol. % | 3.82 | 2.57 | 3.82 | 2.55 | 2.55 | 2.85 | 2.52 | 8.56 |
| TiO$_2$ | mol. % | 21.20 | 7.47 | 21.20 | 19.93 | 19.94 | 20.22 | 6.50 | 11.25 |
| Li$_2$O | mol. % | 0 | 18.55 | 0 | 0 | 0 | 0 | 20.02 | 0 |
| ZrO$_2$ | mol. % | 7.25 | 3.11 | 7.25 | 7.24 | 7.26 | 8.19 | 3.00 | 6.44 |
| Na$_2$O | mol. % | 0 | 0 | 0 | 0 | 0 | 0 | 2.98 | 0 |
| ZnO | mol. % | 5.18 | 0 | 5.18 | 4.21 | 4.21 | 3.11 | 0 | 0 |
| Gd$_2$O$_3$ | mol. % | 4.52 | 0 | 4.52 | 0 | 0 | 0 | 0 | 0 |
| BaO | mol. % | 0 | 0 | 0 | 9.75 | 8.34 | 12.35 | 0 | 0 |
| MgO | mol. % | 0 | 0 | 0 | 0 | 0 | 3.14 | 1.53 | 0 |
| Sb$_2$O$_3$ | mol. % | 0 | 0 | 0 | 0 | 0 | 0.0868 | 0 | 0 |
| SrO | mol. % | 0 | 0 | 0 | 0 | 3.52 | 0.24 | 0 | 0 |
| K$_2$O | mol. % | 0 | 0 | 0 | 0 | 0 | 0 | 1.03 | 0 |
| CaF$_2$ | mol. % | 0 | 0 | 0 | 0 | 0 | 0 | 0 | 0.56 |
| Composition—wt % | | | | | | | | | |
| La$_2$O$_3$ | wt % | 45.28 | 29.00 | 45.27 | 37.18 | 37.10 | 35.93 | 33.30 | 24.03 |
| B$_2$O$_3$ | wt % | 10.16 | 22.00 | 10.17 | 13.56 | 13.50 | 13.97 | 17.40 | 17.77 |
| SiO$_2$ | wt % | 6.39 | 12.00 | 6.39 | 6.81 | 6.80 | 4.99 | 12.60 | 7.15 |
| CaO | wt % | 0 | 11.00 | 0 | 1.92 | 0.96 | 0 | 8.30 | 13.41 |
| Nb$_2$O$_5$ | wt % | 6.85 | 8.00 | 6.84 | 5.50 | 5.48 | 5.99 | 7.60 | 21.35 |
| TiO$_2$ | wt % | 11.42 | 7.00 | 11.42 | 12.90 | 12.88 | 12.77 | 5.90 | 8.44 |
| Li$_2$O | wt % | 0 | 6.50 | 0 | 0 | 0 | 0 | 6.80 | 0 |
| ZrO$_2$ | wt % | 6.02 | 4.50 | 6.02 | 7.23 | 7.23 | 7.98 | 4.20 | 7.45 |
| Na$_2$O | wt % | 0 | 0 | 0 | 0 | 0 | 0 | 2.10 | 0 |
| ZnO | wt % | 2.84 | 0 | 2.84 | 2.78 | 2.77 | 2.00 | 0 | 0 |
| Gd$_2$O$_3$ | wt % | 11.05 | 0 | 11.04 | 0 | 0 | 0 | 0 | 0 |
| BaO | wt % | 0 | 0 | 0 | 12.11 | 10.34 | 14.97 | 0 | 0 |
| MgO | wt % | 0 | 0 | 0 | 0 | 0 | 1.00 | 0.70 | 0 |
| Sb$_2$O$_3$ | wt % | 0 | 0 | 0 | 0 | 0 | 0.20 | 0 | 0 |
| SrO | wt % | 0 | 0 | 0 | 0 | 2.95 | 0.20 | 0 | 0 |
| K$_2$O | wt % | 0 | 0 | 0 | 0 | 0 | 0 | 1.10 | 0 |
| CaF$_2$ | wt % | 0 | 0 | 0 | 0 | 0 | 0 | 0 | 0.41 |
| Measured properties | | | | | | | | | |
| n$_d$ | | 1.9631 | 1.762 | 1.9631 | 1.9038 | 1.9033 | 1.9163 | 1.750 | 1.8819 |
| d$_{RT}$ | g/cm$^3$ | 5.040 | 3.580 | 5.040 | 4.540 | 4.560 | 4.640 | 3.530 | 3.980 |
| v$_d$ | | 30.8 | 37.9 | 30.8 | 31.3 | 31.3 | 30.6 | | 30.6 |
| n$_{C\,(656.27)}$ | | 1.9540 | 1.7561 | 1.9540 | 1.8954 | 1.8949 | 1.9076 | | 1.8735 |
| n$_{F\,(486.13)}$ | | 1.9854 | 1.7762 | 1.9854 | 1.9244 | 1.9238 | 1.9376 | | 1.9024 |
| P$_{g-F}$ | | 0.59514 | | 0.59514 | | | 0.59690 | | |
| ΔP$_{g-F}$ | | 0.00478 | | 0.00478 | | | 0.00431 | | |
| T$_i$ | | 0.56404 | 0.51603 | 0.56397 | 0.48676 | 0.48685 | 0.48967 | 0.57087 | 0.41913 |

TABLE 7-continued

Comparative Glass Compositions and Properties

| | | | | | | | | | |
|---|---|---|---|---|---|---|---|---|---|
| $n_d - (1.12 + 0.18 * d_{RT})$ | | −0.0641 | −0.0024 | −0.0641 | −0.0334 | −0.0375 | −0.0389 | −0.0054 | 0.0455 |
| $n_d - (2.23 - 0.71 * T_i)$ | | 0.1336 | −0.1016 | 0.1336 | 0.0194 | 0.019 | 0.034 | −0.0747 | −0.0505 |

Predicted properties

| | | | | | | | | | |
|---|---|---|---|---|---|---|---|---|---|
| $P_n$ [for $n_d$] | | 2.008 | 1.762 | 2.008 | 1.919 | 1.917 | 1.928 | 1.769 | 1.875 |
| $P_d$ [for $d_{RT}$] | g/cm³ | 5.098 | 3.670 | 5.097 | 4.582 | 4.591 | 4.655 | 3.762 | 3.956 |
| $P_n - (1.12 + 0.18 * P_d)$ | | −0.0296 | −0.0187 | −0.0296 | −0.0260 | −0.0298 | −0.0295 | −0.0282 | 0.0428 |
| $P_n - (2.23 - 0.71 * T_i)$ | | 0.1786 | −0.1017 | 0.1783 | 0.0343 | 0.0322 | 0.0460 | −0.0557 | −0.0575 |

| Comparative Examples | | C25 | C26 | C27 | C28 | C29 | C30 | C31 | C32 |
|---|---|---|---|---|---|---|---|---|---|
| Reference | | [2] | [2] | [2] | [2] | [11] | [11] | [11] | [11] |

Composition—mol. %

| | | | | | | | | | |
|---|---|---|---|---|---|---|---|---|---|
| La₂O₃ | mol. % | 6.74 | 8.42 | 8.14 | 11.08 | 7.66 | 7.89 | 6.89 | 7.12 |
| B₂O₃ | mol. % | 23.31 | 26.00 | 26.16 | 24.69 | 26.70 | 25.57 | 26.63 | 26.76 |
| SiO₂ | mol. % | 14.84 | 11.72 | 11.17 | 14.64 | 10.07 | 12.77 | 10.76 | 10.81 |
| CaO | mol. % | 25.79 | 27.45 | 26.07 | 23.41 | 28.72 | 26.62 | 28.53 | 28.66 |
| Nb₂O₅ | mol. % | 9.28 | 8.89 | 8.38 | 6.27 | 9.56 | 8.50 | 9.33 | 9.49 |
| TiO₂ | mol. % | 11.66 | 10.59 | 12.13 | 13.76 | 10.01 | 11.48 | 9.95 | 9.99 |
| ZrO₂ | mol. % | 7.00 | 6.15 | 6.55 | 4.46 | 7.28 | 7.18 | 7.91 | 7.17 |
| Na₂O | mol. % | 0 | 0.0314 | 0 | 0 | 0 | 0 | 0 | 0 |
| ZnO | mol. % | 0 | 0 | 0 | 0.23 | 0 | 0 | 0 | 0 |
| BaO | mol. % | 0 | 0.0707 | 0 | 0 | 0 | 0 | 0 | 0 |
| CaF₂ | mol. % | 1.39 | 0 | 1.42 | 1.45 | 0 | 0 | 0 | 0 |
| Al₂O₃ | mol. % | 0 | 0.21 | 0 | 0 | 0 | 0 | 0 | 0 |
| P₂O₅ | mol. % | 0 | 0.11 | 0 | 0 | 0 | 0 | 0 | 0 |
| KF | mol. % | 0 | 0.22 | 0 | 0 | 0 | 0 | 0 | 0 |
| NaF | mol. % | 0 | 0.11 | 0 | 0 | 0 | 0 | 0 | 0 |

Composition—wt %

| | | | | | | | | | |
|---|---|---|---|---|---|---|---|---|---|
| La₂O₃ | wt % | 20.86 | 25.32 | 24.74 | 32.92 | 23.10 | 24.08 | 21.20 | 21.80 |
| B₂O₃ | wt % | 15.42 | 16.71 | 16.99 | 15.67 | 17.20 | 16.68 | 17.50 | 17.50 |
| SiO₂ | wt % | 8.47 | 6.50 | 6.26 | 8.02 | 5.60 | 7.19 | 6.10 | 6.10 |
| CaO | wt % | 13.74 | 14.21 | 13.64 | 11.97 | 14.90 | 13.99 | 15.10 | 15.10 |
| Nb₂O₅ | wt % | 23.44 | 21.82 | 20.77 | 15.20 | 23.50 | 21.18 | 23.40 | 23.70 |
| TiO₂ | wt % | 8.85 | 7.81 | 9.04 | 10.02 | 7.40 | 8.59 | 7.50 | 7.50 |
| ZrO₂ | wt % | 8.19 | 7.00 | 7.53 | 5.01 | 8.30 | 8.29 | 9.20 | 8.30 |
| Na₂O | wt % | 0 | 0.0179 | 0 | 0 | 0 | 0 | 0 | 0 |
| ZnO | w1% | 0 | 0 | 0 | 0.17 | 0 | 0 | 0 | 0 |
| BaO | wt % | 0 | 0.10 | 0 | 0 | 0 | 0 | 0 | 0 |
| CaF₂ | wt % | 1.03 | 0 | 1.03 | 1.03 | 0 | 0 | 0 | 0 |
| Al₂O₃ | wt % | 0 | 0.20 | 0 | 0 | 0 | 0 | 0 | 0 |
| P₂O₅ | wt % | 0 | 0.15 | 0 | 0 | 0 | 0 | 0 | 0 |
| KF | wt % | 0 | 0.12 | 0 | 0 | 0 | 0 | 0 | 0 |
| NaF | wt % | 0 | 0.0435 | 0 | 0 | 0 | 0 | 0 | 0 |

Measured properties

| | | | | | | | | | |
|---|---|---|---|---|---|---|---|---|---|
| $n_d$ | | 1.8878 | 1.8814 | 1.8868 | 1.8836 | 1.889 | 1.885 | 1.884 | 1.884 |
| $d_{RT}$ | g/cm³ | 3.950 | 4.000 | 3.990 | 4.100 | 4.010 | 4.000 | 3.960 | 3.970 |
| $v_d$ | | 30.0 | 31.0 | 30.5 | 32.0 | 30.5 | 30.6 | 30.5 | 30.6 |
| $n_{C (656.27)}$ | | 1.8792 | 1.8731 | 1.8784 | 1.8756 | 1.8805 | 1.8766 | 1.8756 | 1.8756 |
| $n_{F (486.13)}$ | | 1.9089 | 1.9016 | 1.9075 | 1.9032 | 1.9097 | 1.9056 | 1.9046 | 1.9045 |
| $T_i$ | | 0.39607 | 0.42789 | 0.41746 | 0.43691 | 0.43299 | 0.42990 | 0.43441 | 0.42313 |
| $n_d - (1.12 + 0.18 * d_{RT})$ | | 0.0568 | 0.0414 | 0.0486 | 0.0256 | 0.0472 | 0.045 | 0.0512 | 0.0494 |
| $n_d - (2.23 - 0.71 * T_i)$ | | −0.061 | −0.0448 | −0.0469 | −0.0362 | −0.0336 | −0.0398 | −0.0376 | −0.0456 |

Predicted properties

| | | | | | | | | | |
|---|---|---|---|---|---|---|---|---|---|
| $P_n$ [for $n_d$] | | 1.885 | 1.885 | 1.888 | 1.886 | 1.889 | 1.882 | 1.880 | 1.882 |
| $P_d$ [for $d_{RT}$] | g/cm³ | 3.950 | 4.011 | 4.014 | 4.118 | 4.002 | 3.988 | 3.958 | 3.959 |
| $P_n - (1.12 + 0.18 * P_d)$ | | 0.0542 | 0.0430 | 0.0458 | 0.0252 | 0.0490 | 0.0440 | 0.0481 | 0.0493 |
| $P_n - (2.23 - 0.71 * T_i)$ | | −0.0636 | −0.0411 | −0.0453 | −0.0333 | −0.0332 | −0.0428 | −0.0411 | −0.0477 |

| Comparative Examples | | C33 | C34 | C35 | C36 | C37 | C38 | C39 | C40 |
|---|---|---|---|---|---|---|---|---|---|
| Reference | | [11] | [11] | [11] | [11] | [11] | [12] | [12] | [12] |

Composition—mol. %

| | | | | | | | | | |
|---|---|---|---|---|---|---|---|---|---|
| La₂O₃ | mol. % | 7.51 | 7.95 | 7.56 | 7.84 | 7.99 | 9.12 | 9.69 | 9.47 |
| B₂O₃ | mol. % | 28.00 | 25.06 | 27.46 | 29.24 | 29.76 | 26.15 | 25.81 | 25.88 |
| SiO₂ | mol. % | 10.82 | 12.82 | 10.97 | 11.48 | 11.69 | 13.13 | 13.11 | 13.15 |
| CaO | mol. % | 26.06 | 25.57 | 24.85 | 17.14 | 17.45 | 24.08 | 24.06 | 24.12 |
| Nb₂O₅ | mol. % | 9.45 | 8.58 | 9.51 | 9.87 | 10.05 | 7.32 | 6.48 | 6.88 |
| TiO₂ | mol. % | 10.17 | 11.52 | 10.14 | 10.62 | 10.81 | 12.99 | 13.65 | 13.01 |
| Li₂O | mol. % | 0 | 0 | 1.45 | 0 | 0 | 0 | 0 | 0 |
| ZrO₂ | mol. % | 8.00 | 7.12 | 8.07 | 8.35 | 8.50 | 7.19 | 7.18 | 7.47 |
| Na₂O | mol. % | 0 | 1.38 | 0 | 0 | 0 | 0 | 0 | 0 |
| BaO | mol. % | 0 | 0 | 0 | 0 | 3.75 | 0 | 0 | 0 |

TABLE 7-continued

Comparative Glass Compositions and Properties

| | | | | | | | | | |
|---|---|---|---|---|---|---|---|---|---|
| SrO | mol. % | 0 | 0 | 0 | 5.46 | 0 | 0 | 0 | 0 |
| As$_2$O$_3$ | mol. % | 0 | 0 | 0 | 0 | 0 | 0.0273 | 0.0273 | 0.0274 |
| Composition—wt % | | | | | | | | | |
| La$_2$O$_3$ | wt % | 22.62 | 24.20 | 22.80 | 22.60 | 22.60 | 27.50 | 29.25 | 28.50 |
| B$_2$O$_3$ | wt % | 18.02 | 16.30 | 17.70 | 18.00 | 18.00 | 16.85 | 16.65 | 16.65 |
| SiO$_2$ | wt % | 6.01 | 7.20 | 6.10 | 6.10 | 6.10 | 7.30 | 7.30 | 7.30 |
| CaO | w1% | 13.51 | 13.40 | 12.90 | 8.50 | 8.50 | 12.50 | 12.50 | 12.50 |
| Nb$_2$O$_5$ | wt % | 23.22 | 21.30 | 23.40 | 23.20 | 23.20 | 18.00 | 15.95 | 16.90 |
| TiO$_2$ | wt % | 7.51 | 8.60 | 7.50 | 7.50 | 7.50 | 9.60 | 10.10 | 9.60 |
| Li$_2$O | wt % | 0 | 0 | 0.40 | 0 | 0 | 0 | 0 | 0 |
| ZrO$_2$ | wt % | 9.11 | 8.20 | 9.20 | 9.10 | 9.10 | 8.20 | 8.20 | 8.50 |
| Na$_2$O | wt % | 0 | 0.80 | 0 | 0 | 0 | 0 | 0 | 0 |
| BaO | wt % | 0 | 0 | 0 | 0 | 5.00 | 0 | 0 | 0 |
| SrO | wt % | 0 | 0 | 0 | 5.00 | 0 | 0 | 0 | 0 |
| As$_2$O$_3$ | wt % | 0 | 0 | 0 | 0 | 0 | 0.05 | 0.05 | 0.05 |
| Measured properties | | | | | | | | | |
| n$_d$ | | 1.883 | 1.881 | 1.885 | 1.883 | 1.886 | 1.884 | 1.885 | 1.885 |
| d$_{RT}$ | g/cm$^3$ | 3.990 | 3.980 | 3.980 | 4.040 | 4.040 | 4.030 | 4.060 | 4.050 |
| v$_d$ | | 30.6 | 30.4 | 30.1 | 29.9 | 29.6 | 30.8 | 31.3 | 31.3 |
| n$_{C (656.27)}$ | | 1.8746 | 1.8726 | 1.8765 | 1.8744 | 1.8773 | 1.8757 | 1.8768 | 1.8768 |
| n$_{F (486.13)}$ | | 1.9035 | 1.9016 | 1.9059 | 1.9040 | 1.9073 | 1.9044 | 1.9051 | 1.9051 |
| T$_i$ | | 0.44150 | 0.42853 | 0.44292 | 0.44150 | 0.44150 | 0.44548 | 0.45606 | 0.45987 |
| n$_d$ − (1.12 + 0.18 * d$_{RT}$) | | 0.0448 | 0.0446 | 0.0486 | 0.0358 | 0.0388 | 0.0386 | 0.0342 | 0.036 |
| n$_d$ − (2.23 − 0.71 * T$_i$) | | −0.0336 | −0.0447 | −0.0305 | −0.0335 | −0.0305 | −0.0297 | −0.0212 | −0.0185 |
| Predicted properties | | | | | | | | | |
| P$_n$ [for n$_d$] | | 1.882 | 1.882 | 1.884 | 1.884 | 1.892 | 1.882 | 1.882 | 1.882 |
| P$_d$ [for d$_{RT}$] | g/cm$^3$ | 3.973 | 3.989 | 3.976 | 4.036 | 4.061 | 4.034 | 4.064 | 4.058 |
| P$_n$ − (1.12 + 0.18 * P$_d$) | | 0.0471 | 0.0437 | 0.0479 | 0.0378 | 0.0405 | 0.0359 | 0.0302 | 0.0314 |
| P$_n$ − (2.23 − 0.71 * T$_i$) | | −0.0343 | −0.0439 | −0.0319 | −0.0323 | −0.0250 | −0.0317 | −0.0244 | −0.0216 |

| Comparative Examples | | C41 | C42 | C43 | C44 | C45 | C46 | C47 | C48 |
|---|---|---|---|---|---|---|---|---|---|
| Reference | | [12] | [12] | [12] | [12] | [13] | [13] | [13] | [4] |
| Composition—mol. % | | | | | | | | | |
| La$_2$O$_3$ | mol. % | 9.14 | 9.82 | 9.84 | 7.85 | 8.42 | 6.89 | 7.85 | 7.90 |
| B$_2$O$_3$ | mol. % | 26.66 | 26.38 | 28.02 | 25.49 | 26.00 | 26.63 | 25.49 | 25.46 |
| SiO$_2$ | mol. % | 13.15 | 13.40 | 13.43 | 12.95 | 11.72 | 10.76 | 12.95 | 12.79 |
| CaO | mol. % | 23.16 | 23.60 | 20.69 | 26.61 | 27.45 | 28.53 | 26.61 | 26.65 |
| Nb$_2$O$_5$ | mol. % | 7.21 | 7.55 | 7.36 | 8.50 | 8.89 | 9.33 | 8.50 | 8.52 |
| TiO$_2$ | mol. % | 13.01 | 11.88 | 13.28 | 11.48 | 10.59 | 9.95 | 11.48 | 11.49 |
| ZrO$_2$ | mol. % | 7.64 | 7.34 | 7.36 | 7.09 | 6.15 | 7.91 | 7.09 | 7.19 |
| Na$_2$O | mol. % | 0 | 0 | 0 | 0 | 0.0314 | 0 | 0 | 0 |
| BaO | mol. % | 0 | 0 | 0 | 0 | 0.0707 | 0 | 0 | 0 |
| Al$_2$O$_3$ | mol. % | 0 | 0 | 0 | 0 | 0.21 | 0 | 0 | 0 |
| P$_2$O$_5$ | mol. % | 0 | 0 | 0 | 0 | 0.11 | 0 | 0 | 0 |
| KF | mol. % | 0 | 0 | 0 | 0 | 0.22 | 0 | 0 | 0 |
| NaF | mol. % | 0 | 0 | 0 | 0 | 0.11 | 0 | 0 | 0 |
| As$_2$O$_3$ | mol. % | 0.0274 | 0.0279 | 0.0279 | 0.0269 | 0 | 0 | 0.0269 | 0 |
| Composition—wt % | | | | | | | | | |
| La$_2$O$_3$ | wt % | 27.50 | 29.00 | 29.00 | 24.00 | 25.32 | 21.20 | 24.00 | 24.10 |
| B$_2$O$_3$ | wt % | 17.15 | 16.65 | 17.65 | 16.65 | 16.71 | 17.50 | 16.65 | 16.60 |
| SiO$_2$ | wt % | 7.30 | 7.30 | 7.30 | 7.30 | 6.50 | 6.10 | 7.30 | 7.20 |
| CaO | wt % | 12.00 | 12.00 | 10.50 | 14.00 | 14.21 | 15.10 | 14.00 | 14.00 |
| Nb$_2$O$_5$ | wt % | 17.70 | 18.20 | 17.70 | 21.20 | 21.82 | 23.40 | 21.20 | 21.20 |
| TiO$_2$ | wt % | 9.60 | 8.60 | 9.60 | 8.60 | 7.81 | 7.50 | 8.60 | 8.60 |
| ZrO$_2$ | wt % | 8.70 | 8.20 | 8.20 | 8.20 | 7.00 | 9.20 | 8.20 | 8.30 |
| Na$_2$O | wt % | 0 | 0 | 0 | 0 | 0.0179 | 0 | 0 | 0 |
| BaO | wt % | 0 | 0 | 0 | 0 | 0.10 | 0 | 0 | 0 |
| Al$_2$O$_3$ | wt % | 0 | 0 | 0 | 0 | 0.20 | 0 | 0 | 0 |
| P$_2$O$_5$ | wt % | 0 | 0 | 0 | 0 | 0.15 | 0 | 0 | 0 |
| KF | wt % | 0 | 0 | 0 | 0 | 0.12 | 0 | 0 | 0 |
| NaF | wt % | 0 | 0 | 0 | 0 | 0.0435 | 0 | 0 | 0 |
| As$_2$O$_3$ | wt % | 0.05 | 0.05 | 0.05 | 0.05 | 0 | 0 | 0.05 | 0 |
| Measured properties | | | | | | | | | |
| n$_d$ | | 1.884 | 1.883 | 1.884 | 1.883 | 1.881 | 1.884 | 1.883 | 1.885 |
| d$_{RT}$ | g/cm$^3$ | 4.030 | 4.070 | 4.050 | 3.980 | 4.000 | 3.960 | 3.980 | 4.000 |
| v$_d$ | | 31.0 | 31.3 | 30.8 | 30.4 | 31.0 | 30.5 | 30.4 | 30.6 |
| n$_{C (656.27)}$ | | 1.8757 | 1.8748 | 1.8757 | 1.8746 | 1.8727 | 1.8756 | 1.8746 | 1.8766 |
| n$_{F (486.13)}$ | | 1.9043 | 1.9030 | 1.9044 | 1.9037 | 1.9012 | 1.9046 | 1.9037 | 1.9056 |
| T$_i$ | | 0.45354 | 0.46898 | 0.45441 | 0.42795 | 0.42789 | 0.43441 | 0.42795 | 0.42990 |
| n$_d$ − (1.12 + 0.18 * d$_{RT}$) | | 0.0386 | 0.0304 | 0.035 | 0.0466 | 0.041 | 0.0512 | 0.0466 | 0.045 |
| n$_d$ − (2.23 − 0.71 * T$_i$) | | −0.024 | −0.014 | −0.0234 | −0.0432 | −0.0452 | −0.0376 | −0.0432 | −0.0398 |

TABLE 7-continued

Comparative Glass Compositions and Properties

Predicted properties

| | | | | | | | | | |
|---|---|---|---|---|---|---|---|---|---|
| $P_n$ [for $n_d$] | | 1.880 | 1.884 | 1.882 | 1.881 | 1.885 | 1.880 | 1.881 | 1.883 |
| $P_d$ [for $d_{RT}$] | g/cm³ | 4.032 | 4.073 | 4.045 | 3.984 | 4.011 | 3.958 | 3.984 | 3.991 |
| $P_n - (1.12 + 0.18 * P_d)$ | | 0.0344 | 0.0310 | 0.0336 | 0.0440 | 0.0430 | 0.0481 | 0.0440 | 0.0442 |
| $P_n - (2.23 - 0.71 * T_i)$ | | −0.0278 | −0.0130 | −0.0257 | −0.0449 | −0.0411 | −0.0411 | −0.0449 | −0.0422 |

| Comparative Examples | | C49 | C50 | C51 | C52 | C53 |
|---|---|---|---|---|---|---|
| Reference | | [4] | [7] | [7] | [7] | [6] |
| Composition—mol. % | | | | | | |
| La₂O₃ | mol. % | 6.75 | 10.13 | 10.76 | 10.35 | 9.38 |
| B₂O₃ | mol. % | 23.25 | 20.11 | 20.14 | 20.76 | 9.44 |
| SiO₂ | mol. % | 14.87 | 16.64 | 16.67 | 22.45 | 36.48 |
| CaO | mol. % | 26.35 | 28.53 | 28.57 | 25.77 | 0 |
| Nb₂O₅ | mol. % | 9.26 | 3.01 | 2.26 | 1.09 | 4.12 |
| TiO₂ | mol. % | 11.71 | 17.53 | 17.55 | 15.68 | 13.72 |
| Li₂O | mol. % | 0 | 0 | 0 | 0 | 0.37 |
| ZrO₂ | mol. % | 6.99 | 4.06 | 4.06 | 3.91 | 5.34 |
| SrO | mol. % | 0 | 0 | 0 | 0 | 21.15 |
| CaF₂ | mol. % | 0.84 | 0 | 0 | 0 | 0 |
| Composition—wt % | | | | | | |
| La₂O₃ | wt % | 20.91 | 33.00 | 35.00 | 35.00 | 27.90 |
| B₂O₃ | wt % | 15.40 | 14.00 | 14.00 | 15.00 | 6.00 |
| SiO₂ | wt % | 8.50 | 10.00 | 10.00 | 14.00 | 20.00 |
| CaO | wt % | 14.06 | 16.00 | 16.00 | 15.00 | 0 |
| Nb₂O₅ | wt % | 23.41 | 8.00 | 6.00 | 3.00 | 10.00 |
| TiO₂ | wt % | 8.90 | 14.00 | 14.00 | 13.00 | 10.00 |
| Li₂O | wt % | 0 | 0 | 0 | 0 | 0.10 |
| ZrO₂ | wt % | 8.20 | 5.00 | 5.00 | 5.00 | 6.00 |
| SrO | wt % | 0 | 0 | 0 | 0 | 20.00 |
| CaF₂ | wt % | 0.62 | 0 | 0 | 0 | 0 |
| Measured properties | | | | | | |
| $n_d$ | | 1.888 | 1.8662 | 1.8628 | 1.8262 | 1.838 |
| $d_{RT}$ | g/cm³ | 3.950 | | | | |
| $v_d$ | | 30.0 | 30.7 | 31.2 | 34.9 | 33.4 |
| $n_{C\ (656.27)}$ | | 1.8794 | 1.8581 | 1.8548 | 1.8193 | 1.8307 |
| $n_{F\ (486.13)}$ | | 1.9091 | 1.8863 | 1.8824 | 1.8430 | 1.8558 |
| $T_i$ | | 0.39587 | 0.40856 | 0.42795 | 0.45958 | 0.45207 |
| $n_d - (1.12 + 0.18 * d_{RT})$ | | 0.057 | | | | |
| $n_d - (2.23 - 0.71 * T_i)$ | | −0.0609 | −0.0737 | −0.0634 | −0.0775 | −0.071 |
| Predicted properties | | | | | | |
| $P_n$ [for $n_d$] | | 1.885 | 1.869 | 1.866 | 1.824 | 1.838 |
| $P_d$ [for $d_{RT}$] | g/cm³ | 3.946 | 4.056 | 4.085 | 3.968 | 4.215 |
| $P_n - (1.12 + 0.18 * P_d)$ | | 0.0544 | 0.0188 | 0.0108 | −0.0106 | −0.0406 |
| $P_n - (2.23 - 0.71 * T_i)$ | | −0.0643 | −0.0710 | −0.0601 | −0.0801 | −0.0709 |

The reference key for each of the Comparative Glasses listed in Table 7 is as follows: [1] DE102006024805A1 (SCHOTT AG); [2] DE4242859A (SCHOTT GLASWERKE); [3] JP2002173334A (MINOLTA CO LTD); [4] JP2002362939A (MINOLTA CO LTD); [5] JP2007153734A (SCHOTT AG); [6] JPS5950048 (OBARA OPTICAL GLASS); [7] JPS61168551 (NIPPON KOGAKU KK); [8] JPS61232243 (OHARA KK); [9] US2018251395 (ASAHI GLASS CO., LTD); [10] U.S. Pat. No. 4,732,876A (KABUSHIKI KAISHA OHARA); [11] U.S. Pat. No. 5,288,669A (CORNING INC); [12] U.S. Pat. No. 6,121,176A (CORNING INC); [13] U.S. Pat. No. 6,187,702B1 (OHARA KK); [14] U.S. Pat. No. 6,413,894B1 (HOYA CORP); [15] U.S. Pat. No. 7,091,145B2 (CARL-ZEISS-STIFTUNG); [16] U.S. Pat. No. 7,563,738B2 (OHARA KK); [17] U.S. Pat. No. 7,598,193B2 (HOYA CORP); [18] U.S. Pat. No. 8,661,853B2 (HOYA CO LTD); [19] U.S. Pat. No. 8,728,963B2 (HOYA CO LTD).

Figure 8:
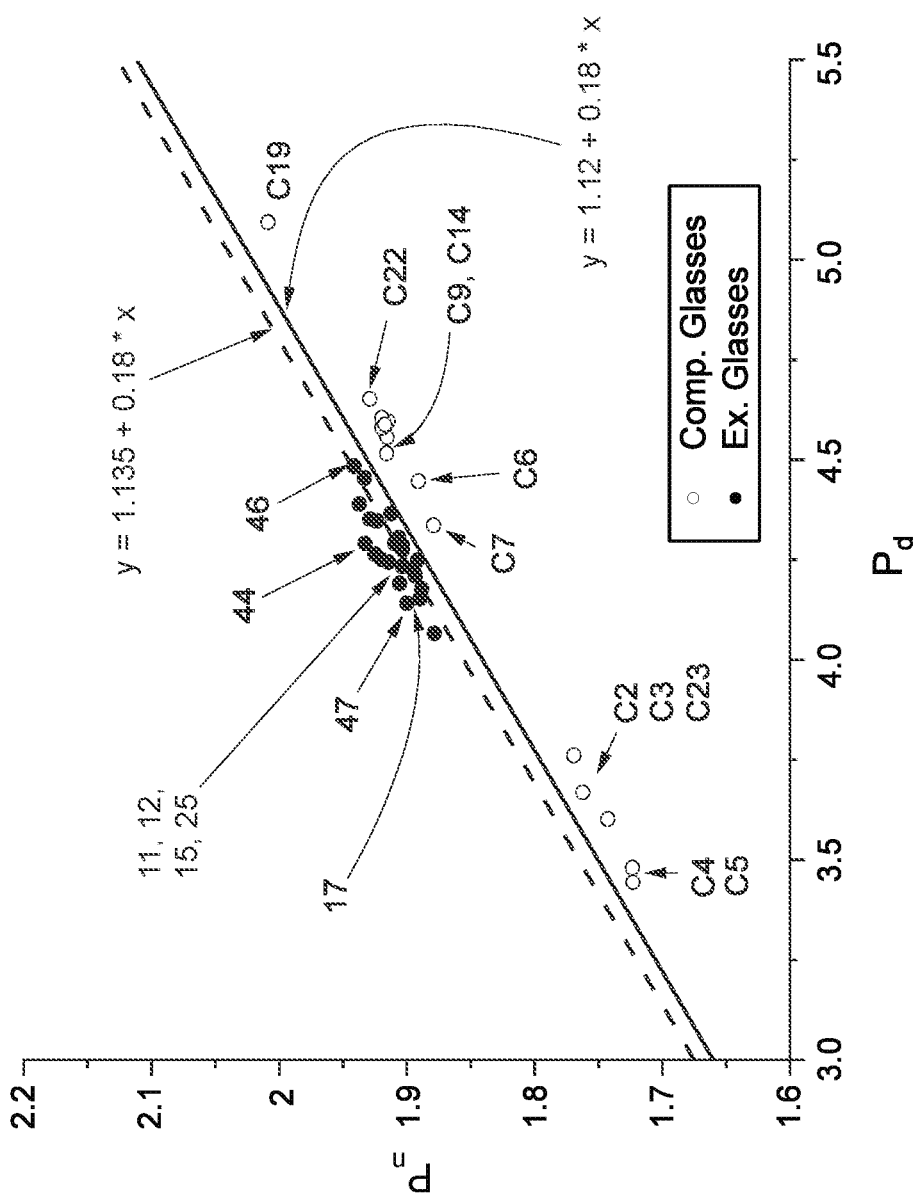
FIG. 8 is a plot illustrating the relationship between the density parameter $P_d$ and the refractive index parameter $P_n$ for some comparative glasses and some exemplary glasses according to an embodiment of the present disclosure.

FIG. 8 is a plot showing the relationship between the density parameter $P_d$ and the refractive index parameter $P_n$ for some of the Exemplary Glasses from Table 6 and some of the Comparative Glasses from Table 7. The density parameter $P_d$ and the refractive index parameter $P_n$ were determined according to Formulas (XV) and (XIV), respectively, where each oxide listed in the formula refers to the amount of oxide, expressed in mol %, in the glass. All of the Exemplary Glass Compositions shown in FIG. 8 have the following features (a)-(i):

(a) (SiO₂+B₂O₃)≤50.0 mol %, where 3.0 mol %≤SiO₂≤50.0 mol % and 18.0 mol %≤B₂O₃≤33.0 mol %;

(b) 0.0 mol %≤R₂O+RO≤40.0 mol %, where R₂O is the total content of monovalent metal oxides (such as, for example, alkali metal oxides) in a glass composition, and RO is the total content of divalent metal oxides (such as, for example, alkaline earth metal oxides, ZnO, CaO, etc.) in the glass composition;

(c) 0.0 mol %≤Bi₂O₃+PbO≤20.0 mol %;

(d) 0.0 mol %≤TiO₂≤22.0 mol %;

(e) 1.0 mol %≤Nb₂O₅≤30.0 mol %;

(f) 1.0 mol %≤ZnO≤10.0 mol %;

(g) substantially free of fluorine;

(h) transmittance index $T_i \geq 0.485$; and
(i) $(Y_2O_3+GeO_2+Ta_2O_5+Al_2O_3+MoO_3+PbO)$ from 0.0 mol % to 0.5 mol %.

The above-enumerated Comparative Glasses are selected as having the highest values of the refractive index parameter $P_n$ at comparable values of the density parameter $P_d$ among the known glasses that have the mentioned features (a)-(i).

The lines corresponding to the formula y=1.12+0.18*x and y=1.135+0.18*x shown in FIG. 8 provide a visual representation of the differences between the Comparative Glasses having the features (a)-(i) listed above and some of the Exemplary Glasses according to the present disclosure. As can be seen in FIG. 8, some of the Exemplary Glasses (filled circles) and none of the Comparative Glasses (open circles) represented in FIG. 8 fall above the line y=1.120+0.18*x, where y corresponds to the refractive index parameter $P_n$ and x corresponds to the density parameter $P_d$. In other words, some of the Exemplary Glasses and none of the Comparative Glasses represented in FIG. 8 satisfy formula (XVI)(a):

$$P_n-(1.120+0.18*P_d)>0.000 \qquad (XVI)(a).$$

As can be seen in FIG. 8, some of the Exemplary Glasses and none of the Comparative Glasses represented in FIG. 8 also fall above the line y=1.135+0.18*x, where y corresponds to the refractive index parameter $P_n$ and x corresponds to the density parameter $P_d$. In other words, some of the Exemplary Glasses and none of the Comparative Glasses represented in FIG. 8 are able to satisfy formula (XVI)(b):

$$P_n-(1.135+0.18*P_d)>0.000 \qquad (XVI)(b).$$

This means that, under the above-specified conditions, some of the Exemplary Glasses from the present disclosure have higher refractive indices at comparable densities than the best of the Comparative Glasses satisfying the conditions (a)-(i) above.

Figure 9:
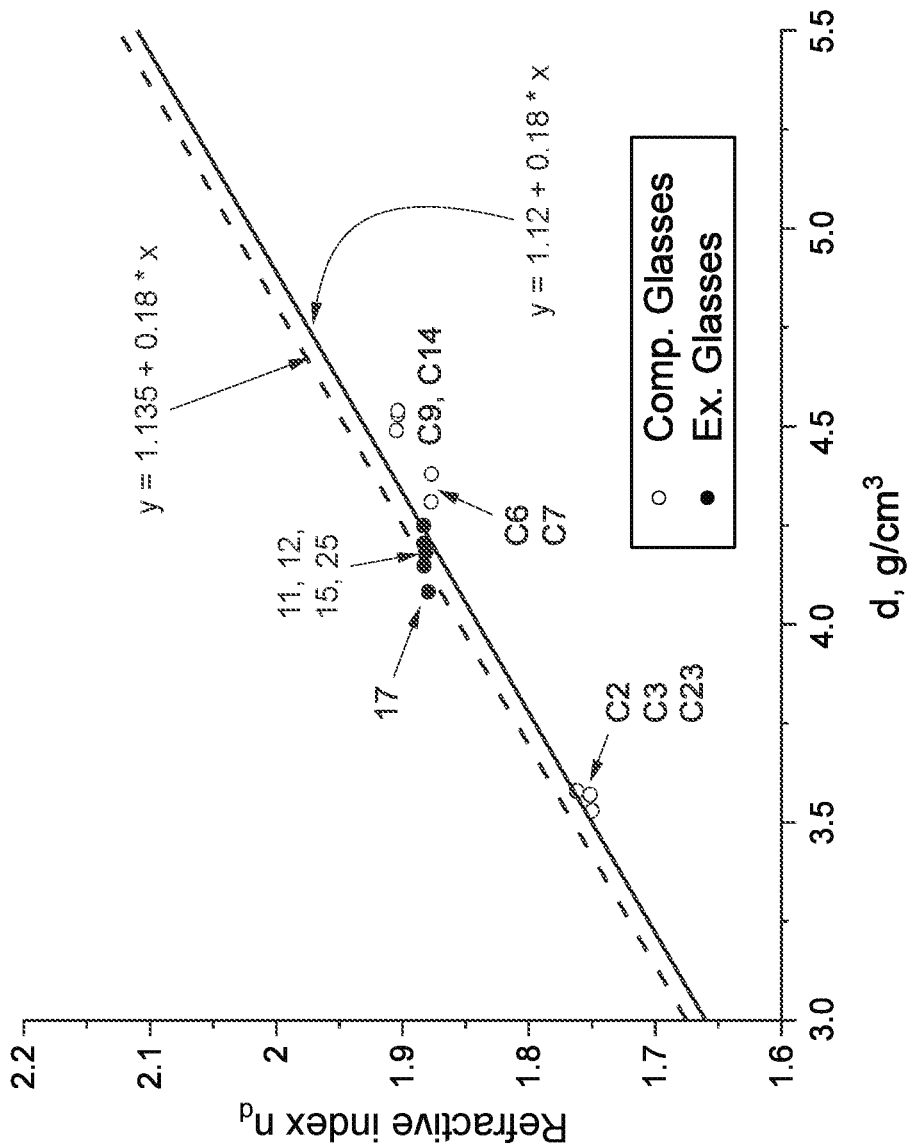
FIG. 9 is a plot illustrating the relationship between measured refractive index $n_d$ (measured at 587.56 nm) and measured density for some comparative glasses and some exemplary glasses according to an embodiment of the present disclosure.

FIG. 9 is a plot showing the relationship between the measured density $d_{RT}$ (measured at 25° C., in g/cm³) and measured refractive index $n_d$ (measured at 587.56 nm) for some of the Exemplary Glasses from Table 6 and some of the Comparative Glasses from Table 7. Exemplary Glasses 11, 12, 15, 17, and 25 and Comparative Glasses C2, C3, C6, C7, C9, C14, and C23 are plotted in FIG. 9. The selected Comparative Glasses are distinguished as having the highest measured refractive indices at corresponding densities among those Comparative Glasses of Table 7 that satisfy the conditions (a)-(i) above.

The lines corresponding to the formulas y=1.12+0.18*x and y=1.135+0.18*x shown in FIG. 9 provide a visual representation of the differences between the Comparative Glasses and Exemplary Glasses according to the present disclosure. As can be seen in FIG. 9, some of the Exemplary Glasses and none of the Comparative Glasses represented in FIG. 9 fall above the line y=1.120+0.18*x, where y corresponds to the measured refractive index $n_d$ and x corresponds to the measured density $d_{RT}$. In other words, some of the Exemplary Glasses of Table 6 and none of the Comparative Glasses of Table 7 satisfy formula (IV)(a):

$$n_d-(1.120+0.18*d_{RT})>0 \qquad (IV)(a).$$

As can also be seen in FIG. 9, the selected Exemplary Glasses and none of the selected Comparative Glasses represented in FIG. 9 fall above the line y=1.135+0.18*x, where y corresponds to the measured refractive index $n_d$ and x corresponds to the measured density $d_{RT}$. In other words, some of the Exemplary Glasses and none of the Comparative Glasses having the features (a)-(i) above satisfy formula (IV)(b):

$$n_d-(1.135+0.18*d_{RT})>0 \qquad (IV)(b).$$

Figure 10:
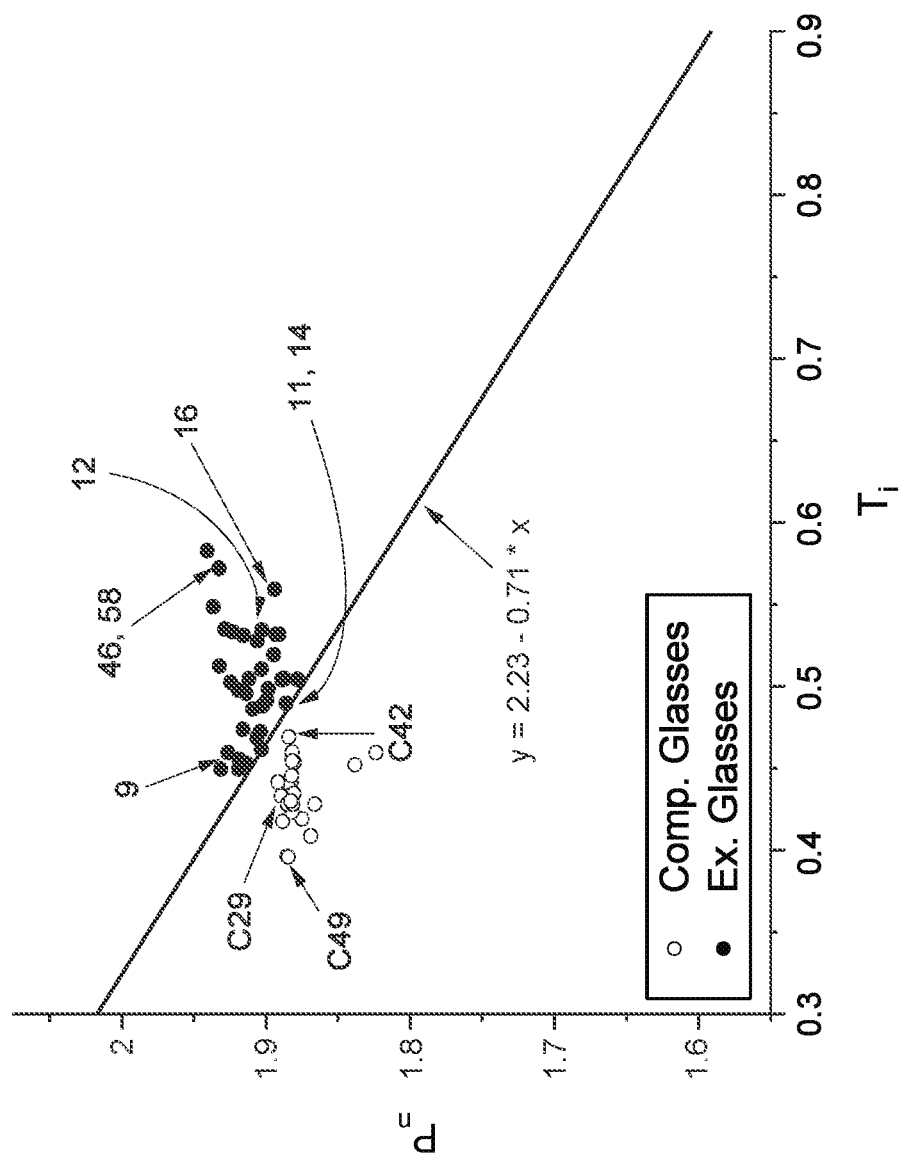
FIG. 10 illustrates the relationship between the refractive index parameter $P_n$ and transmittance index $T_i$, which characterizes the blue transmittance of a glass, for some comparative glasses and some exemplary glasses according to an embodiment of the present disclosure.

FIG. 10 is a plot illustrating the relationship between the refractive index parameter $P_n$ and the transmittance index $T_i$ for some of the Exemplary Glasses from Table 6 and some of the Comparative Glasses from Table 7.

All of the Exemplary Glass Compositions shown in FIG. 10 have the following features (a)-(u):
(a) $(SiO_2+B_2O_3) \leq 50.0$ mol %, where 3.0 mol % $\leq SiO_2 \leq 50.0$ mol % and $B_2O_3 \geq 1.0$ mol %;
(b) $(RE_2O_3+TiO_2+Nb_2O_5+ZrO_2+Bi_2O_3+WO_3) \geq 25.0$ mol %, where $RE_2O_3$ is the total content of rare earth metal oxides in a glass composition;
(c) $(SiO_2+B_2O_3+Alk_2O+MgO+CaO+SrO+BaO+ZnO) \leq 69.0$ mol %, where $Alk_2O$ is the total content of alkali metal oxides in a glass composition;
(d) $RO \geq 3.0$ mol %, where RO is the total content of divalent metal oxides (such as, for example, alkaline earth metal oxides, ZnO, CaO, etc.) in glass composition;
(e) 0.5 mol % $\leq Nb_2O_5 \leq 25.0$ mol %;
(f) 0.0 mol % $\leq TiO_2 \leq 18.0$ mol %;
(g) 0.0 mol % $\leq RE_2O_3 \leq 23.0$ mol %;
(h) 0.0 mol % $\leq CaO \leq 32.0$ mol %;
(i) 0.0 mol % $\leq BaO \leq 15.0$ mol %;
(j) 0.0 mol % $\leq Bi_2O_3 \leq 20.0$ mol %;
(k) 0.0 mol % $\leq Li_2O \leq 7.0$ mol %;
(l) 0.0 mol % $\leq MgO \leq 5.0$ mol %;
(m) 0.0 mol % $\leq HfO_2 \leq 1.0$ mol %;
(n) 0.0 mol % $\leq TeO_2 \leq 5.0$ mol %;
(o) 0.0 mol % $\leq ZnO \leq 2.0$ mol %;
(p) 0.0 mol % $\leq Y_2O_3 \leq 1.5$ mol %;
(q) 0.0 mol % $\leq CdO \leq 15.0$ mol %;
(r) 0.0 mol % $\leq PbO \leq 1.0$ mol %;
(s) 0.0 atomic % $\leq F \leq 1.0$ atomic %;
(t) 0.0 mol % $\leq Ta_2O_5 \leq 1.5$ mol %; and
(u) a density parameter $P_d$ of less than or equal to 4.5 and refractive index parameter $P_n$ that is greater than or equal to 1.75.

The Comparative Glasses shown in FIG. 10 are selected as having the highest values of the refractive index parameter $P_n$ at corresponding values of the transmittance index $T_i$ among the Comparative Glasses of Table 7 with the mentioned features (a)-(u).

As discussed above, the transmittance index $T_i$ correlates with blue transmittance of the glasses. The line corresponding to the formula y=2.23−0.71*x shown in FIG. 10 provides a visual representation of the differences between the Comparative Glasses and Exemplary Glasses according to the present disclosure. As can be seen in FIG. 10, some of the Exemplary Glasses and none of the Comparative Glasses represented in FIG. 10 fall above the line y=2.23−0.71*x, where y corresponds to the refractive index parameter $P_n$ and x corresponds to the transmittance index $T_i$. In other words, some of the Exemplary Glasses listed in Table 6 and none of the Comparative Glasses having the features (a)-(u) listed above satisfy formula (XVII):

$$P_n-(2.23-0.71*T_i) \geq 0.000 \qquad (XVII).$$

Figure 11:
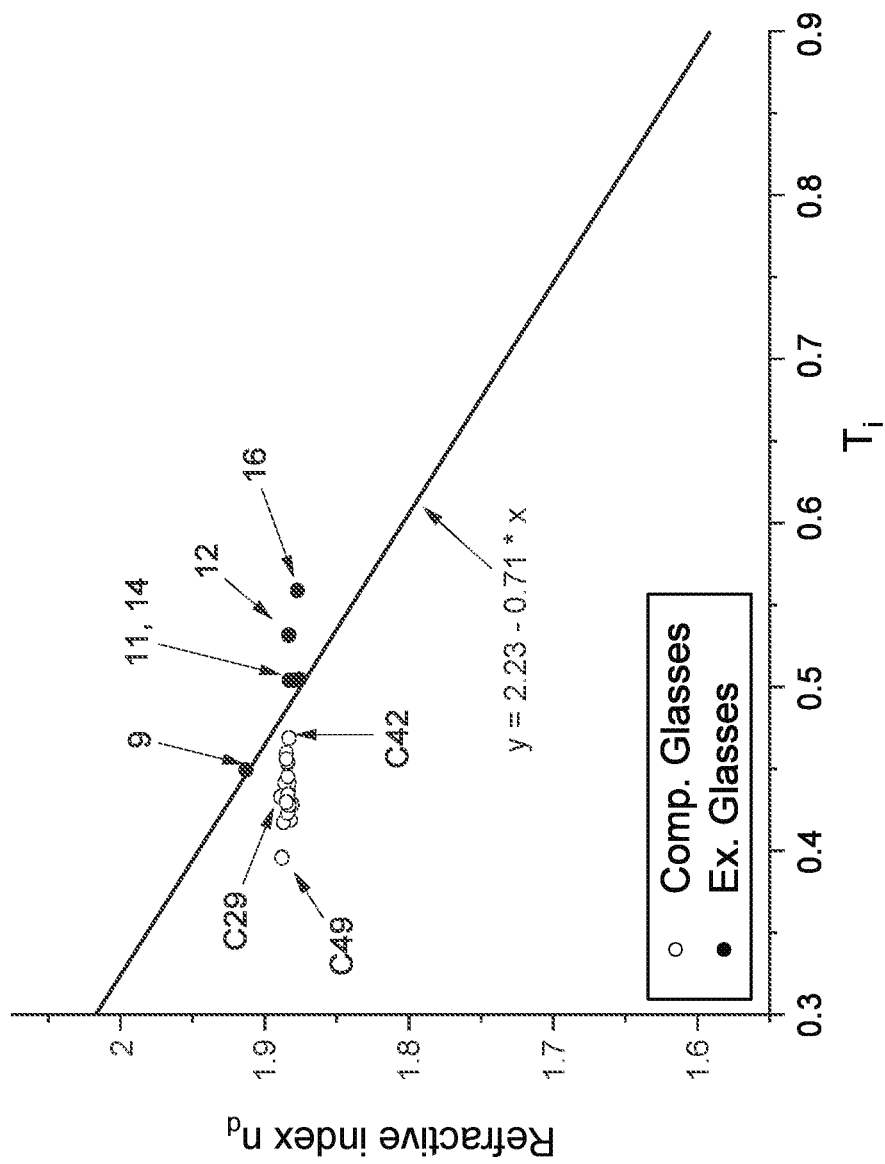
FIG. 11 illustrates the relationship between measured refractive index $n_d$ (measured at 587.56 nm) and transmittance index $T_i$, which characterizes the blue transmittance of a glass, for some comparative glasses and some exemplary glasses according to an embodiment of the present disclosure.

FIG. 11 is a plot illustrating the relationship between the measured refractive index $n_d$ (measured at 587.56 nm) and the transmittance index $T_i$ for some of the Exemplary Glasses from Table 6 and some of the Comparative Glasses from Table 7. The line corresponding to the formula y=2.23−

0.71*x shown in FIG. 11 provides a visual representation of the differences between the Comparative Glasses and Exemplary Glasses according to the present disclosure. As can be seen in FIG. 11, some of the Exemplary Glasses from Table 6 and none of the Comparative Glasses represented in FIG. 11 (and none of the remaining Comparative Glasses listed in Table 7) fall above the line y=2.23−0.71*x, where y corresponds to the measured refractive index $n_d$ and x corresponds to the transmittance index $T_i$. In other words, some of the Exemplary Glasses of Table 6 and none of the Comparative Glasses having the features (a)-(u) above satisfy formula (XIII):

$$n_d-(2.23-0.71*T_i)\geq 0 \qquad (XIII).$$

This means that, under the conditions (a)-(u) specified above, some of the Exemplary Glasses from the present disclosure have higher refractive indices $n_d$ at comparable values of the transmittance index $T_i$ than the best of the Comparative Glasses under equivalent conditions.

Figure 12:
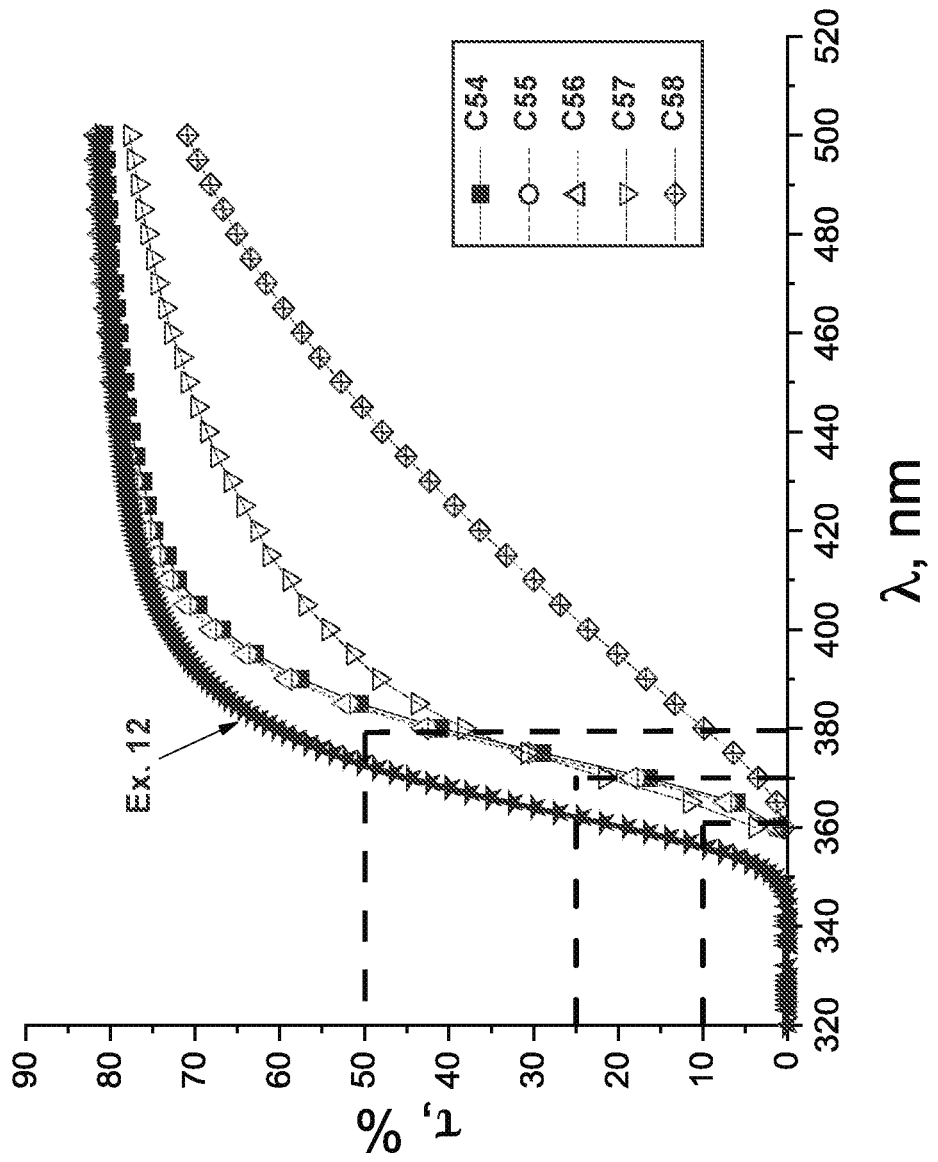
FIG. 12 illustrates the transmittance spectra for some comparative glasses and an exemplary glass according to an embodiment of the present disclosure.

FIG. 12 compares the total transmittance τ of Exemplary Glass 12 according to the present disclosure and several Comparative Glasses from Japanese Patent Application No. 2005-239506 (C54–C58) at wavelengths of from about 320 nm to about 500 nm. As shown in FIG. 12, the Exemplary Glass 12 provides some transmission at wavelengths of from 350 nm to 380 nm, at which the Comparative Glasses shown in FIG. 12 provide less and in some cases little to no transmission. The total transmittance τ data shown in FIG. 12 for both the Exemplary Glass 12 and the Comparative Glasses were obtained from glass samples having a thickness of 10 mm. As can be seen in FIG. 12, the Exemplary Glass 12 provides a total transmittance τ of greater than 50% at 380 nm, greater than 25% at 370 nm, and greater than 10% at 360 nm. The data in FIG. 12 also show that the Exemplary Glass 12 provides some amount of transmittance even at 350 nm, where the Comparative Glasses provide less or nearly zero transmittance.

Figure 13:
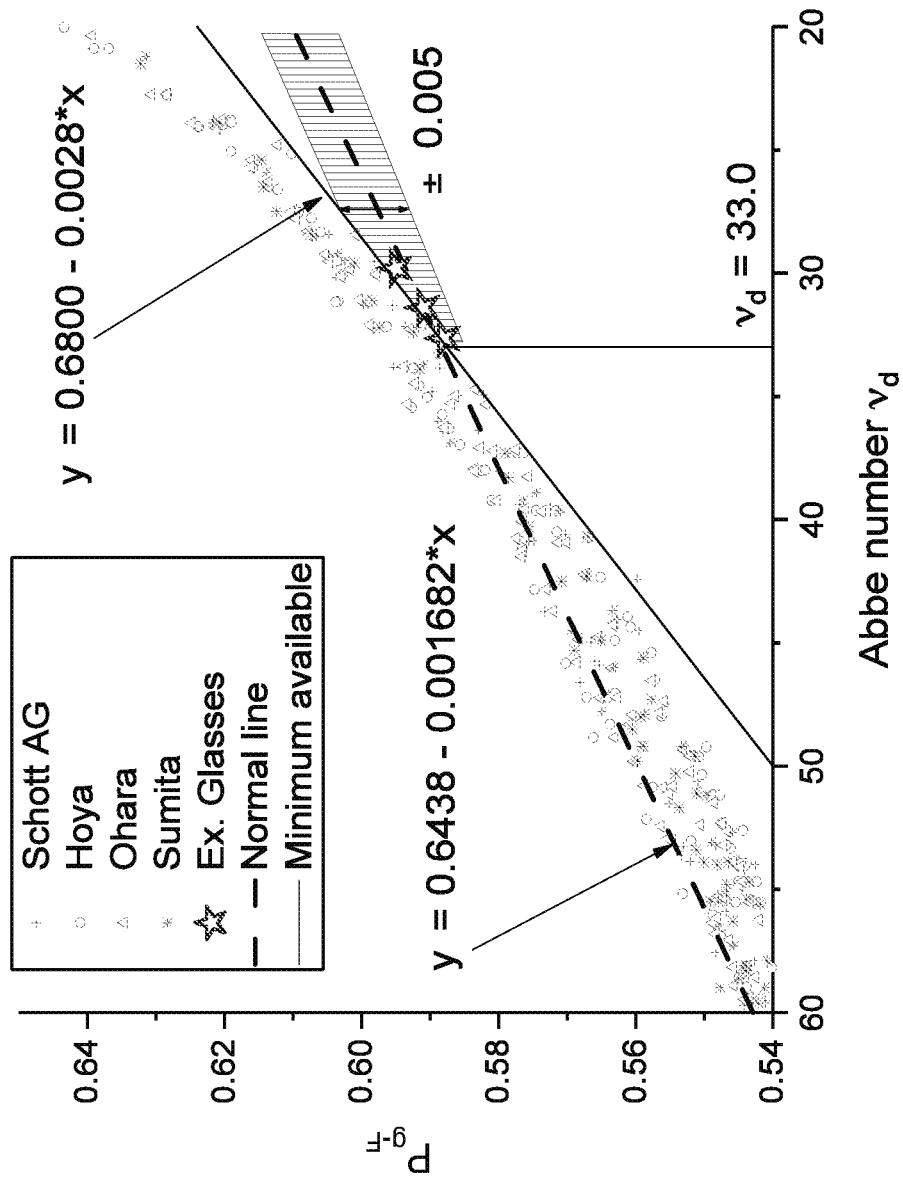
FIG. 13 illustrates the relationship between Abbe number $v_d$ and relative partial dispersion $P_{g-F}$ for some comparative glasses and some exemplary glasses according to an embodiment of the present disclosure, which are characterized by a low density.
Figure 14:
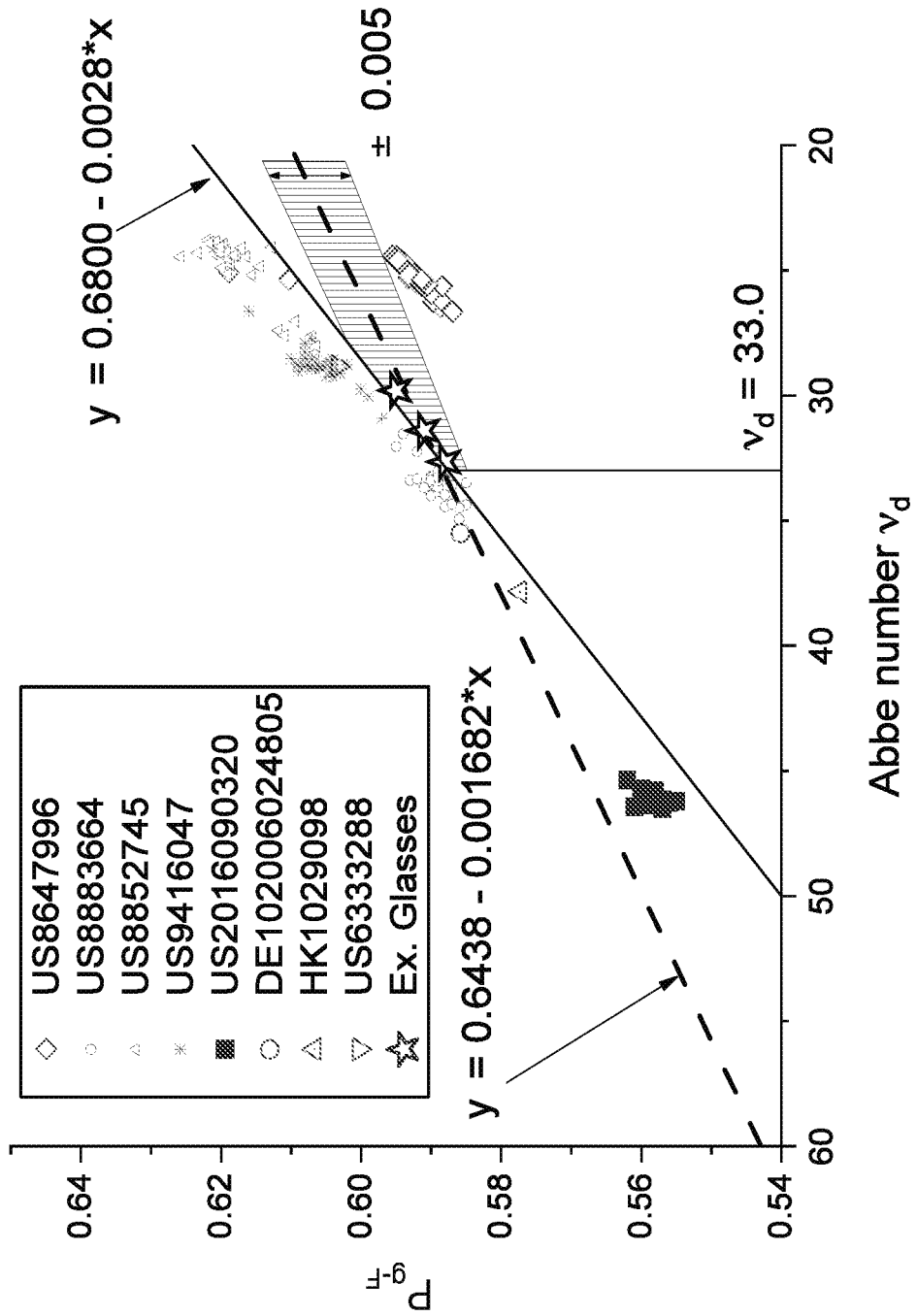
FIG. 14 illustrates the relationship between Abbe number $v_d$ and relative partial dispersion $P_{g-F}$ for some comparative glasses and some exemplary glasses according to an embodiment of the present disclosure, which are characterized by a high measured refractive index and a low measured density.

FIGS. 13 and 14 are plots showing the relative partial dispersion $P_{g\text{-}F}$ as a function of Abbe number $v_d$ for some Exemplary Glasses and some comparative glasses. FIG. 13 shows several comparative glasses available from the optical catalogs of Schott AG, Hoya, Ohara, and Sumita. FIG. 14 shows several comparative glasses from prior art references, namely, U.S. Pat. Nos. 8,647,996; 8,883,664; 8,852,745; 9,416,047; 6,333,288; U.S. Publication No. 20160090320; German Publication DE 10 2006 024805; and Hong Kong Publication HK 1029098. The data in FIGS. 13 and 14 illustrate a combination of attributes that can be advantageous in some optical systems, namely, low dispersion (i.e., high Abbe number $v_d$), low density, and a specific proportion of refractive indices at different wavelengths that make the glasses compatible with glasses having lower refractive indices in the optical system that correct the aberration of the images, such as achromat systems, for example. In such systems, it is desirable that the glasses have attributes that correspond to (i.e., are close to) the "normal line," as described above. The normal line is illustrated in FIGS. 13 and 14 as the line defined by the equation y=0.6438−0.001682*x.

The glasses shown in FIGS. 13 and 14 were limited to those Exemplary and comparative glasses having a measured density of less than or equal to 4.5 g/cm³.

The glasses shown in FIG. 14 were additionally limited to those Exemplary and comparative glasses having a measured refractive index $n_d$ of greater than or equal to 1.80, to exclude the data related to lower refractive indices that would not be relevant to applications where a high refractive index and nearness to the normal line is desired.

The vertical line at $v_d$=33.0 shown in FIGS. 13 and 14, depicts the maximum available Abbe number (i.e., lowest dispersion) that appeared possible to achieve while also maintaining the properties of the glass near the normal line such that values of $P_{g\text{-}F}$ deviated from this line by not more than ±0.005 units. As shown in FIG. 13, some of the Exemplary Glasses presented in the embodiments herein provide a combination of attributes of $v_d$ and $P_{g\text{-}F}$ at values of the Abbe number $v_d$ closer to $v_d$=33.0 than the comparative glasses.

As shown by the data in FIG. 14, some of the Exemplary Glasses are capable of extending the available range of Abbe numbers $v_d$ conforming to the normal line compared to the comparative glasses. The data of FIGS. 13 and 14 demonstrate that some of the Exemplary Glasses of the present disclosure are characterized by a $v_d$≤33.0 and also satisfy formulas (VII) and (VI):

$$-0.005\leq P_{g\text{-}F}-(0.6438-0.001682v_d)\leq +0.005 \qquad (VII)$$

and $$P_{g\text{-}F}<0.6750-0.0028*v_d \qquad (VI)$$

As discussed above, the terms "low dispersion" and "high dispersion" can be case specific and, in some cases, the same optical glass can be considered as "high-dispersion" for one application and "low-dispersion" for another application. In the present disclosure, for glasses having a high refractive index of 1.80 or greater and a low density of 4.5 g/cm³ or less, an Abbe number $v_d$ of 30-35 units can be considered "low dispersion" (compared to other glasses having similar attributes). However, for glasses having a low density below 4.5 g/cm³ and a position along the normal line, an Abbe number $v_d$ of 30-35 units characterizes the highest possible dispersion compared to other glasses lying along normal line.

As shown FIGS. 13 and 14, several of the Exemplary Glasses exhibit a combination of attributes that are desirable in many applications, which the illustrated comparative glasses are not capable of achieving, namely:
(a) a comparably low density ($d_{RT}$≤4.5 g/cm³);
(b) a comparably high refractive index ($n_d$≥1.80);
(c) a comparably low Abbe number ($v_d$≤33.0);
(d) consistency with the normal line (illustrated as the line (y=0.6438−0.001682*x)); and
(e) a comparably low relative partial dispersion $P_{g\text{-}F}$ at a given Abbe number (as demonstrated by several of the Exemplary Glasses and none of the comparative glasses satisfying the inequality y<0.6800-0.0028*x, in combination with the attributes (a)-(d) listed above).

The following non-limiting aspects are encompassed by the present disclosure. To the extent not already described, any one of the features of the first through the fifty-sixth aspect may be combined in part or in whole with features of any one or more of the other aspects of the present disclosure to form additional aspects, even if such a combination is not explicitly described.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

What is claimed is:

1. A glass, comprising:
$SiO_2$ from 0.3 wt % to 30.0 wt %;
$B_2O_3$ from 0.3 wt % to 30.0 wt %;
$Nb_2O_5$ from 11.23 wt % to 50.0 wt %;
CaO from 0.5 wt % to 25.0 wt %;
at least one oxide selected from $ZrO_2$, SrO, $Li_2O$, MgO, ZnO, $Y_2O_3$, $Ta_2O_5$, BaO, PbO, $TiO_2$, $Gd_2O_3$, $GeO_2$, $K_2O$, $La_2O_3$, and $Na_2O$, subject to the proviso that:
$ZrO_2$ from 2.5 wt % to 15.0 wt %, if present;
$Gd_2O_3$ from 0.0 wt % to 20.0 wt %;
$Y_2O_3$ from 0.0 wt % to 10.0 wt %;
$TiO_2$ from 0.0 wt % to 6.77 wt %;
ZnO from 0.0 wt % to 2.0 wt %;
$Li_2O$ from 0.0 wt % to 2.0 wt %;
$GeO_2$ from 0.0 wt % to 2.0 wt %;
$Ta_2O_5$ from 0.0 wt % to 1.0 wt %; and
wherein the glass is further defined by (in percent by weight of oxides):
a sum of ($Nb_2O_5+TiO_2$) of from 18.0 wt % to 50.0 wt %;
a sum of ($SiO_2+B_2O_3$) of from 1.0 wt % to 30.0 wt %;
a sum ($La_2O_3+Gd_2O_3$) of from 0.0 wt % to 40.0 wt %;
a sum (CaO+SrO+BaO) of 8.1 wt % or greater;
a sum ($PbO+V_2O_5$) of from 0.0 wt % to 1.0 wt %;
a ratio CaO/($Li_2O+Na_2O+K_2O+MgO+CaO+SrO+BaO+ZnO$) of 0.50 or greater;
a ratio ($SiO_2/(SiO_2+B_2O_3$)) of greater than 0.0 to less than or equal to 0.50; and
a ratio (CaO+SrO+BaO)/($Nb_2O_5+TiO_2$) of 0.45 or greater, and
wherein the glass is substantially free of fluorine; and
wherein none of the ranges is modified by the term "about".

2. The glass of claim 1, wherein the $SiO_2$ is from 0.3 wt % to 10.0 wt %.

3. The glass of claim 1, wherein the $B_2O_3$ is from 0.3 wt % to 10.0 wt %.

4. The glass of claim 1, wherein the $Nb_2O_5$ is up to and including 20.0 wt %.

5. The glass of claim 1, wherein the at least one oxide is $ZrO_2$.

6. The glass of claim 5, wherein the $ZrO_2$ is from 5.0 wt % to 10.0 wt %.

7. The glass of claim 1, wherein the at least one oxide is $TiO_2$.

8. The glass of claim 7, wherein the $TiO_2$ is from 2.0 wt % to 5.0 wt %.

9. The glass of claim 1, wherein the sum of ($Nb_2O_5+TiO_2$) is from 18.0 wt % to 30.0 wt %.

10. The glass of claim 1, wherein the sum of ($SiO_2+B_2O_3$) is from 15.0 wt % to 30.0 wt %.

11. The glass of claim 1, wherein the sum of ($La_2O_3+Gd_2O_3$) is from 20.0 wt % to 40.0 wt %.

12. The glass of claim 1, wherein the ratio ($SiO_2/(SiO_2+B_2O_3$)) is greater than or equal to 0.20 and less than or equal to 0.40.

13. The glass of claim 1, wherein the ratio (CaO+SrO+BaO)/($Nb_2O_5+TiO_2$) is greater than or equal to 0.50.

14. The glass of claim 1, wherein the glass further has a refractive index $n_d$ that is from 1.70 to 1.95, where $n_d$ is the refractive index measured at a wavelength of 587.56 nm.

15. The glass of claim 1, wherein the glass has an Abbe number $v_d$ from 25 to 28.

16. The glass of claim 1, wherein the glass further has a density $d_{RT}$ of 4.5 g/cm³ or less, as measured at 25° C.

17. The glass of claim 1, wherein the glass is characterized by an ability to cool, in air, from 1100° C. to 500° C. in 2.5 minutes without crystallizing.

18. The glass of claim 1, wherein the glass further has an Abbe number $v_d$ of 33 or less and satisfies formula (VI) and formula (VII):

$$P_{g\text{-}F} < 0.6750 - 0.0028 * v_d \quad \text{(VI)}$$

and $$-0.005 \leq P_{g\text{-}F} - (0.6438 - 0.001682 * v_d) < 0.005 \quad \text{(VII)}$$

where $P_{g\text{-}F}$ is a relative partial dispersion of the glass and is calculated according to formula (II):

$$P_{g\text{-}F} = (n_g - n_F)/(n_F - n_C) \quad \text{(II)}$$

where $n_g$ is the refractive index measured at 435.8 nm, $n_F$ is the refractive index measured at 486.1 nm, and $n_C$ is the refractive index measured at 656.3 nm.

19. The glass of claim 1, wherein the glass further has a total transmittance of 70% at a wavelength $\lambda_{70\%}$ (in nanometers) based on a relative partial dispersion $P_{g\text{-}F}$ of the glass, according to formula (X):

$$\lambda_{70\%} \leq 210 + 300 * P_{g\text{-}F} \quad \text{(X)}$$

where $P_{g\text{-}F}$ is defined according to formula (II):

$$P_{g\text{-}F} = (n_g - n_F)/(n_F - n_C) \quad \text{(II)}$$

where $n_g$ is the refractive index measured at 435.8 nm, $n_F$ is the refractive index measured at 486.1 nm, and $n_C$ is the refractive index measured at 656.3 nm, and total transmittance is measured with a glass sample having a thickness of 10 mm.

* * * * *

UNITED STATES PATENT AND TRADEMARK OFFICE
CERTIFICATE OF CORRECTION

PATENT NO. : 11,999,651 B2
APPLICATION NO. : 17/398580
DATED : June 4, 2024
INVENTOR(S) : Paulo Jorge Gaspar Marques et al.

It is certified that error appears in the above-identified patent and that said Letters Patent is hereby corrected as shown below:

In the Claims

Claim 18 Line 27:
"$P_{g\text{-}F} < 0.6750 - 0.0028 * vd$"
Change the formula to read:
"$P_{g\text{-}F} < 0.6750 - 0.0028 * v_d$"

Claim 18 Line 31:
"$-0.005 \leq P_{g\text{-}F} - (0.6438 - 0.001682 * vd) \leq 0.005$"
Change the formula to read:
"$-0.005 \leq P_{g\text{-}F} - (0.6438 - 0.001682 * v_d) \leq 0.005$"

Claim 18 Line 34:
"$P_{g\text{-}F} = (ng - nF)/(nF - nC)$"
Change the formula to read:
"$P_{g\text{-}F} = (n_g - n_F)/(n_F - n_C)$"

Claim 19 Line 44:
"$\lambda_{70\%} \leq 210 + 300 * P_{g\text{-}F}$"
Change the formula to read:
"$\lambda_{70\%} \leq 210 + 300 * P_{g\text{-}F}$"

Claim 19 Line 46:
"$\lambda_{70\%} \leq 210 + 300 * P_{g\text{-}F}$"
Change the formula to read:
"$P_{g\text{-}F} = (n_g - n_F)/(n_F - n_C)$"

Signed and Sealed this
Fourteenth Day of January, 2025

Derrick Brent
*Acting Director of the United States Patent and Trademark Office*